(12) United States Patent
Matsui et al.

(10) Patent No.: US 12,467,501 B2
(45) Date of Patent: Nov. 11, 2025

(54) CROWN-SHAPED RETAINER FOR BALL BEARING, AND BALL BEARING

(71) Applicant: NSK LTD., Tokyo (JP)

(72) Inventors: Masahito Matsui, Kanagawa (JP);
Takefumi Kichikawa, Kanagawa (JP);
Haruhisa Ashida, Kanagawa (JP);
Taketoshi Chifu, Kanagawa (JP)

(73) Assignee: NSK LTD., Tokyo (JP)

( * ) Notice: Subject to any disclaimer, the term of this patent is extended or adjusted under 35 U.S.C. 154(b) by 231 days.

(21) Appl. No.: 18/272,683

(22) PCT Filed: Jan. 17, 2022

(86) PCT No.: PCT/JP2022/001447
§ 371 (c)(1),
(2) Date: Jul. 17, 2023

(87) PCT Pub. No.: WO2022/154125
PCT Pub. Date: Jul. 21, 2022

(65) Prior Publication Data
US 2024/0141954 A1 May 2, 2024

(30) Foreign Application Priority Data

Jan. 18, 2021 (JP) ................................. 2021-005914
Jan. 18, 2021 (JP) ................................. 2021-005915
Mar. 15, 2021 (JP) ................................. 2021-041572

(51) Int. Cl.
*F16C 33/41* (2006.01)
*F16C 33/66* (2006.01)

(52) U.S. Cl.
CPC .......... *F16C 33/416* (2013.01); *F16C 33/418* (2013.01); *F16C 33/6629* (2013.01)

(58) Field of Classification Search
CPC ...... F16C 33/41; F16C 33/412; F16C 33/414; F16C 33/416; F16C 33/418; F16C 33/44; F16C 33/6629
See application file for complete search history.

(56) References Cited

U.S. PATENT DOCUMENTS

| 8,454,240 B2 * | 6/2013 | Doyer | F16C 33/416 384/523 |
| 8,568,035 B2 * | 10/2013 | Claude | F16C 33/44 384/531 |
| 2010/0046875 A1 * | 2/2010 | Doyer | F16C 33/6614 384/490 |

FOREIGN PATENT DOCUMENTS

| CN | 111649068 A | 9/2020 | |
| DE | 102005028756 A1 * | 1/2007 | ............ F16C 33/416 |

(Continued)

OTHER PUBLICATIONS

Machine Translation of JP-2001082486-A (Year: 2001).*
(Continued)

*Primary Examiner* — Alan B Waits
(74) *Attorney, Agent, or Firm* — Sughrue Mion, PLLC

(57) ABSTRACT

A crown type cage for a ball bearing includes an annular main portion, a plurality of pillar portions protruding in an axial direction from the main portion at predetermined intervals in a peripheral direction, and a spherical pocket formed between the adjacent pillar portions and capable of holding balls. The pillar portion has a pair of claw portions of which tip end portions are spaced apart from each other, and a connection portion that connects the pair of claw portions. A bottom surface of the main portion is provided with a part protruding in the axial direction.

38 Claims, 52 Drawing Sheets

(56) References Cited

FOREIGN PATENT DOCUMENTS

| | | | | | |
|---|---|---|---|---|---|
| DE | 102014208484 | A1 | * | 11/2015 | ............ F16C 33/405 |
| JP | 11-264418 | A | | 9/1999 | |
| JP | 2001082486 | A | * | 3/2001 | ............ F16C 33/416 |
| JP | 2002-147463 | A | | 5/2002 | |
| JP | 2003-247553 | A | | 9/2003 | |
| JP | 2004-84782 | A | | 3/2004 | |
| JP | 2006200594 | A | * | 8/2006 | ............ F16C 33/416 |
| JP | 2008138835 | A | * | 6/2008 | ............. F16C 33/44 |
| JP | 2008-274977 | A | | 11/2008 | |
| JP | 2009-197906 | A | | 9/2009 | |
| JP | 2009-536998 | A | | 10/2009 | |
| JP | 2010-156439 | A | | 7/2010 | |
| JP | 5436204 | B2 | | 3/2014 | |
| JP | 2020019861 | A | * | 2/2020 | |
| KR | 102045291 | B1 | * | 11/2019 | |
| KR | 20200064296 | A | * | 6/2020 | |
| KR | 10-2020-0093753 | A | | 8/2020 | |

OTHER PUBLICATIONS

Machine Translation of JP-2006200594-A (Year: 2006).*
Machine Translation of DE-102005028756-A1 (Year: 2007).*
Machine Translation of JP-2008138835-A (Year: 2008).*
Machine Translation of DE-102014208484-A1 (Year: 2015).*
Machine Translation of KR-102045291-B1 (Year: 2019).*
Machine Translation of JP-2020019861-A (Year: 2020).*
Machine Translation of KR-20200064296-A (Year: 2020).*
Office Action issued on Nov. 29, 2023 by the Japan Patent Office in counterpart Japanese Patent Application No. 2022-575669.
International Search Report (PCT/ISA/210) dated Apr. 5, 2022, issued by the International Searching Authority in counterpart International Application No. PCT/JP2022/001447.
Written Opinion (PCT/ISA/237) dated Apr. 5, 2022, issued by the International Searching Authority in counterpart International Application No. PCT/JP2022/001447.

* cited by examiner

CROWN-SHAPED RETAINER FOR BALL BEARING, AND BALL BEARING

TECHNICAL FIELD

The present invention relates to a crown type cage for a ball bearing, and a ball bearing.

BACKGROUND ART

Generally, a ball bearing 1 as shown in FIG. 34 is used to support rotating parts of various rotary machines. The ball bearing 1 includes an inner ring 3 having an inner ring raceway 2 on the outer peripheral surface thereof, an outer ring 5 disposed concentrically with the inner ring 3 and having an outer ring raceway 4 on the inner peripheral surface thereof, and a plurality of balls 6 arranged to freely roll between the inner ring raceway 2 and the outer ring raceway 4.

Each ball 6 is rotatably held by a cage 100. In addition, outer peripheral edges of a pair of circular ring-shaped shield plates 7 and 7 are respectively locked to both end portions of the inner peripheral surface of the outer ring 5 in the axial direction. The pair of shield plates 7 and 7 prevents lubricant such as grease existing in the bearing space from leaking to the outside and dust floating outside from entering the bearing space. As a sealing device, a contact type seal may be used instead of the non-contact type shield plates 7 and 7.

The cage 100 is a resin crown type cage, as shown in FIGS. 35 and 36. The cage 100 includes an annular main portion 109, a plurality of pillar portions 110 protruding in the axial direction from the main portion 109 at predetermined intervals in the peripheral direction, and a spherical pocket 111 formed between the adjacent pillar portions 110 and capable of holding the balls 6.

The pillar portion 110 has a pair of claw portions 112 and 112 of which tip end portions are spaced apart from each other. The two adjacent claw portions 112 and 112 forming the pocket 111 hold the ball 6, thereby preventing the cage 100 from slipping out from between the outer ring 5 and the inner ring 3 in the axial direction.

Incidentally, with the recent electrification of automobiles, rolling bearings (especially ball bearings) are required to rotate at high speed. In order to achieve high-speed rotation, it is required that (i) the centrifugal force expansion of the cage is suppressed and the stress generated at the bottom portion of the pocket is reduced to prevent fatigue fracture, and (ii) the deformation of the cage is suppressed to avoid contact of the cage with the outer ring and the seal, and suppress wear, vibration, and heat generation of the cage.

In the cage 100 of the related art as shown in FIGS. 34 to 36, there is a possibility that stress acts on the cage 100 due to the centrifugal force during high-speed rotation, and the cage 100 deforms toward the outer diameter side. In FIG. 34, broken lines show how the cage 100 is deformed. In this case, the cage 100 comes into contact with the outer ring 5 (refer to a part A in FIG. 34), or the cage 100 comes into contact with the shield plate 7 (refer to a part B in FIG. 34), there is concern that the cage 100 will wear, vibrate, and generate heat.

Patent Literature 1 and Patent Literature 2 disclose techniques for reducing the weight of the cage.

Specifically, Patent Literature 1 discloses that a thinned portion is formed on the end surface of the crown type cage opposite to the end surface on the pocket forming portion side. This thinned portion improves the left-right mass balance in the axial direction of the crown type cage and reduces the weight of the back surface side part.

Further, the cage described in Patent Literature 2 has an annular base portion and an axial portion extending in the axial direction from the base portion. The outer diameter of the axial portion is smaller than the outer diameter of the base portion. The base portion is formed with a hole that communicates with the recessed area of the axial portion and penetrates therethrough in the axial direction. Therefore, it is intended to reduce the amount of material and suppress deformation in the radial direction induced during high-speed rotation.

Further, Patent Literature 3 discloses that a projection is provided on the bottom surface of the back side of the pocket.

Further, Patent Literature 4 discloses that, in a cage that holds balls of a bearing, the diameter of the circumscribed circle of each pocket that forms the cage is equal to or less than the pitch circle diameter of a plurality of balls held in each pocket. As a result, even when the bearing rotates at high speed, the tip end portions of each projection portion that form the cage are prevented from interfering with the inner peripheral surface of the outer ring, and the material used for the cage is reduced in order to reduce manufacturing costs.

CITATION LIST

Patent Literature

Patent Literature 1: JP2008-274977A
Patent Literature 2: JP5436204B
Patent Literature 3: JPH11-264418A
Patent Literature 4: JP2010-156439A

SUMMARY OF INVENTION

Technical Problem

In order to meet the demand for higher rotation speeds, it is conceivable not only to reduce the weight of the cage but also to change the material of the cage. As a material for the cage, it is desirable to use a resin material containing, for example, a fibrous reinforcing agent which is more rigid than polyamide 46 (PA46) or polyamide 66 (PA66) used in the related art. When the density of the rigid resin material does not change much, the deformation of the cage due to the centrifugal force can be suppressed according to the ratio of the improved rigidity.

However, a rigid resin material, that is, a material having a large flexural modulus (Young's modulus) generally has a low elongation in many cases. Therefore, not only is it difficult to deform during high-speed rotation, but it is also difficult to deform when assembling balls in pockets of the cage, which may shorten the service life of the cage (particularly the claw portions).

The present invention has been made in view of the above circumstances, and a primary object thereof is to provide a crown type cage for a ball bearing and a ball bearing, which reduce the strain generated in the cage when balls are inserted into the pockets of the cage and that make it possible to adopt a high-rigidity resin material.

In addition, the opening diameter of the pocket 111 of the cage 100 of the related art is designed to be narrower than the diameter of the incorporated ball. Therefore, when the balls 6 are incorporated into the cage 100, the balls 6 are incorporated while widening the pair of claw portions 112 of the cage 100 in the peripheral direction, and thus there is a possibility that excessive strain is generated in the claw portions 112 of the cage 100, shortening the service life.

As a countermeasure, it is conceivable to design the pocket opening diameter to be widened such that the cage 100 is not damaged. However, in this design, the smaller the elongation of the material used for the cage 100, the wider the pocket opening diameter should be set. When the pocket opening diameter is extremely wide, there is a possibility that the cage 100 comes off the balls 6 when subjected to axial vibration.

In addition, polyamide 6/6 or polyamide 4/6 is generally used for the crown type cage, but a material with low elongation such as polyphenylene sulfide (PPS) or polyether ether ketone (PEEK) is used in high temperature environments. In the future, when using a crown type cage in a high-speed rotation environment, it will be necessary to suppress deformation of the cage due to centrifugal force, and thus materials with higher rigidity than conventional materials, that is, materials with less elongation, will be required.

The present invention has been made in view of the above circumstances, and a secondary object thereof is to provide a crown type cage for a ball bearing and a ball bearing, which allow the cage to be incorporated into the ball incorporated into the bearing without increasing the pocket opening diameter even for materials with low elongation.

In addition, cages are used to hold balls, but resin cages, especially crown type cages, are used for the purpose of adopting motor bearings to the high rotation speed accompanying the electrification of automobiles and also reducing the weight. The resin crown type cage includes an annular main portion, a plurality of pillar portions protruding in the axial direction from the main portion at predetermined intervals in the peripheral direction, and a pocket formed between the adjacent pillar portions and capable of holding the balls. Further, the pillar portion has a pair of claw portions of which tip end portions are spaced apart from each other. The two adjacent claw portions hold the ball, thereby preventing the cage from slipping out from between the outer ring and the inner ring in the axial direction.

Between the tip end portions of the two claw portions, an inlet having a width shorter than the diameter of the ball and for insertion into the ball is provided. That is, the diameter of the inlet is designed to be narrower than the diameter of the ball which is an insertion destination. Therefore, when the cage is incorporated into the bearing, the cage is inserted into the balls while widening the claw portions of the cage in the peripheral direction. At this time, since the flat back surface of the cage is in surface contact with the pressing jig below, the claw portions are the only part of the cage that can be deformed, excessive stress is generated at the root of the claw portion when the cage is inserted into the balls, and there is a concern about the service life of the cage being shortened.

In order to deal with the above problem, the work of inserting the cage is performed by limiting the widening range of the claw portions to the extent that the decrease in service life of the cage can be suppressed. However, according to this method, the smaller the elongation of the resin material used for the cage, the larger the diameter of the inlet should be set. When the diameter of the inlet is made extremely wide, the possibility of the cage coming off the ball when subjected to axial vibration increases.

A third object of the present invention is to provide a crown type cage for a ball bearing and a ball bearing in which the cage can be smoothly inserted.

Solution to Problem

The above objects of the present invention are achieved by the following configurations.

(1) A crown type cage for a ball bearing, which is made of resin, including:
an annular main portion; a plurality of pillar portions protruding in an axial direction from the main portion at predetermined intervals in a peripheral direction; and
a spherical pocket formed between the adjacent pillar portions and capable of holding a ball, in which
the pillar portion has a pair of claw portions of which tip end portions are spaced apart from each other and a connection portion that connects the pair of claw portions, and
a bottom surface of the main portion is provided with a part protruding in the axial direction.

(2) The crown type cage for a ball bearing according to (1), in which
a first projection portion protruding in the axial direction is provided on a radially outer side portion of the bottom surface of the main portion, and
at least a part of the first projection portion overlaps the pocket in the peripheral direction and radial direction.

(3) The crown type cage for a ball bearing according to (1) or (2), in which
an inlet having a width shorter than a diameter of the ball and for inserting the ball is provided between the tip end portions of the two adjacent claw portions forming the pocket,
a radius of curvature of a spherical recessed surface of the pocket is greater than a radius of curvature of a rolling surface of the ball,
an outer diameter D1 of the claw portion is smaller than an outer diameter D2 of the main portion,
a radial width t1 of the claw portion is ½ or less of a radial width t2 of the main portion, and
an axial width H1 from an upper surface of the connection portion of the pillar portion to the bottom surface of the main portion is ½ or less of an axial width H2 of the crown type cage for a ball bearing.

(4) The crown type cage for a ball bearing according to (1) or (2), in which
the first projection portion is provided along the entire periphery on the radially outer side portion of the bottom surface of the main portion.

(5) The crown type cage for a ball bearing according to (2) or (4), in which
the bottom surface of the main portion is provided with a second projection portion protruding in the axial direction,
at least a part of the second projection portion overlaps the pocket in the peripheral direction and the radial direction, and
the first projection portion further protrudes from the second projection portion in the axial direction.

(6) The crown type cage for a ball bearing according to (5), in which
a radial range and a peripheral range in which the second projection portion is provided are substantially the same as a radial range and a peripheral range in which a recessed surface of the main portion forming the pocket is provided.

(7) The crown type cage for a ball bearing according to any one of (1) to (6), in which
the main portion is provided with an opening portion between the adjacent pockets.

(8) The crown type cage for a ball bearing according to any one of (1) to (7), in which
an axial width H1 from an upper surface of the connection portion of the pillar portion to the bottom surface of the main portion is greater than an axial width H3 of the main portion at a bottom portion of the pocket.

(9) The crown type cage for a ball bearing according to any one of (1) to (8), in which
a radial width of the claw portion decreases from the main portion side toward the tip end portion side of the claw portion.

(10) The crown type cage for a ball bearing according to any one of (1) to (9), in which
the claw portion has a first peripheral surface forming the pocket and a second peripheral surface opposite to the first peripheral surface, and
in the two adjacent claw portions that form the pocket, a peripheral distance between the two second peripheral surfaces decreases from the main portion side toward the tip end portion side of the claw portion.

(11) The crown type cage for a ball bearing according to (1), in which
a pocket opening portion having a pocket opening diameter shorter than a diameter of the ball and for inserting the ball toward the other axial side opposite to one axial side is provided between the tip end portions of the two adjacent claw portions forming the pocket,
of the tip end portions of the claw portion, a part that forms the pocket opening portion and that first contacts when the ball is inserted toward the other axial side is defined as a most tip end portion,
when the most tip end portion is positioned on a radially inner side of a radially central portion of the pocket, the bottom surface of the main portion protrudes to the other axial side at a radially outer side part of the radially central portion of the pocket compared to a radially inner side part of the radially central portion of the pocket, and
when the most tip end portion is positioned on a radially outer side of the radially central portion of the pocket, the bottom surface of the main portion protrudes to the other axial side at the radially inner side part of the radially central portion of the pocket compared to the radially outer side part of the radially central portion of the pocket.

(12) The crown type cage for a ball bearing according to (11), in which
the most tip end portion of the claw portion extends flat in the radial direction, and
the entire most tip end portion of the claw portion is disposed on the radially inner side or the radially outer side of the radially central portion of the pocket.

(13) The crown type cage for a ball bearing according to (12), in which
the entire most tip end portion of the claw portion is disposed on the radially inner side of the radially central portion of the pocket,
a projection portion that protrudes to the other axial side is provided on the bottom surface of the main portion, and the entire projection portion is disposed on the radially outer side of the radially central portion of the pocket.

(14) The crown type cage for a ball bearing according to (12), in which
the entire most tip end portion of the claw portion is disposed on the radially outer side of the radially central portion of the pocket,
a projection portion that protrudes to the other axial side is provided on the bottom surface of the main portion, and the entire projection portion is disposed on the radially inner side of the radially central portion of the pocket.

(15) The crown type cage for a ball bearing according to (12), in which
the entire most tip end portion of the claw portion is disposed on the radially inner side of the radially central portion of the pocket,
the bottom surface of the main portion is an inclined surface that protrudes to the other axial side from the radially inner side to the radially outer side, and
a radially outermost portion of the inclined surface of the bottom surface is disposed on the radially outer side of the radially central portion of the pocket.

(16) The crown type cage for a ball bearing according to (12), in which
the entire most tip end portion of the claw portion is disposed on the radially outer side of the radially central portion of the pocket,
the bottom surface of the main portion is an inclined surface that protrudes to the other axial side from the radially outer side to the radially inner side, and
a radially innermost portion of the inclined surface of the bottom surface is disposed on the radially inner side of the radially central portion of the pocket.

(17) The crown type cage for a ball bearing according to (11), in which
since the pocket opening portion protrudes to the one axial side from the radially inner side to the radially outer side, the most tip end portion is positioned at the radially outermost portion of the pocket opening portion, and
the most tip end portion is positioned on the radially outer side of the radially central portion of the pocket.

(18) The crown type cage for a ball bearing according to (17), in which
the bottom surface of the main portion is an inclined surface that protrudes to the other axial side from the radially outer side to the radially inner side, and
the radially innermost portion of the inclined surface of the bottom surface is disposed on the radially inner side of the radially central portion of the pocket.

(19) The crown type cage for a ball bearing according to (17), in which
a projection portion that protrudes to the other axial side is provided on the bottom surface of the main portion, and
the entire projection portion is disposed on the radially inner side of the radially central portion of the pocket.

(20) The crown type cage for a ball bearing according to (11), in which
since the pocket opening portion protrudes to the one axial side from the radially outer side to the radially inner side, the most tip end portion is positioned at the radially innermost portion of the pocket opening portion, and
the most tip end portion is positioned on the radially inner side of the radially central portion of the pocket.

(21) The crown type cage for a ball bearing according to (20), in which the bottom surface of the main portion is an inclined surface that protrudes to the other axial side from the radially inner side to the radially outer side, and the radially outermost portion of the inclined surface of the bottom surface is disposed on the radially outer side of the radially central portion of the pocket.

(22) The crown type cage for a ball bearing according to (20), in which a projection portion that protrudes to the other axial side is provided on the bottom surface of the main portion, and the entire projection portion is disposed on the radially outer side of the radially central portion of the pocket.

(23) The crown type cage for a ball bearing according to any one of (13), (14), (19), and (22), in which at least a part of the projection portion overlaps the pocket in the peripheral direction and the radial direction.

(24) The crown type cage for a ball bearing according to (23), in which the projection portion is provided along the entire periphery on the bottom surface of the main portion.

(25) The crown type cage for a ball bearing according to (1), which is made of resin, in which an inlet having a width shorter than a diameter of the ball and for inserting the ball is provided between the tip end portions of the two adjacent claw portions with the pocket interposed therebetween, and at least one protruding portion is formed to protrude in the axial direction from the bottom surface of the main portion at a position corresponding to the pocket in the peripheral direction.

(26) The crown type cage for a ball bearing according to (25), in which the bottom surface faces another facing member when the crown type cage for a ball bearing is used, and a protrusion height of the protruding portion in the axial direction is smaller than an axial distance from the bottom surface to the other facing member.

(27) The crown type cage for a ball bearing according to (25) or (26), in which the protruding portion is formed at a position on a centerline of the pocket in the peripheral direction.

(28) The crown type cage for a ball bearing according to (25) or (26), in which a plurality of the protruding portions are formed symmetrically with respect to the centerline at positions off the position on the centerline of the pocket in the peripheral direction.

(29) The crown type cage for a ball bearing according to any one of (25) to (28), in which the bottom surface faces another facing member when the crown type cage for a ball bearing is used, two bottom surface intermediate positions P2 of the bottom surface positioned on an intermediate position between each of other two pockets that the pocket is adjacent in the peripheral direction, and a facing member center position P3 positioned on the centerline of the pocket in the peripheral direction of the other facing member are defined, and a tip end portion of the protruding portion is positioned in a region surrounded by a line segment P2-P2 and two line segments P2-P3 in the peripheral direction.

(30) The crown type cage for a ball bearing according to any one of (25) to (29), in which the protruding portion is formed in a region of the width of the inlet in the peripheral direction.

(31) The crown type cage for a ball bearing according to (1), which is made of resin, in which an inlet having a width shorter than a diameter of the ball and for inserting the ball is provided between the tip end portions of the two adjacent claw portions with the pocket interposed therebetween, and at least two inclined surfaces inclined in the axial direction are formed on the bottom surface of the main portion, and the two inclined surfaces intersect to form a top portion.

(32) The crown type cage for a ball bearing according to (31), in which the bottom surface faces another facing member when the crown type cage for a ball bearing is used, the inclined surface is defined between the top portion and a bottom portion furthest from the top portion in the axial direction, and an inclination height of the inclined surface in the axial direction is smaller than an axial distance from the bottom portion to the other facing member.

(33) The crown type cage for a ball bearing according to (31) or (32), in which the top portion is formed at a position on a centerline of the pocket in the peripheral direction.

(34) The crown type cage for a ball bearing according to any one of (31) to (33), in which the bottom surface faces another facing member when the crown type cage for a ball bearing is used, two bottom surface intermediate positions P2 of the bottom surface positioned on an intermediate position between each of other two pockets that the pocket is adjacent in the peripheral direction, and a facing member center position P3 positioned on the centerline of the pocket in the peripheral direction of the other facing member are defined, and the two inclined surfaces are positioned in a region surrounded by a line segment P2-P2 and two line segments P2-P3 in the peripheral direction.

(35) The crown type cage for a ball bearing according to any one of (1) to (34), composed of thermoplastic resin.

(36) The crown type cage for a ball bearing according to any one of (1) to (34), composed of thermoplastic resin to which a fiber-reinforced material is added.

(37) The crown type cage for a ball bearing according to any one of (1) to (34), composed of a resin composition containing polyamide 9T and a fiber-reinforced material.

(38) The crown type cage for a ball bearing according to any one of (1) to (34), composed of a resin composition containing polyamide 10T and a fiber-reinforced material.

(39) A ball bearing including:

an outer ring;

an inner ring;

a plurality of the balls arranged between the outer ring and the inner ring; and the crown type cage for a ball bearing according to any one of (1) to (38).

Advantageous Effects of Invention

With the crown type cage for a ball bearing and the ball bearing of the present invention, it is possible to reduce the strain generated in the cage when inserting the balls into the pockets of the cage, and thus it is possible to use a highly rigid resin material, which has been difficult to use for the cage in the past.

BRIEF DESCRIPTION OF DRAWINGS

FIG. 33A shows a cage of the related art, FIG. 33B shows a cage of a comparative example, and FIG. 33C shows a cage of an example.

FIG. 62B is a view of the cage viewed from the peripheral direction, and FIG. 62C is a view of the cage viewed from one axial side (upper side).

FIG. 63B is a view of the cage viewed from the peripheral direction, and FIG. 63C is a view of the cage viewed from one axial side (upper side).

DESCRIPTION OF EMBODIMENTS

Figure 1:
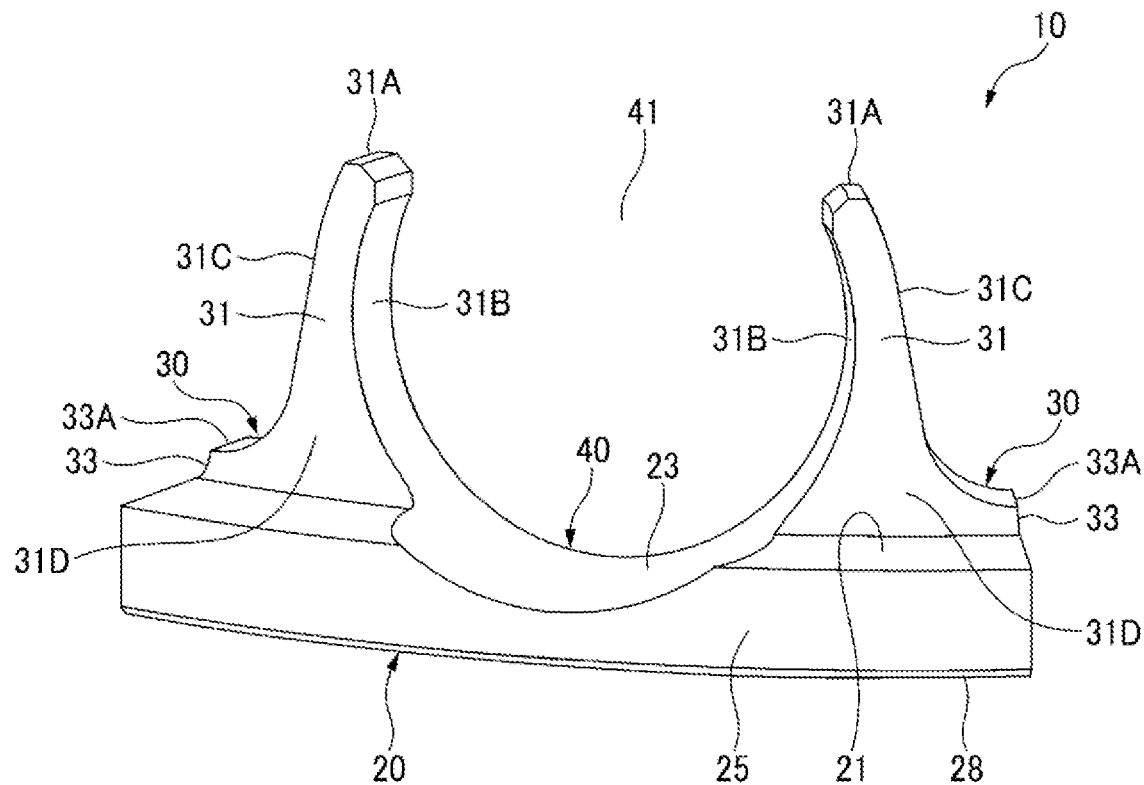
FIG. 1 is a perspective view of a part of a cage according to a first embodiment.
Figure 2:
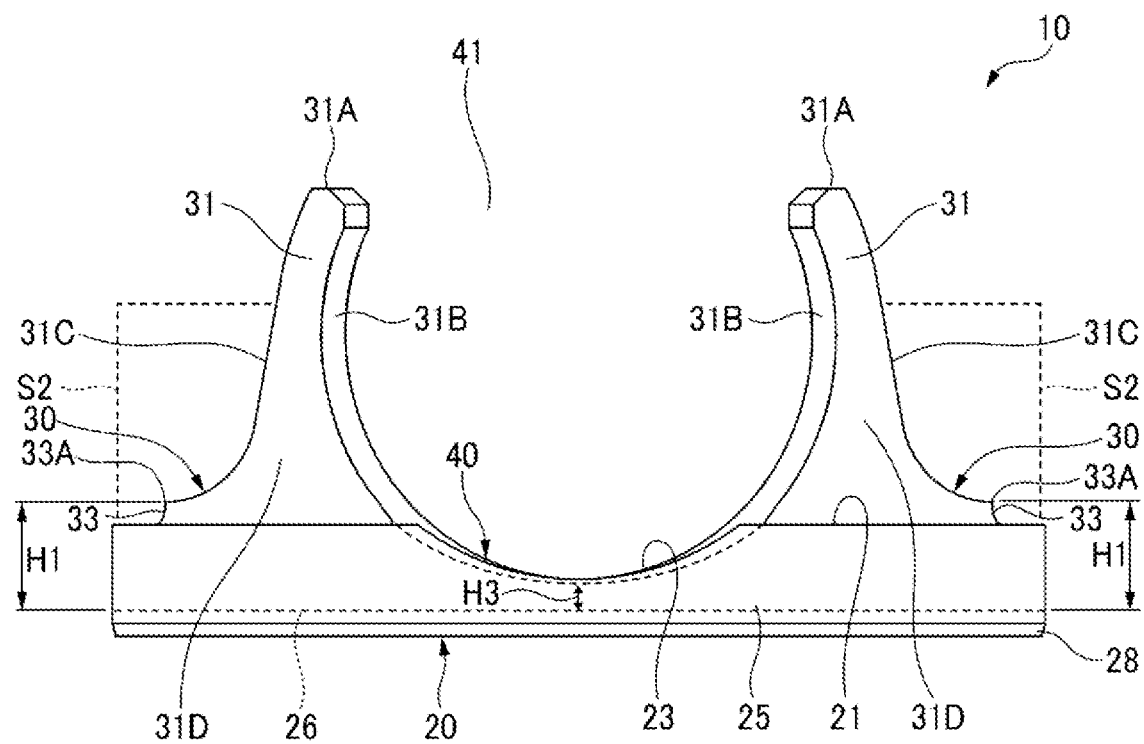
FIG. 2 is a view of a part of the cage according to the first embodiment viewed from a radially outer side.

A crown type cage for a ball bearing and a ball bearing according to one embodiment of the present invention will be described below with reference to the drawings.

First Embodiment

As shown in FIGS. 1 to 5, a crown type cage for a ball bearing (hereinafter also referred to as a "crown type cage" or simply a "cage") 10 of the present embodiment can be applied to a ball bearing 1 shown in FIG. 34 similarly to a cage 100 of the related art shown in FIGS. 35 and 36.

As an example of the material for the crown type cage 10, a resin composition obtained by adding 10 to 50% by weight of a fiber-reinforced material (for example, glass fiber or carbon fiber) to resins such as polyamide resins (for example, polyamide 46 and polyamide 66), polybutylene terephthalate, polyphenylene sulfide (PPS), polyetheretherketone (PEEK), and polyethernitrile (PEN).

As the material of the cage 10, a resin material having a higher flexural modulus than polyamide 46 or polyamide 66 can also be used.

Specifically, the cage 10 may be made of a resin composition containing polyamide 9T (PA9T) and a fiber-reinforced material. The fiber-reinforced material is preferably carbon fibers having a fiber diameter of 6 μm or more and 8 μm or less, which are added to the resin composition at a ratio of 15% by mass or more and 35% by mass or less. As the carbon fiber, it is preferable to use a PAN-based one obtained by sintering acrylonitrile fiber. Polyamide 9T can be obtained by adding carbon fiber "Torayca (registered trademark) middle fiber" manufactured by Toray Industries, Inc. to PAST "Genestar (registered trademark)" manufactured by Kuraray Co., Ltd.

The cage 10 may be made of a resin composition containing polyamide 10T (PA10T) and a fiber-reinforced material. The fiber-reinforced material is preferably glass fiber having a fiber diameter of 6 μm or more and 13 μm or less, which is added at a ratio of 20% by mass or more and 50% by mass or less in the resin composition, or a carbon fiber having a fiber diameter of 5 μm or more and 9 μm or less, which is added at a ratio of 20% by mass or more and 35% by mass or less in the resin composition. Furthermore, the cage 10 preferably contains at least one of copper iodide and potassium iodide as an iodide-based heat stabilizer. As polyamide 10T, "XecoT (registered trademark)" manufactured by Unitika Ltd. containing glass fiber can be used.

As a method for manufacturing the cage 10, a method of injection molding using a mold and a manufacturing method with a 3D printer are exemplified. When the injection molding method is used, an annular cavity corresponding to the bearing cage, which is a molded body, is formed in the molding die, a melted resin material (thermoplastic resin) is injected from a resin injection gate provided at the peripheral edge portion of the cavity, the resin material is cooled and solidified, and accordingly, the cage 10 is manufactured.

Figure 34:
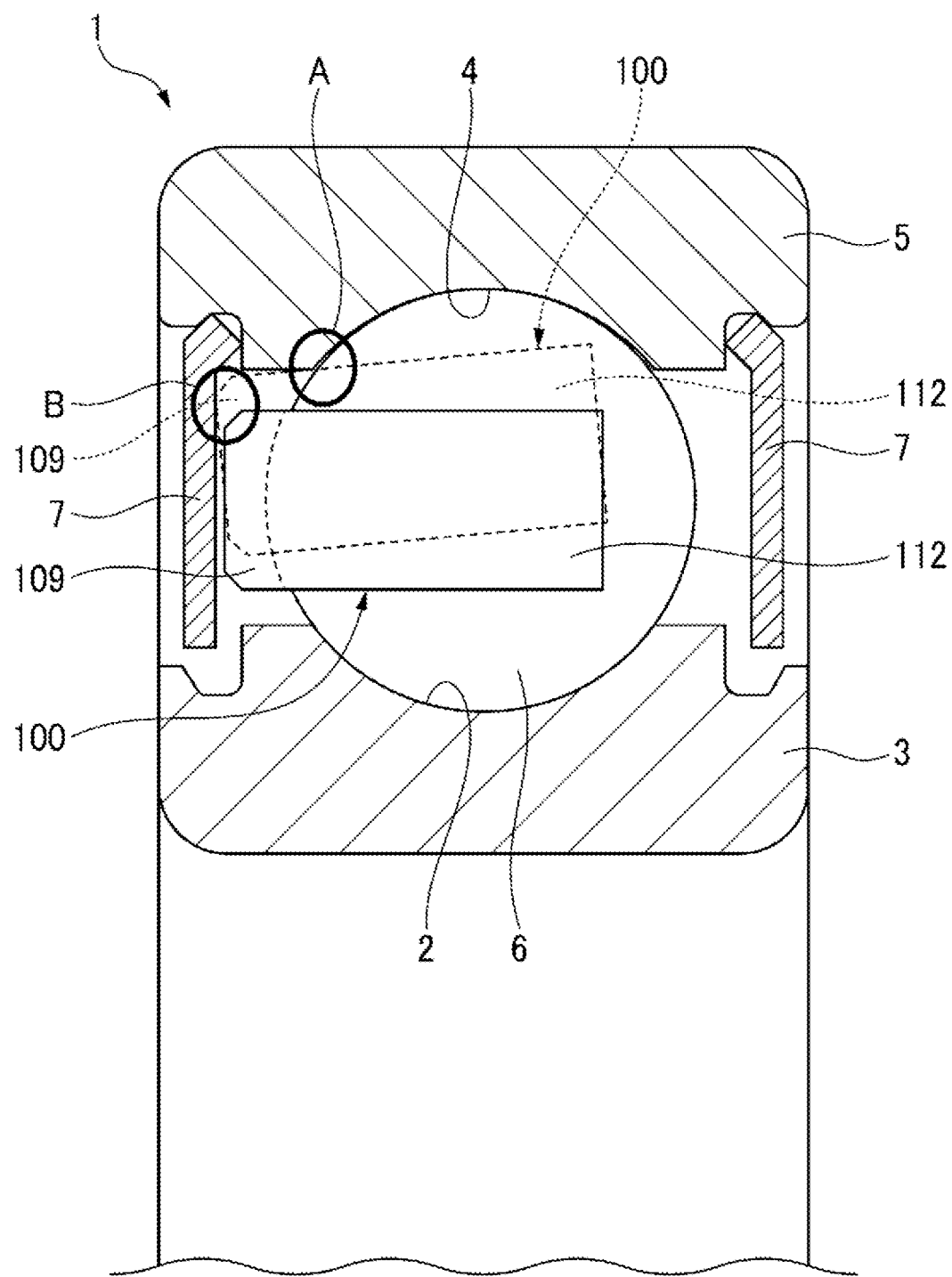
FIG. 34 is a cross-sectional view of a ball bearing according to the related art.

The crown type cage 10 includes an annular main portion 20, a plurality of pillar portions 30 protruding in the axial direction from an upper surface 21 of the main portion 20 at predetermined intervals in the peripheral direction, and a spherical pocket 40 formed between the adjacent pillar portions 30 and 30 and capable of holding balls 6 (refer to FIG. 34).

A plurality of spherical recessed surfaces 23 are formed on the upper surface 21 of the main portion 20 at predetermined intervals in the peripheral direction. This recessed surface 23 is formed over the entire radial width of the main portion 20 and forms the pocket 40.

The pillar portion 30 protrudes in the axial direction from the radially inner side portion of the upper surface 21 of the main portion 20. Therefore, the upper surface 21 of the main portion 20 is exposed on the radially outer side of the pillar portion 30. In the crown type cage 100 (refer to FIG. 34) of the related art, a pillar portion 110 protrudes in the axial direction from the entire radial width of an upper surface of a main portion 109, and thus the pillar portion 30 of the present application is different in this respect. That is, in the present application, a configuration is adopted in which a region on the radially outer side (region S1 indicated by a broken line in FIG. 4) of the pillar portion 30 (claw portion 31) is cut.

The pillar portion 30 has a pair of claw portions 31 and 31 and a connection portion 33 that connects the pair of claw portions 31 and 31.

Tip end portions 31A and 31A of the pair of claw portions 31 and 31 are spaced apart from each other in the peripheral direction. In addition, between the tip end portions 31A and 31A of the two adjacent claw portions 31 and 31 forming the pocket 40, an inlet 41 having a width shorter than the diameter of the ball 6 (refer to FIG. 34) and for inserting the ball 6 is provided.

The claw portion 31 has a spherical first peripheral surface 31B forming the pocket 40 and a second peripheral surface 31C opposite to the first peripheral surface 31B.

The second peripheral surfaces 31C and 31C of the pair of claw portions 31 and 31 are curved, respectively, and smoothly connected to an upper surface 33A of the connection portion 33. The upper surface 33A of the connection portion 33 corresponds to a substantially U-shaped bottom portion formed by the pair of second peripheral surfaces 31C and 31C. The upper surface 33A of the connection portion 33 (the bottom portions of the pair of second peripheral surfaces 31C and 31C) is positioned slightly above (on one axial side) the upper surface 21 of the main portion 20 (refer to FIG. 4). Therefore, the pair of second peripheral surfaces 31C and 31C form a substantially U-shaped recess portion with the bottom portions (the upper surface 33A of the connection portion 33) positioned relatively below (on the other axial side). In the crown type cage 100 of the related art (refer to FIG. 35), the upper surface of the connection portion (the bottom portions of the pair of second peripheral surfaces) is positioned considerably above the upper surface of the main portion 109. That is, in the present application, a configuration is adopted in which a region interposed between the second peripheral surfaces 31C and 31C of the pair of claw portions 31 and 31 (a region S2 indicated by broken lines in FIG. 2) is cut.

The first peripheral surfaces 31B and 31B of the two adjacent claw portions 31 and 31 and the recessed surface 23 of the main portion 20 form the pocket 40. These two first peripheral surfaces 31B and 31B and the recessed surface 23 are smoothly connected to each other to form the spherical recessed surface of the pocket 40. The radius of curvature of the spherical recessed surface of pocket 40 is set larger than the radius of curvature of the rolling surface of the ball 6 (refer to FIG. 34).

In this manner, since the plurality of pockets 40 are connected by the main portion 20, when a centrifugal force is applied to the cage 10 during high-speed rotation, the cage 10 tends to be tilted to the radially outer side around the main portion 20. In order to suppress this tilt, in the present application, the regions S1 and S2 are cut as described above.

$F=mr\omega^2$ where F is the centrifugal force, m is the mass, r is the distance from a rotation shaft to a rotating object (the cage 10), and ω is the angular velocity. The stress σ generated in the cage 10 (especially the bottom portion of the pocket 40) and the deformation amount δ of the cage 10 are approximately proportional to the centrifugal force F. Therefore, when the axial width of the ball bearing 1, the inner diameter of the inner ring 3, and the outer diameter of the outer ring 5 are constant, it is necessary to reduce the mass m of the cage 10 in order to reduce the stress σ and the deformation amount δ. Further, since the deformation amount δ of the cage 10 is substantially inversely proportional to the rigidity of the cage 10, when the shape of the cage 10 does not change, the rigidity of the cage 10, that is, the Young's modulus may be increased.

Figure 4:
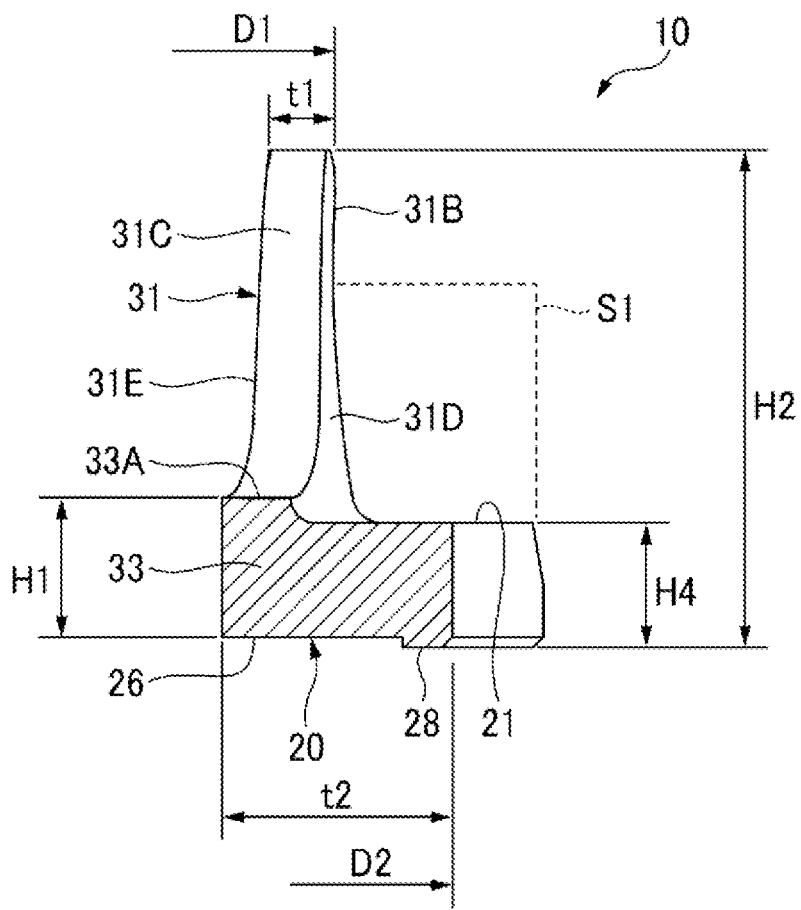
FIG. 4 is a partial cross-sectional perspective view of a part of the cage according to the first embodiment.

As shown in FIG. 4, an outer diameter D1 of the claw portion 31 is set smaller than an outer diameter D2 of the main portion 20. That is, an outer peripheral surface 31D of the claw portion 31 (the pillar portion 30) is positioned inside an outer peripheral surface 25 of the main portion 20 by (D2−D1) in the radial direction. In addition, an inner peripheral surface 31E of the claw portion 31 (pillar portion 30) is smoothly connected to an inner peripheral surface 24 of the main portion 20 and forms an inner peripheral surface of the cage 10 without a step. Furthermore, a radial width t1 of the claw portion 31 is set to ½ or less of a radial width t2 of the main portion 20. By setting D1<D2 and t1≤(t2/2) in this manner, a configuration is adopted in which the region S1 on the radially outer side of the claw portion 31 (pillar portion 30) is cut.

Further, an axial width H1 from the upper surface 33A of the connection portion 33 of the pillar portion 30 to a bottom surface 26 of the main portion 20 is set to ½ or less of an axial width H2 of the cage 10. By setting H1≤(H2/2) in this manner, a configuration is adopted in which the region S2 on the back surface side of the claw portion 31 (the opposite side of the pocket 40, the second peripheral surface 31C side) is cut.

Figure 5:
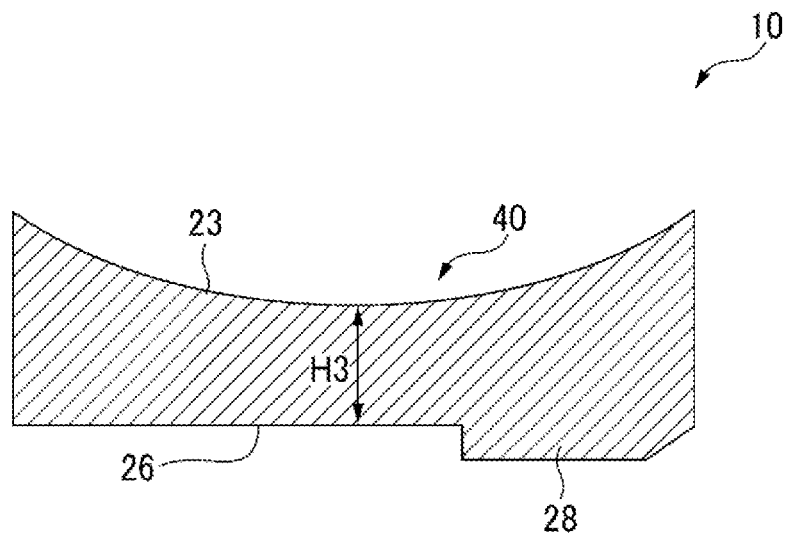
FIG. 5 is a cross-sectional view of a part of the cage according to the first embodiment.
Figure 6:
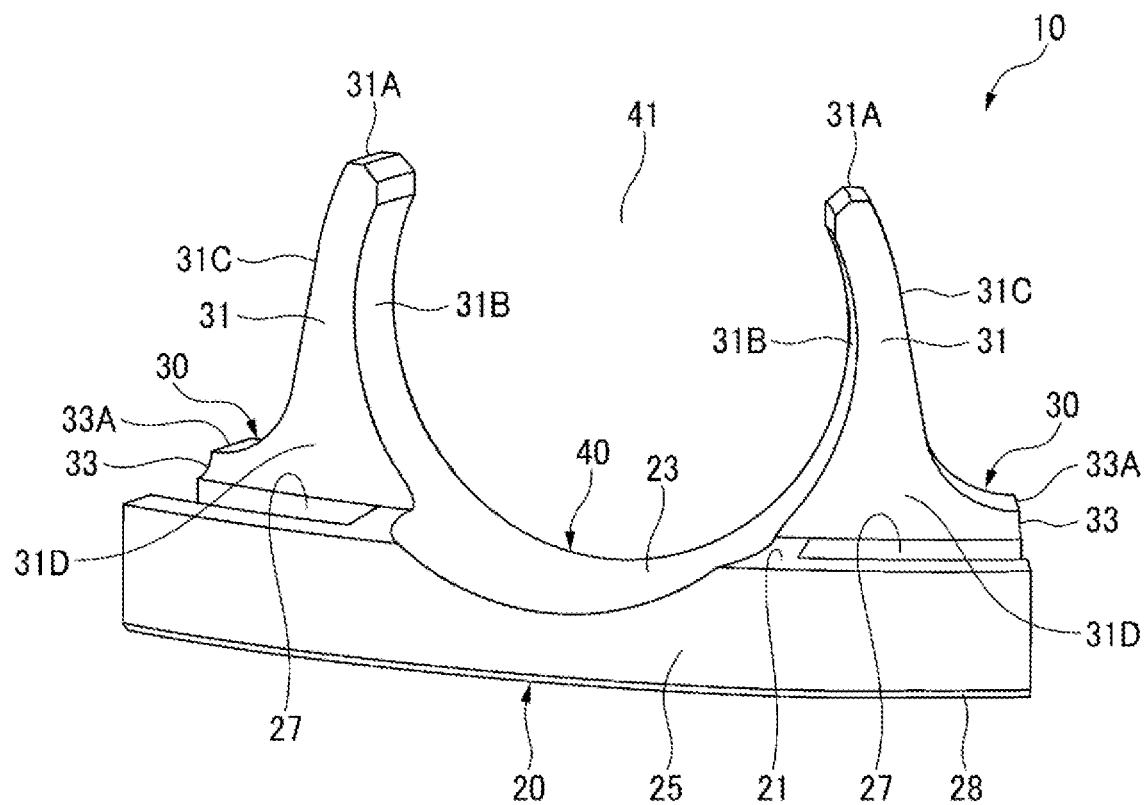
FIG. 6 is a perspective view of a part of a cage according to a second embodiment.
Figure 7:
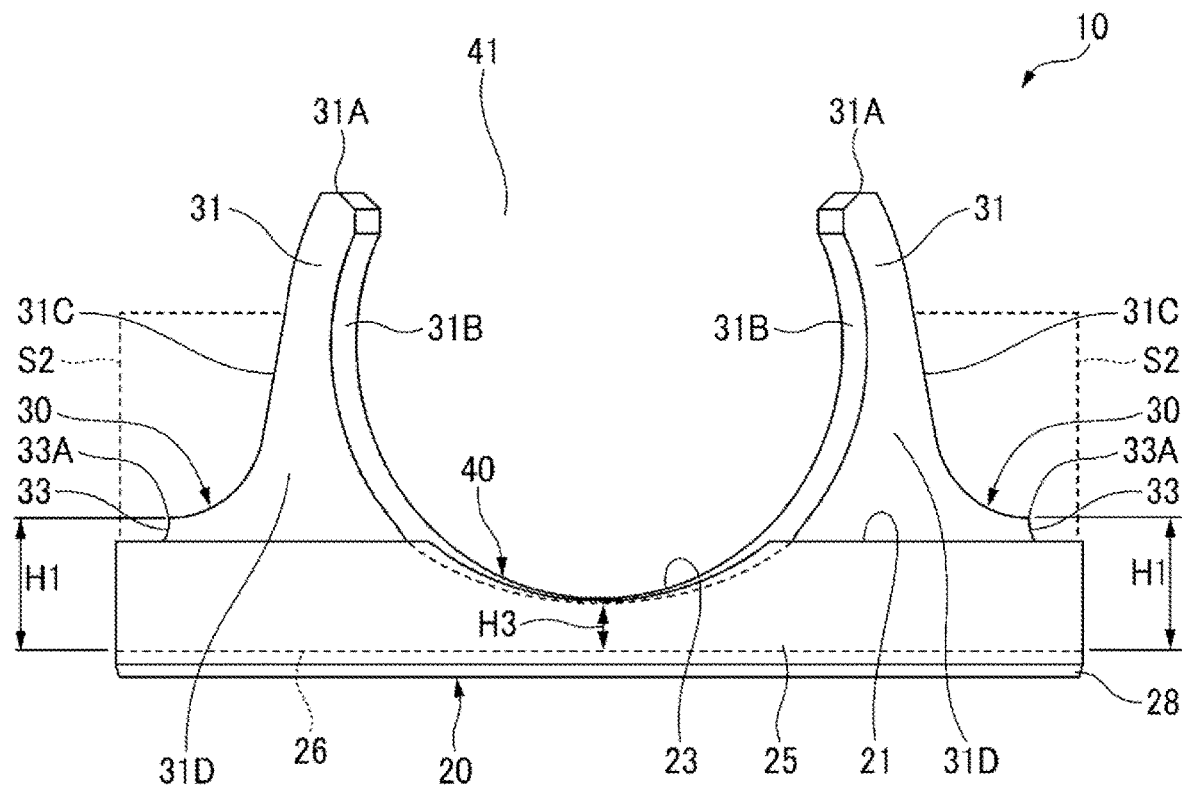
FIG. 7 is a view of a part of the cage according to the second embodiment viewed from the radially outer side.
Figure 8:
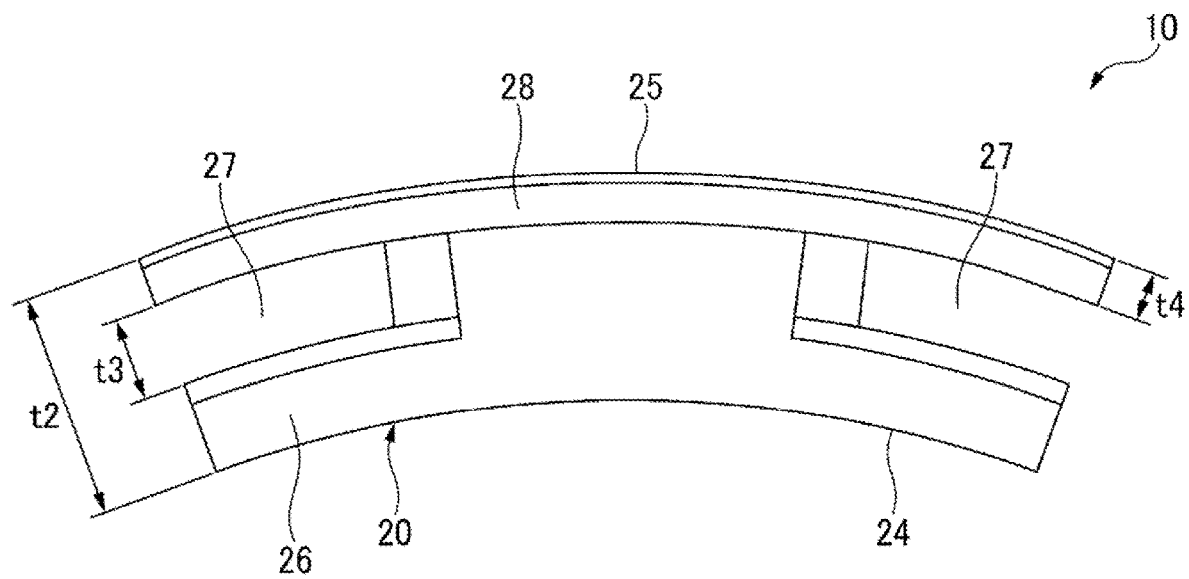
FIG. 8 is a view of a part of the cage according to the second embodiment viewed from the bottom surface side.
Figure 9:
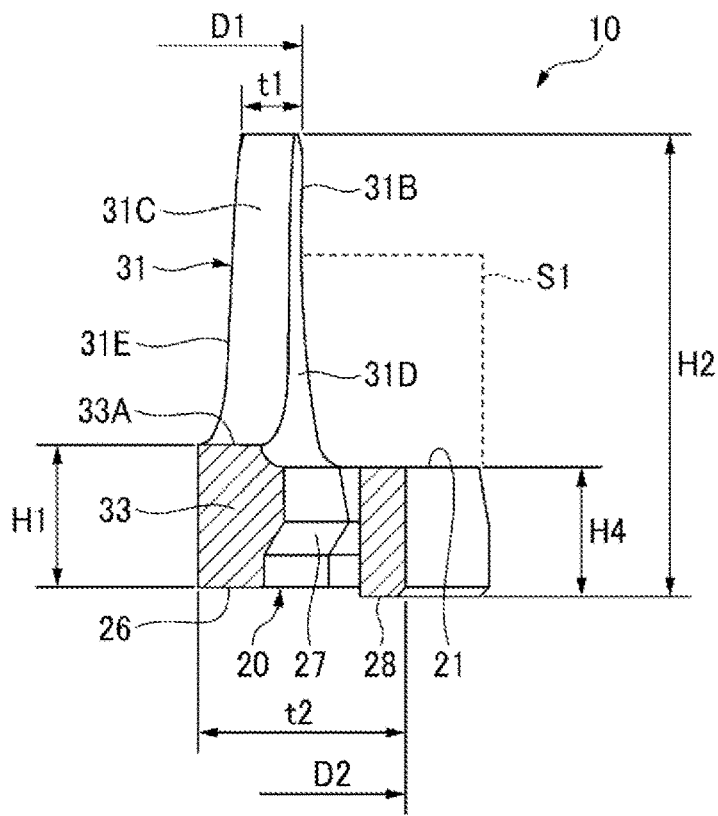
FIG. 9 is a partial cross-sectional perspective view of a part of the cage according to the second embodiment.
Figure 10:
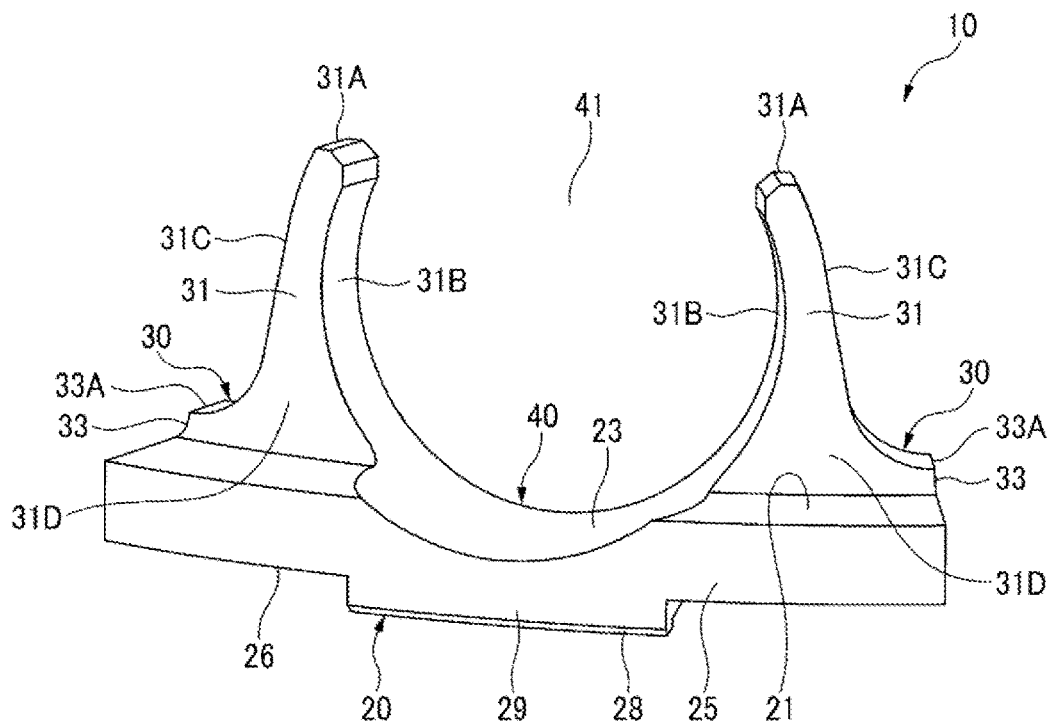
FIG. 10 is a perspective view of a part of a cage according to a third embodiment.

Note that, when the axial width H1 is extremely small, there is a possibility that the strength of the cage 10 decreases, or there is a possibility that the resin does not flow and voids are generated when the cage 10 is manufactured by injection molding. The radial width of each part of the cage 10 is preferably 1 mm or more. Therefore, the axial width H1 is preferably larger than an axial width H3 (refer to FIG. 2) of the main portion 20 at the bottom portion of the pocket 40 (H1>H3), and is more preferably larger than an axial width H4 (refer to FIG. 4) of the part of the main portion 20 where the pocket 40 (recessed surface 23) is not formed (H1>H4). FIG. 5 shows a cross-sectional view of the cage 10 taken along a plane passing through the lowermost surface of the recessed surface 23 of the pocket 40. The axial width H3 is the distance between the lowermost surface of the recessed surface 23 of the pocket 40 and the bottom surface 26 of the main portion 20. That is, the axial width H3 is the axial width of the part of the main portion 20 that has the shortest axial width. In this manner, the dimensional relationship in the axial direction preferably satisfies H3<H4<H1≤(H2/2).

With the cage 10 of the present embodiment, since D1<D2, t1≤(t2/2), and H1≤(H2/2) are satisfied, the weight of the cage 10 can be reduced and deformation can be suppressed. Therefore, the cage 10 can be prevented from coming into contact with the outer ring 5, the shield plate 7, and the like, and wear, vibration, and heat generation of the cage 10 can be suppressed.

Furthermore, in order to reduce strain (stress) generated in the cage 10 when the cage 10 is incorporated into the ball bearing 1, the bottom surface 26 of the main portion 20 of the cage 10 is provided with a part protruding in the axial direction. More specifically, the bottom surface 26 is provided with a first projection portion 28 protruding in the axial direction.

Figure 3:
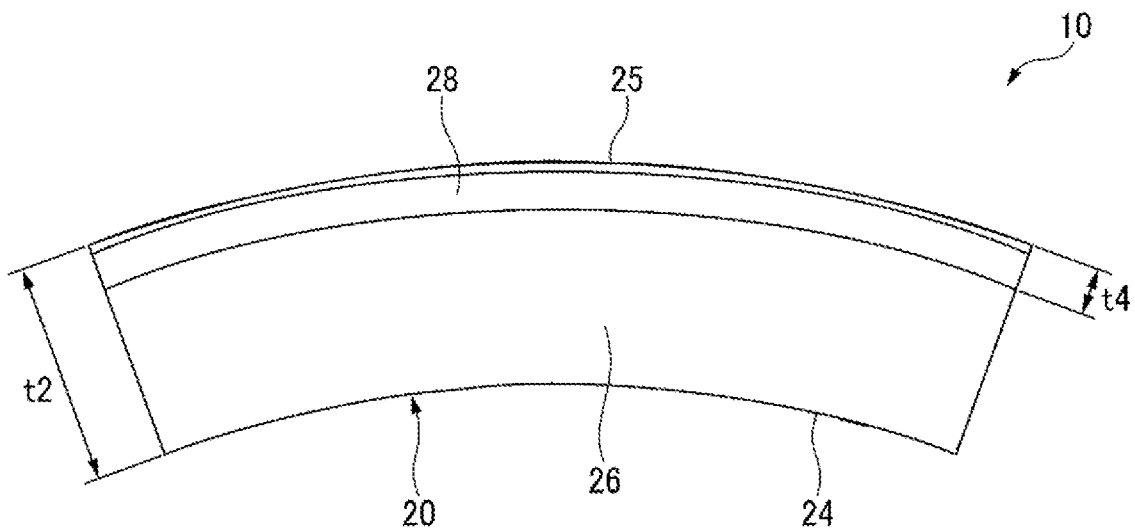
FIG. 3 is a view of a part of the cage according to the first embodiment viewed from the bottom surface side.

The first projection portion 28 protrudes in the axial direction (the direction opposite to the direction in which the claw portion 31 extends) from the radially outer side portion of the bottom surface 26 of the main portion 20. The first projection portion 28 of the present embodiment is provided on the radially outer side portion of the bottom surface 26 of the main portion 20 over the entire periphery. As shown in FIGS. 3 and 4, a radial width t4 of the first projection portion 28 is set relatively smaller than the radial width t2 of the bottom surface 26 of the main portion 20, the first projection portion 28 and the claw portion 31 do not overlap in the radial direction. Accordingly, when the ball 6 is inserted into the pocket 40 of the cage 10, the claw portion 31 is tilted to the radially inner side, and thus the entire claw portion 31 forming the pocket 40 widens uniformly, and the strain (stress) generated in the cage 10 can be reduced.

In addition, in the specification, there is a part where it is described for the sake of convenience that "the balls 6 are inserted into the pockets 40 of the cage 10," but more precisely, instead of inserting the balls 6 into each pocket 40 of the cage 10, the cage 10 is incorporated into the ball bearing 1 by fitting the cage 10 into the plurality of balls 6 arranged between the inner ring 3 and the outer ring 5 of the ball bearing 1. It should be noted that the following description also describes "the ball 6 is inserted into the pocket 40," "the ball 6 is pushed into the pocket 40," and the like, but these are for the sake of convenience.

Note that the first projection portion 28 does not necessarily have to be provided over the entire periphery of the bottom surface 26 of the main portion 20, and at least a part of the first projection portion 28 may be provided at a position overlapping the pocket 40 in the peripheral direction and the radial direction (a position overlapping the pocket 40 when viewed from the axial direction). In this case, the plurality of first projection portions 28 are preferably provided at predetermined intervals in the peripheral direction at positions overlapping the pockets 40 in the peripheral direction and the radial direction (positions overlapping the pockets 40 when viewed from the axial direction). Even in this case, when the ball 6 is inserted into the pocket 40 of the cage 10, the claw portion 31 is tilted to the radially inner side, and thus the entire claw portion 31 forming the pocket 40 widens uniformly, and the strain (stress) generated in the cage 10 can be reduced.

Second Embodiment

FIGS. 6 to 9 disclose a cage 10 according to a second embodiment. The cage 10 of the present embodiment differs from the cage 10 of the first embodiment in that an opening portion 27 is provided in the main portion 20. Since the rest of the configuration is the same as that of the above-described embodiment, the description thereof will be omitted by attaching reference numerals to the drawings.

The opening portion 27 is provided in the main portion 20 between the adjacent pockets 40 and 40. The opening portion 27 penetrates the bottom surface 26 from the upper surface 21 of the main portion 20 in the axial direction. The opening portion 27 is positioned on the radially outer side of the pillar portion 30 (the pair of claw portions 31 and 31).

That is, at least a part of the opening portion 27 overlaps the pillar portion 30 (the pair of claw portions 31 and 31) in the peripheral direction. A shown peripheral wall portion of the opening portion 27 is composed of a stepped surface, a tapered surface, or the like, but the shape is not particularly limited. Noted that the case where the peripheral wall portion of the opening portion 27 is configured by a stepped surface, a tapered surface, or the like is preferable because the cage 10 can be easily removed from the mold during injection molding, compared to the case where the peripheral wall portion is configured by a simple flat surface.

When a radial width t3 (refer to FIG. 8) of the opening portion 27 becomes extremely large, there is a possibility that the radial width (for example, a radial width t4 of the first projection portion 28) of other parts of the cage 10 becomes small, the strength decreases, and the resin does not flow and voids are generated when the cage 10 is manufactured by injection molding. Therefore, the width of each part of the cage 10 is preferably 1 mm or more. Therefore, the radial width t3 of the opening portion 27 is preferably approximately $(t2/3) \leq t3 \leq (t2/2)$ with respect to the radial width t2 of the main portion 20.

According to the present embodiment, since the opening portions 27 are formed, the weight of the cage 10 can be reduced and deformation can be suppressed. Therefore, the cage 10 can be prevented from coming into contact with the outer ring 5, the shield plate 7, and the like, and wear, vibration, and heat generation of the cage 10 can be suppressed.

Third Embodiment

FIGS. 10 to 13 disclose a cage 10 according to a third embodiment. The cage 10 of the present embodiment differs from the cage 10 of the first embodiment in that the bottom surface 26 of the main portion 20 is provided with a second projection portion 29. Since the rest of the configuration is the same as that of the first embodiment, the description thereof will be omitted by attaching reference numerals to the drawings.

The bottom surface 26 of the main portion 20 is provided with the second projection portion 29 that protrudes in the axial direction (the direction opposite to the direction in which the claw portion 31 extends). The second projection portion 29 is provided such that at least a part thereof overlaps the pocket 40 in the peripheral direction and the radial direction. That is, the bottom surface 26 of the main portion 20 has the plurality of second projection portions 29 formed at predetermined intervals in the peripheral direction below the plurality of pockets 40.

The second projection portion 29 preferably overlaps the pocket 40 in the peripheral direction and the radial direction. That is, the peripheral range and the radial range in which the second projection portion 29 is provided are preferably substantially the same as the peripheral range and the radial range in which the recessed surface 23 of the main portion 20 forming the pocket 40 is provided. In this case, a radial width t5 and a peripheral width L2 of the second projection portion 29 are substantially the same as the radial width of the recessed surface 23 of the main portion 20 (the radial width t2 of the main portion 20) forming the pocket 40 and a peripheral width L1.

Figure 11:
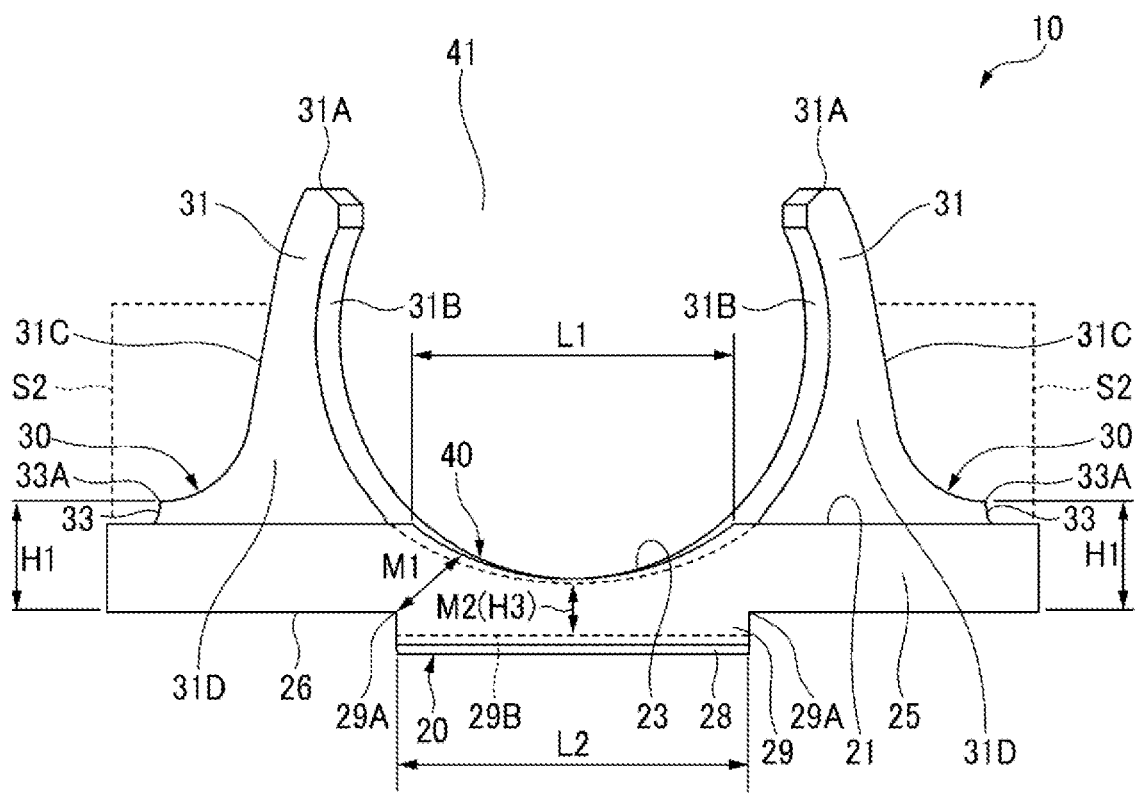
FIG. 11 is a view of a part of the cage according to the third embodiment viewed from a radially outer side.
Figure 12:
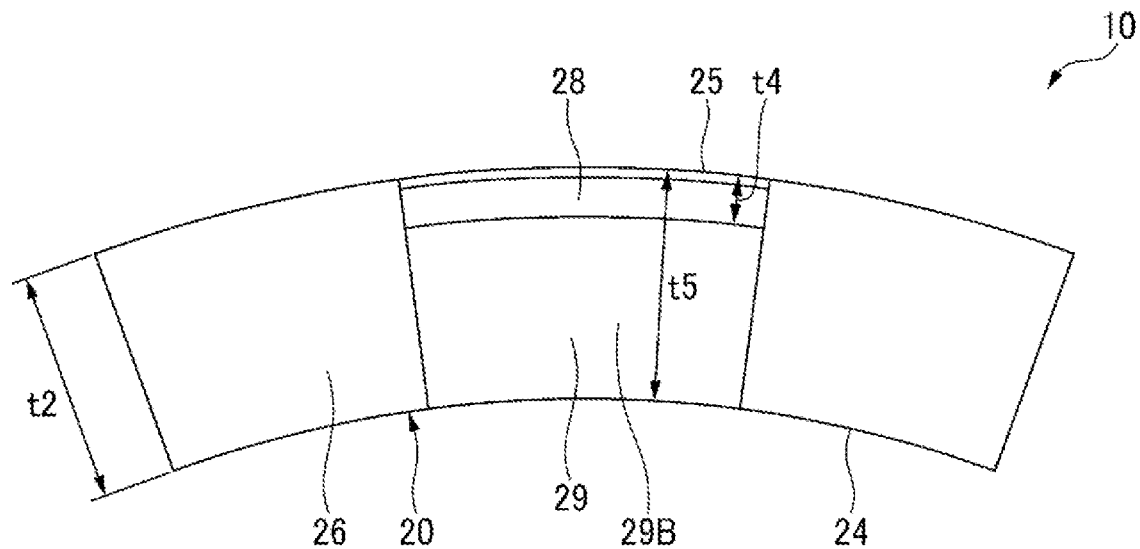
FIG. 12 is a view of a part of the cage according to the third embodiment viewed from the bottom surface side.
Figure 13:
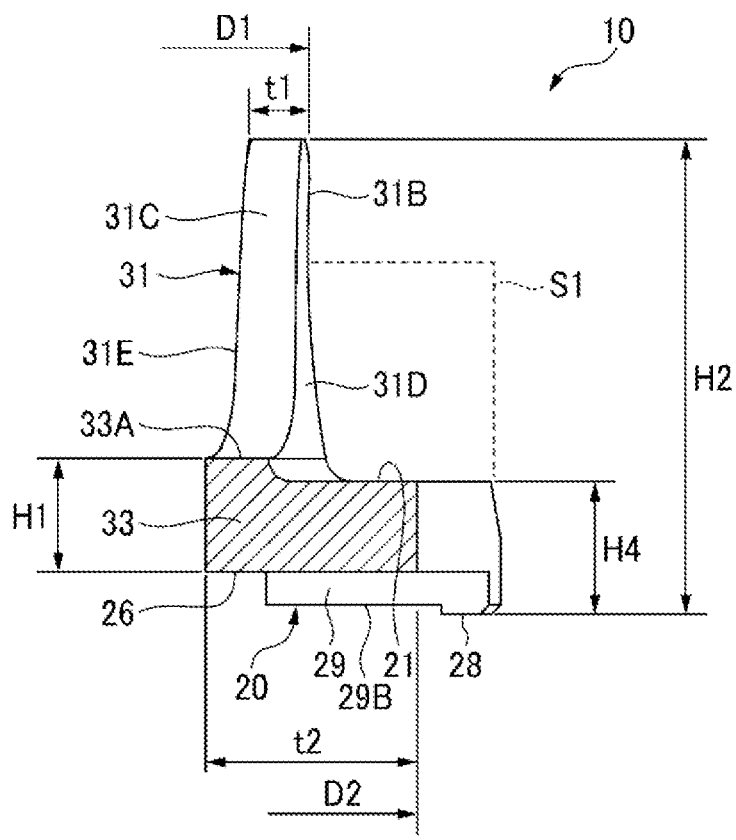
FIG. 13 is a partial cross-sectional perspective view of a part of the cage according to the third embodiment.
Figure 14:
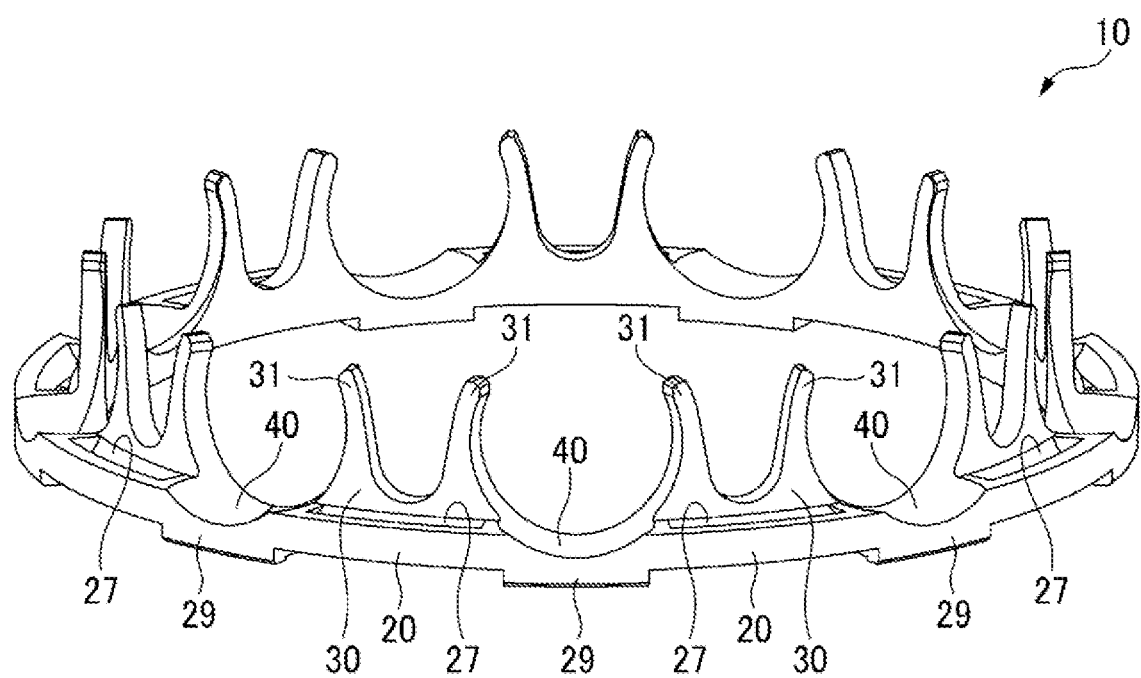
FIG. 14 is a perspective view of a cage according to a fourth embodiment.
Figure 15:
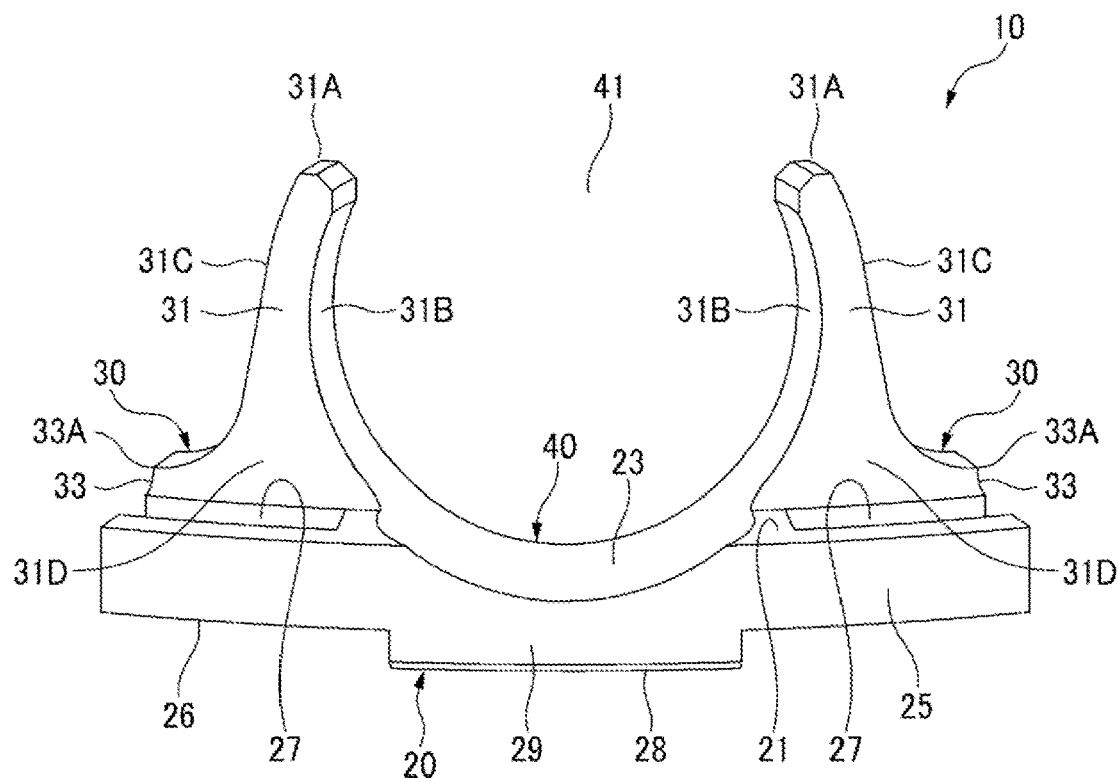
FIG. 15 is a perspective view of a part of the cage according to the fourth embodiment.
Figure 16:
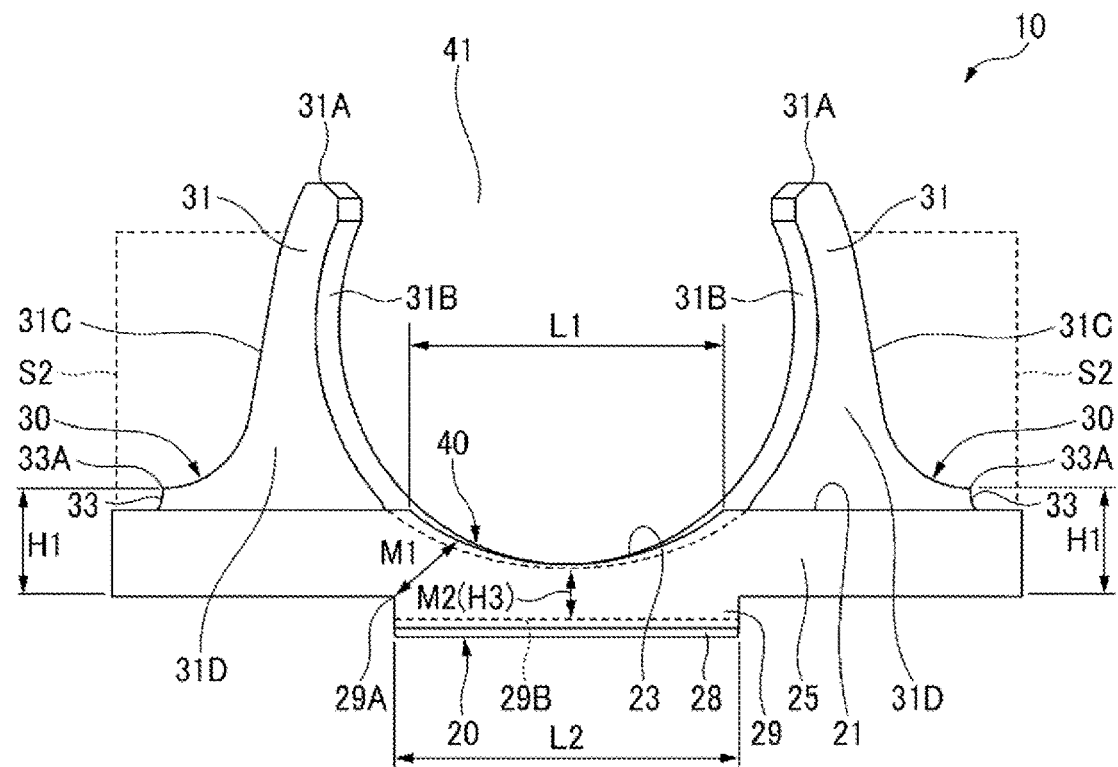
FIG. 16 is a view of a part of the cage according to the fourth embodiment viewed from the radially outer side.
Figure 17:
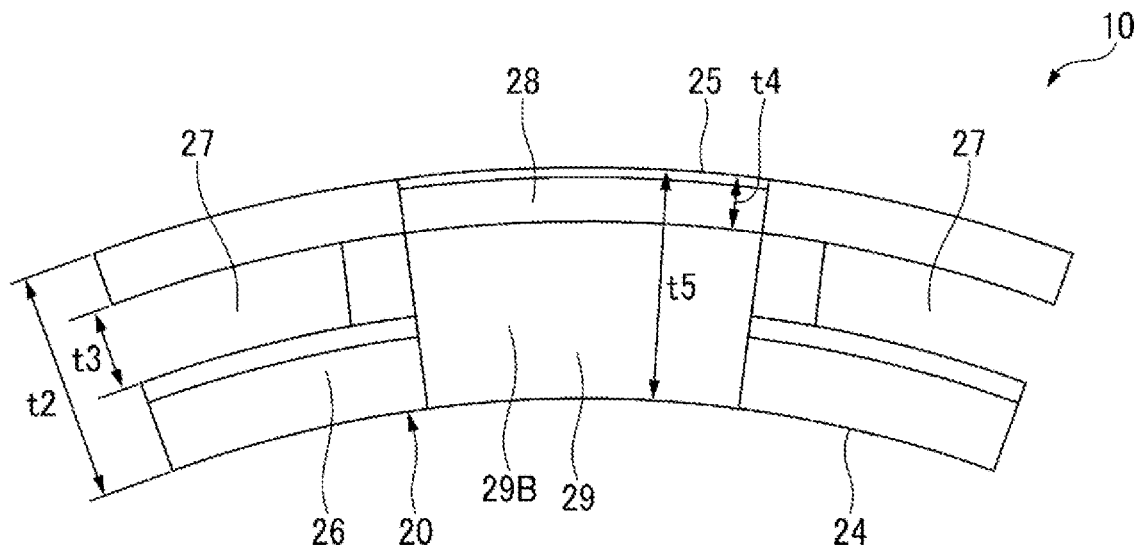
FIG. 17 is a view of a part of the cage according to the fourth embodiment viewed from the bottom surface side.
Figure 18:
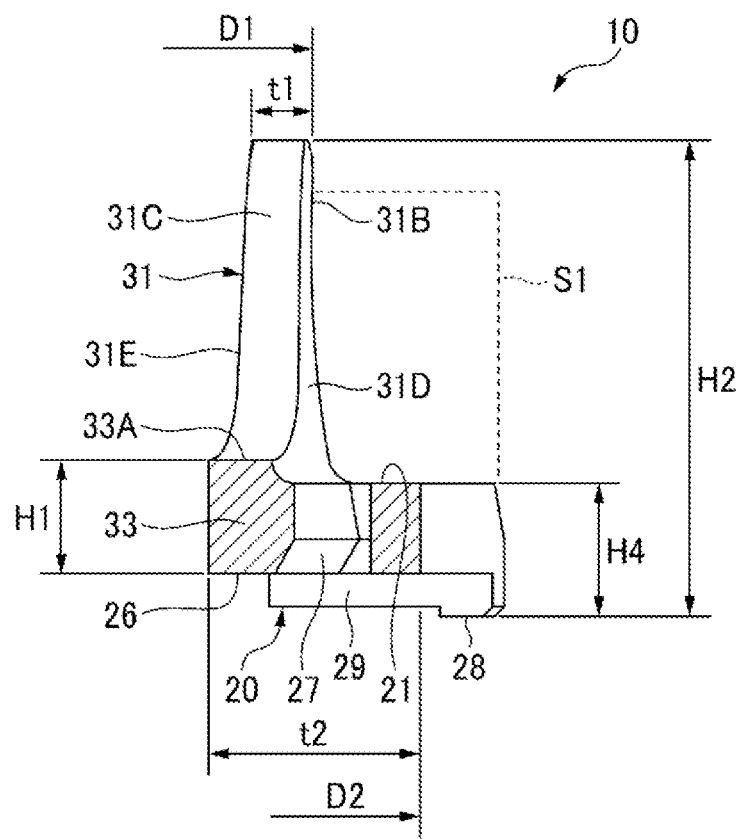
FIG. 18 is a partial cross-sectional perspective view of a part of the cage according to the fourth embodiment.

As shown in FIG. 11, when the shortest distance between root portions 29A at both end portions in the peripheral direction of the second projection portion 29 and the recessed surface 23 of the main portion 20 forming the pocket 40 is defined as M1, and the shortest distance between a tip end surface (bottom surface) 29B of the second projection portion 29 and the recessed surface 23 is defined as M2, M1>M2 is preferable. This is because, when the shortest distance M1 is reduced, the stress generated in the pocket 40 by centrifugal force will be higher on the recessed surface 23 of a section A than on the recessed surface 23 of a section B shown in FIG. 19.

Further, the first projection portion 28 of the present embodiment further protrudes in the axial direction (the direction opposite to the direction in which the claw portion 31 extends) from the tip end surface (bottom surface) 29B of the second projection portion 29. That is, the first projection portion 28 does not extend directly from the bottom surface 26 of the main portion 20, but extends from the tip end surface (bottom surface) 29B of the second projection portion 29 provided on the bottom surface 26 of the main portion 20. It can also be said that the second projection portion 29 is provided between the first projection portion 28 and the bottom surface 26 of the main portion 20.

The first projection portion 28 is provided on the radially outer peripheral side of the tip end surface (bottom surface) 29B of the second projection portion 29. The radial width t4 of the first projection portion 28 is smaller than the radial width t5 of the second projection portion 29. Moreover, the peripheral width of the first projection portion 28 and the peripheral width of the second projection portion 29 are substantially the same.

The farther the fulcrum is positioned from the tip end portion 31A of the claw portion 31, the wider the strain generation range (the strain is dispersed), and the strain generated in the claw portion 31 decreases. Since the second projection portion 29 is provided in the present embodiment, when the ball 6 is incorporated into the cage 10, the first projection portion 28, which serves as a fulcrum for deformation of the claw portion 31, can be positioned farther from the tip end portion 31A of the claw portion 31, and the strain generated in the claw portion 31 can be reduced.

Figure 33A:
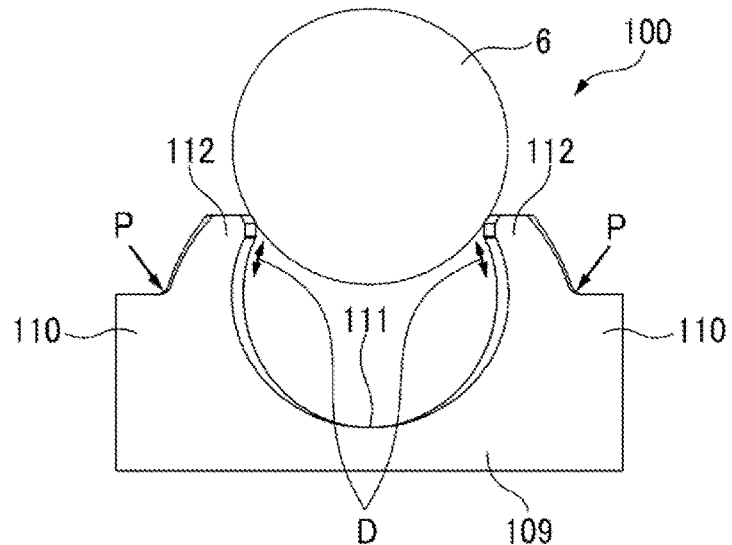
FIG. 33A to 33C are views showing a strain generation region when a ball is incorporated into the cage.
Figure 33B:
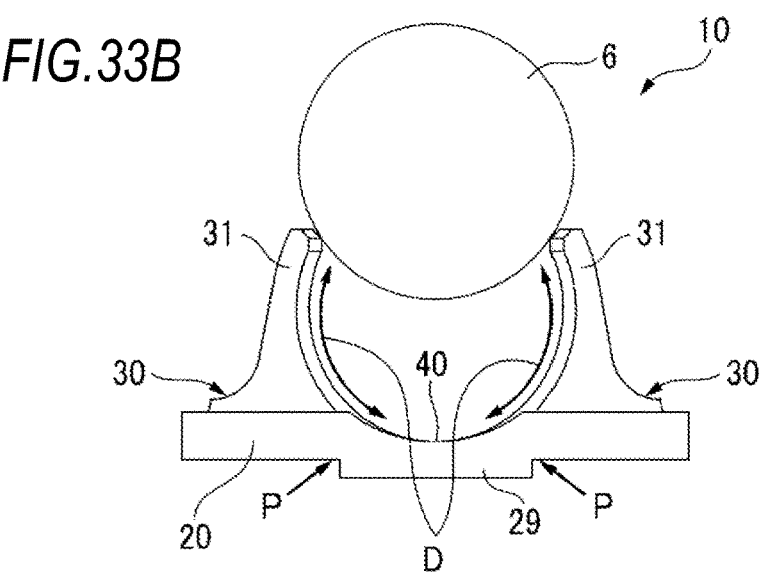
Figure 33C:
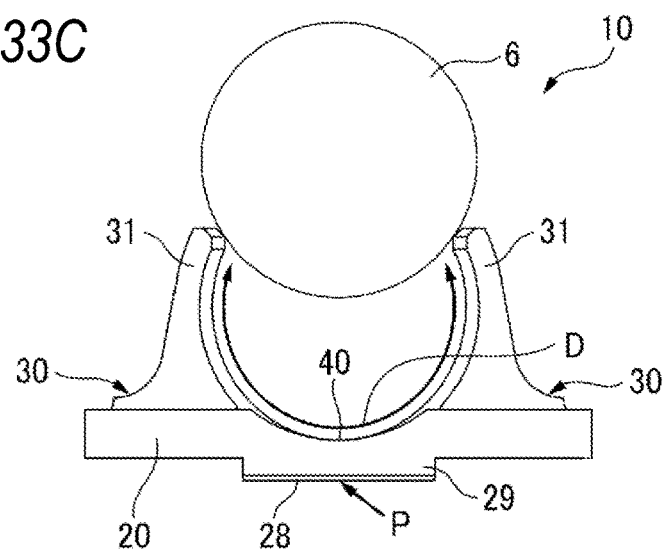

FIG. 33A to 33C are views showing a strain generation region when a ball is incorporated into the cage, FIG. 33A shows the cage 100 of the related art, FIG. 33B shows the cage 10 of Comparative Example, and FIG. 33C shows the cage 10 of the third embodiment. The cage 10 of Comparative Example in FIG. 33B is different from the cage 10 of the third embodiment in FIG. 33C in that the second projection portion 29 is not provided with the first projection portion 28.

As shown in FIGS. 33A to 33C, when the balls 6 are pushed into the pockets 111 and 40 of the cages 100 and 10, the claw portions 112 and 31 tend to widen in the circumferential direction with the low-rigidity part as the fulcrum P. That is, the farther the fulcrum P is from the tip end portion of the claw portions 112 and 31, the more the generated strain is dispersed, and thus the maximum value decreases.

In the related art of FIG. 33A, the part near the tip end portion of the claw portion 112 tends to widen toward the fulcrum P, and thus the strain region (strain generation region D) generated in the claw portion 112 becomes narrower and the strain increases. On the other hand, in Comparative Example of FIG. 33B, since the distance from the tip end portion of the claw portion 31 to the fulcrum P is long, the strain generation region D widens, and the strain is lower than in the related art. Furthermore, in the third embodiment of FIG. 33C, since the distance from the tip end portion 31A of the claw portion 31 to the fulcrum is long, the strain generation region D further widens, and the strain is further reduced than in Comparative Example.

Fourth Embodiment

FIGS. 14 to 21 disclose a cage 10 according to a fourth embodiment. The cage 10 of the present embodiment differs from that of the first embodiment in the configuration in which the main portion 20 is provided with an opening portion 27 and the configuration in which the bottom surface 26 of the main portion 20 is provided with a second projection portion 29.

The cage 10 of the present embodiment has a configuration in which the configuration of the cage 10 of the second embodiment (the opening portions 27) and the configuration of the cage 10 of the third embodiment (the second projection portions 29) are combined.

The opening portion 27 is provided in the main portion 20 between the adjacent pockets 40 and 40. The opening portion 27 penetrates the bottom surface 26 from the upper surface 21 of the main portion 20 in the axial direction. The opening portion 27 is positioned on the radially outer side of the pillar portion 30 (the pair of claw portions 31 and 31). That is, at least a part of the opening portion 27 overlaps the pillar portion 30 (the pair of claw portions 31 and 31) in the peripheral direction. A shown peripheral wall portion of the opening portion 27 is composed of a stepped surface, a tapered surface, or the like, but the shape is not particularly limited.

When the radial width t3 (refer to FIG. 17) of the opening portion 27 becomes extremely large, there is a possibility that the radial width (for example, the radial width t4 of the first projection portion 28) of other parts of the cage 10 becomes small, the strength decreases, and the resin does not flow and voids are generated when the cage 10 is manufactured by injection molding. Therefore, the width of each part of the cage 10 is preferably 1 mm or more. Therefore, the radial width t3 of the opening portion 27 is preferably approximately $(t2/3) \leq t3 \leq (t2/2)$ with respect to the radial width t2 of the main portion 20.

According to the present embodiment, since the opening portions 27 are formed, the weight of the cage 10 can be reduced and deformation can be suppressed. Therefore, the cage 10 can be prevented from coming into contact with the outer ring 5, the shield plate 7, and the like, and wear, vibration, and heat generation of the cage 10 can be suppressed.

The bottom surface 26 of the main portion 20 is provided with the second projection portion 29 that protrudes in the axial direction (the direction opposite to the direction in which the claw portion 31 extends). The second projection portion 29 is provided such that at least a part thereof overlaps the pocket 40 in the peripheral direction and the radial direction. That is, the bottom surface 26 of the main portion 20 has the plurality of second projection portions 29 formed at predetermined intervals in the peripheral direction below the plurality of pockets 40.

The second projection portion 29 preferably overlaps the pocket 40 in the peripheral direction and the radial direction. That is, the peripheral range and the radial range in which the second projection portion 29 is provided are preferably substantially the same as the peripheral range and the radial range in which the recessed surface 23 of the main portion 20 forming the pocket 40 is provided. In this case, a radial width t5 and a peripheral width L2 of the second projection portion 29 are substantially the same as the radial width of the recessed surface 23 of the main portion 20 (the radial width t2 of the main portion 20) forming the pocket 40 and a peripheral width L1.

Figure 19:
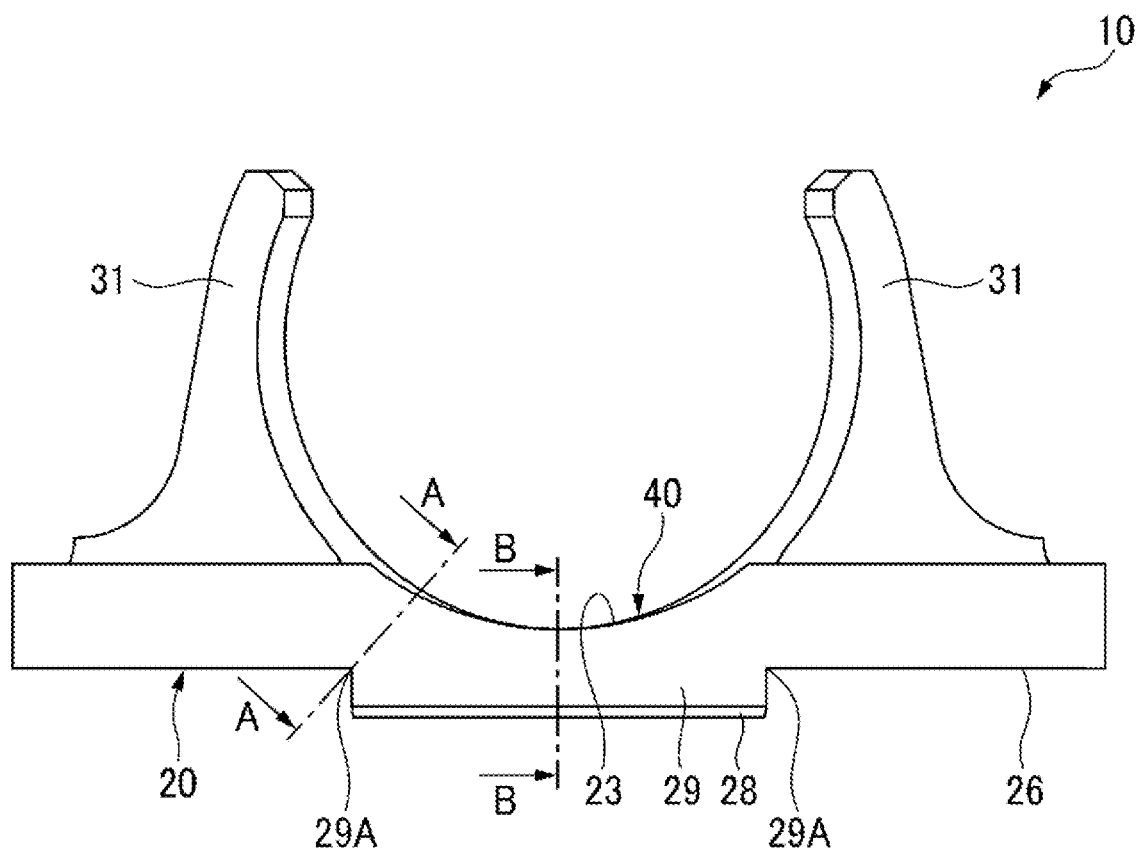
FIG. 19 is a view of a part of the cage according to the fourth embodiment viewed from the radially outer side.
Figure 20:
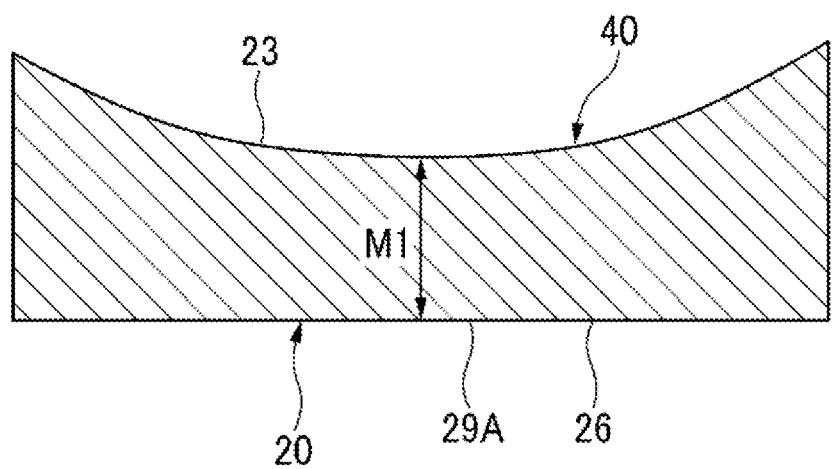
FIG. 20 is a cross-sectional view taken along line A-A of FIG. 19.
Figure 21:
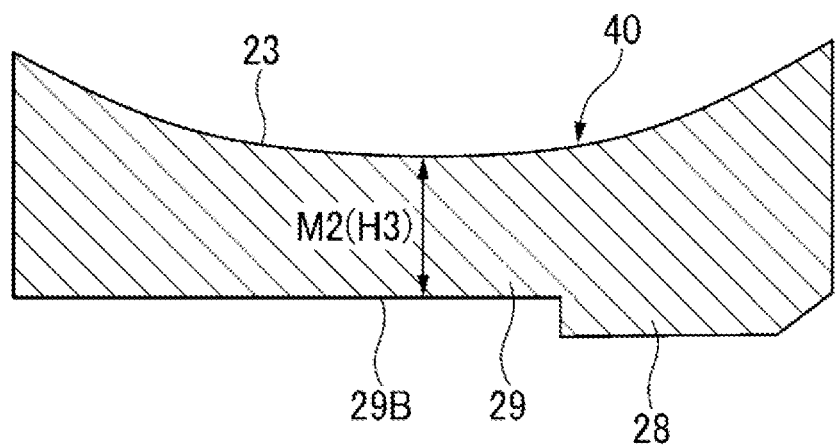
FIG. 21 is a cross-sectional view taken along line B-B of FIG. 19.

As shown in FIGS. 19 to 21, when the shortest distance between the root portions 29A at both end portions in the peripheral direction of the second projection portion 29 and the recessed surface 23 of the main portion 20 forming the pocket 40 is defined as M1, and the shortest distance between a tip end surface (bottom surface) 29B of the second projection portion 29 and the recessed surface 23 is defined as M2, M1>M2 is preferable. This is because, when the shortest distance M1 is reduced, the stress generated in the pocket 40 by centrifugal force will be higher on the recessed surface 23 of a section A than on the recessed surface 23 of a section B shown in FIG. 19.

Further, the first projection portion 28 of the present embodiment further protrudes in the axial direction (the direction opposite to the direction in which the claw portion 31 extends) from the tip end surface (bottom surface) 29B of the second projection portion 29. That is, the first projection portion 28 does not extend directly from the bottom surface 26 of the main portion 20, but extends from the tip end surface (bottom surface) 29B of the second projection portion 29 provided on the bottom surface 26 of the main portion 20. It can also be said that the second projection portion 29 is provided between the first projection portion 28 and the bottom surface 26 of the main portion 20.

The first projection portion 28 is provided on the radially outer peripheral side of the tip end surface 29B of the second projection portion 29. The radial width t4 of the first projection portion 28 is smaller than the radial width t5 of the second projection portion 29. Moreover, the peripheral width of the first projection portion 28 and the peripheral width of the second projection portion 29 are substantially the same.

The farther the fulcrum is positioned from the tip end portion 31A of the claw portion 31, the wider the strain generation range (the strain is dispersed), and the strain generated in the claw portion 31 decreases. Since the second projection portion 29 is provided in the present embodiment, when the ball 6 is incorporated into the cage 10, the first projection portion 28, which serves as a fulcrum for deformation of the claw portion 31, can be positioned farther from the tip end portion 31A of the claw portion 31, and the strain generated in the claw portion 31 can be reduced.

Fifth Embodiment

Figure 22:
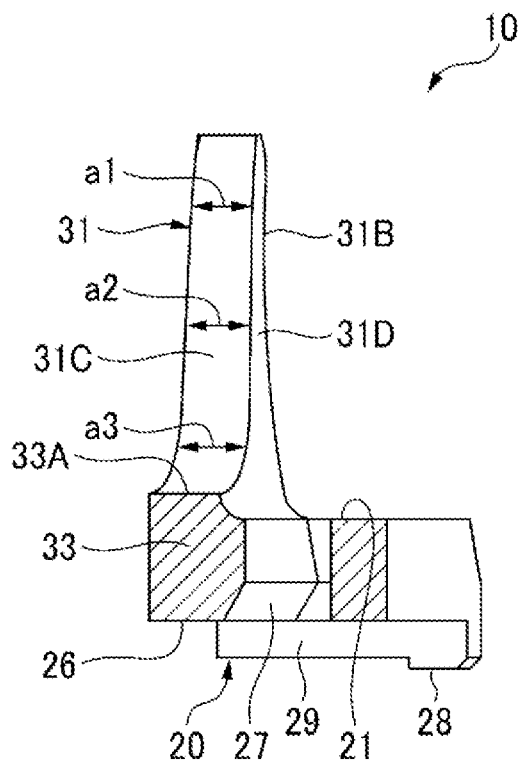
FIG. 22 is a partial cross-sectional perspective view of a part of a cage according to a fifth embodiment.

FIG. 22 discloses a cage 10 according to a fifth embodiment. The cage 10 of the present embodiment differs from the cage 10 of the above-described embodiment in the radial dimension of the claw portions 31. Since the rest of the configuration is the same as that of the fourth embodiment, the description thereof will be omitted by attaching reference numerals to the drawings.

In the cage 10 of the present embodiment, the radial width of the claw portion 31 decreases from the main portion 20 side toward the tip end portion 31A side of the claw portion 31. That is, the relationship among radial widths a1, a2, and a3 of the claw portion 31 in FIG. 22 satisfies a1<a2<a3.

With such a configuration, the stress and strain generated in the claw portion 31 can be reduced. In particular, this configuration is effective when the tip end portion 31A of the claw portion 31 receives force from the ball 6. Moreover, when the cage 10 is injection molded, the cage 10 can be easily removed from the mold, which is effective.

In the present embodiment, an example in which, in the cage 10 (having the second projection portion 29 and the opening portion 27) of the fourth embodiment, the relationship of the radial widths a1, a2, and a3 of the claw portions 31 is configured to satisfy a1<a2<a3, is shown, but the present invention is not limited to this configuration. That is, in the cages 10 of the first to third embodiments, the relationship of the radial widths a1, a2, and a3 of the claw portions 31 may be configured to satisfy a1<a2<a3.

Sixth Embodiment

Figure 23:
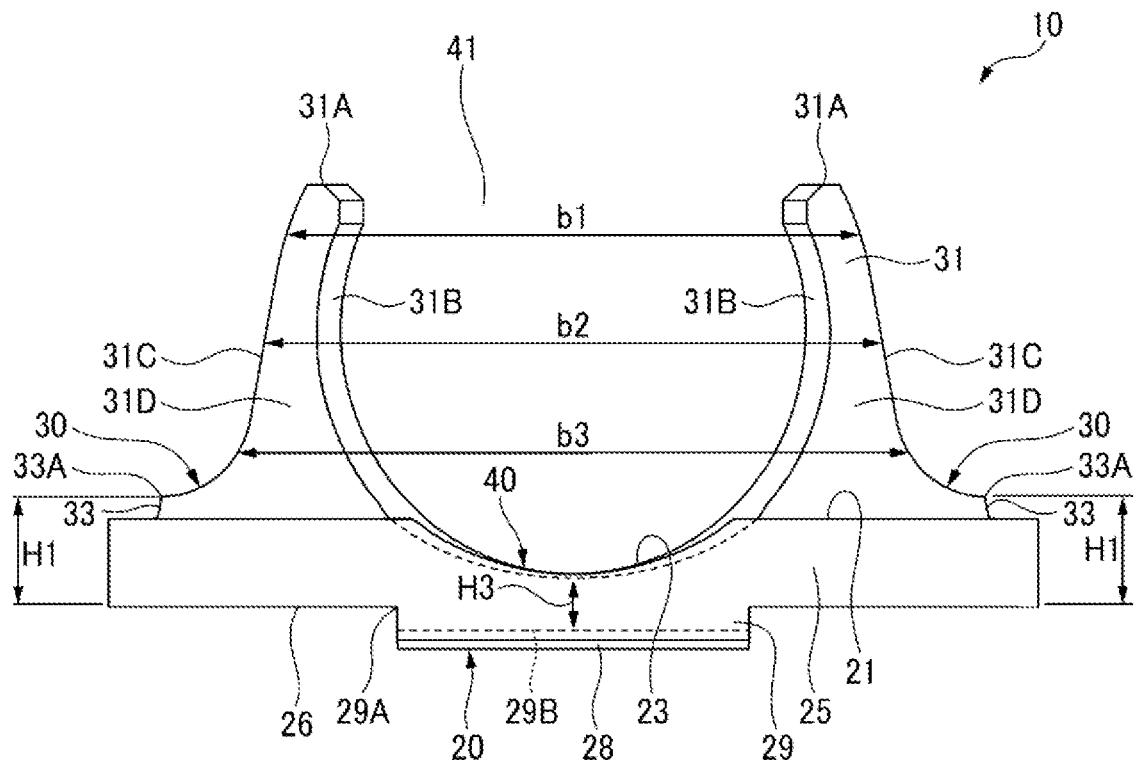
FIG. 23 is a view of a part of a cage according to a sixth embodiment viewed from the radially outer side.
Figure 24:
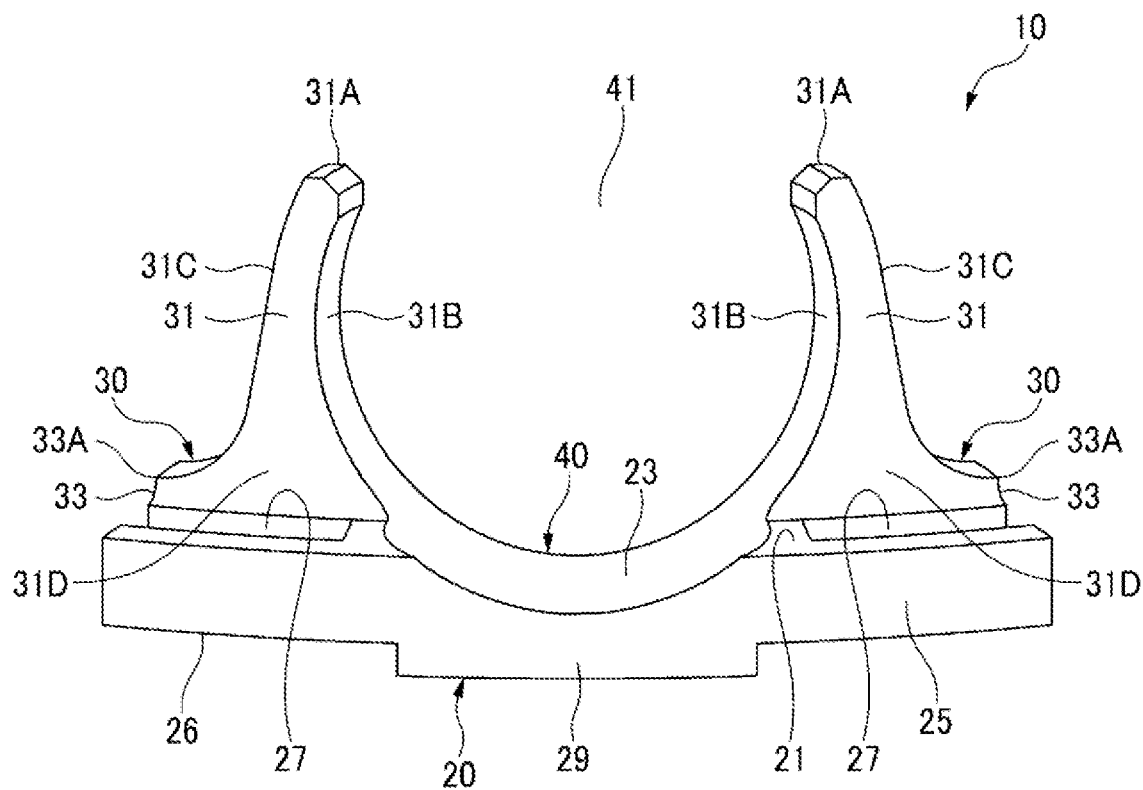
FIG. 24 is a perspective view of a part of a cage according to a comparative example.
Figure 25:
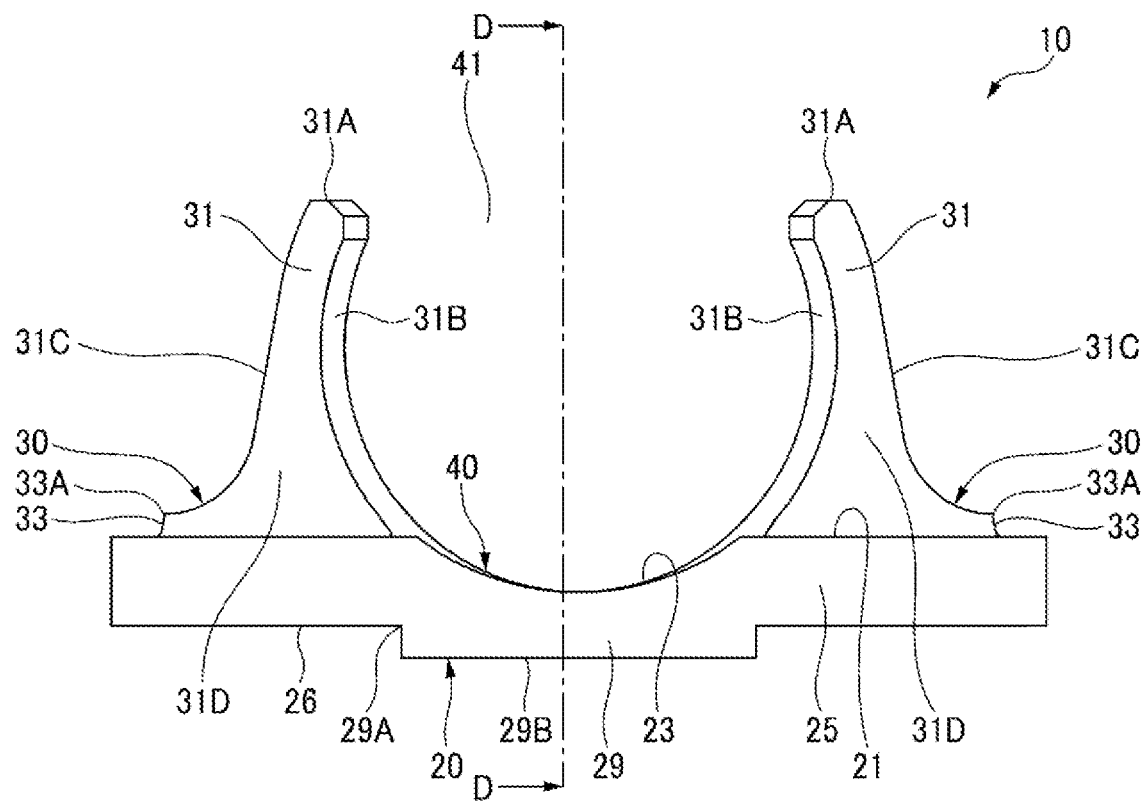
FIG. 25 is a view of a part of the cage according to the comparative example viewed from the radially outer side.
Figure 26:
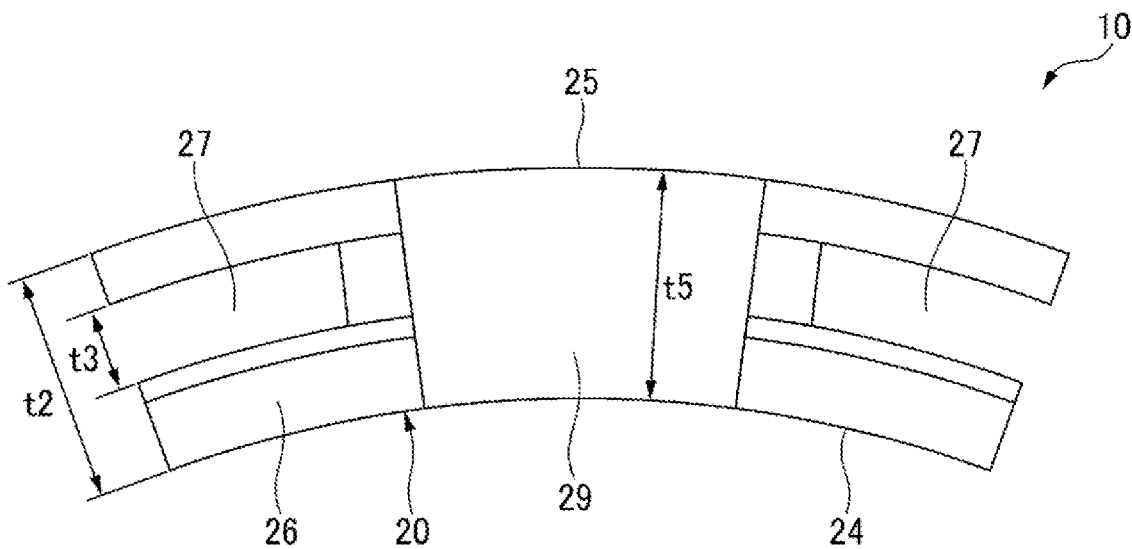
FIG. 26 is a view of a part of the cage according to the comparative example viewed from the bottom surface side.
Figure 27:
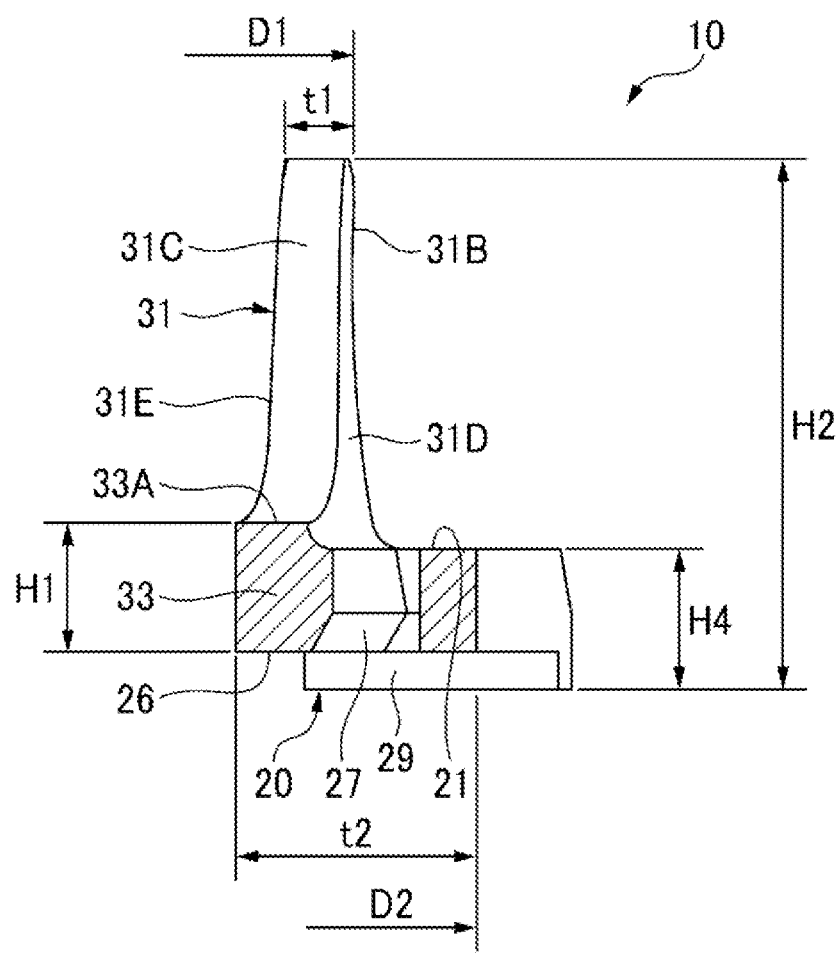
FIG. 27 is a partial cross-sectional perspective view of a part of the cage according to the comparative example.

FIG. 23 discloses a cage 10 according to a sixth embodiment. The cage 10 of the present embodiment differs from the cage 10 of the fourth embodiment in the peripheral distance between the second peripheral surfaces 31C and 31C of the two adjacent claw portions 31 and 31 forming the pocket 40. Since the rest of the configuration is the same as that of the above-described embodiment, the description thereof will be omitted by attaching reference numerals to the drawings.

In the cage 10 of the present embodiment, in the two adjacent claw portions 31 and 31 forming the pocket 40, the peripheral distance between the two second peripheral surfaces 31C and 31C decreases from the main portion 20 side to the tip end portion 31A of the claw portion 31. That is, the relationship of peripheral distances b1, b2, and b3 between the second peripheral surfaces 31C and 31C of the two adjacent claw portions 31 and 31 in FIG. 23 satisfies b1<b2<b3.

With such a configuration, the stress and strain generated in the claw portion 31 can be reduced. In particular, this configuration is effective when the tip end portion 31A of the claw portion 31 receives force from the ball 6. Moreover, when the cage 10 is injection molded, the cage 10 can be easily removed from the mold, which is effective.

In the present embodiment, an example in which, in the cage 10 (having the second projection portion 29 and the opening portion 27) of the fourth embodiment, the relationship of the peripheral distances b1, b2, and b3 is configured to satisfy b1<b2<b3, is shown, but the present invention is not limited to this configuration. That is, in the cages 10 of the first to third and fifth embodiments, the relationship of the peripheral distances b1, b2, and b3 may be configured to satisfy b1<b2<b3.

EXAMPLES

In order to confirm the effects of the present invention, analysis was performed using the finite element method. The cage 10 to be analyzed is a crown type resin cage used for a bearing with an inner diameter of 35 mm. Based on the crown type resin cage of the related art, the shape was set based on the embodiment of the present invention. As an example, the cage 10 of the fourth embodiment shown in FIGS. 14 to 21 was adopted, and as a comparative example, the cage 10 shown in FIGS. 24 to 27 was adopted. The cage 10 of the comparative example differs from the cage 10 of the example (fourth embodiment) in that the first projection portion 28 is not provided. Configurations other than the first projection portion 28 are the same in the comparative example and the example.

Figure 35:
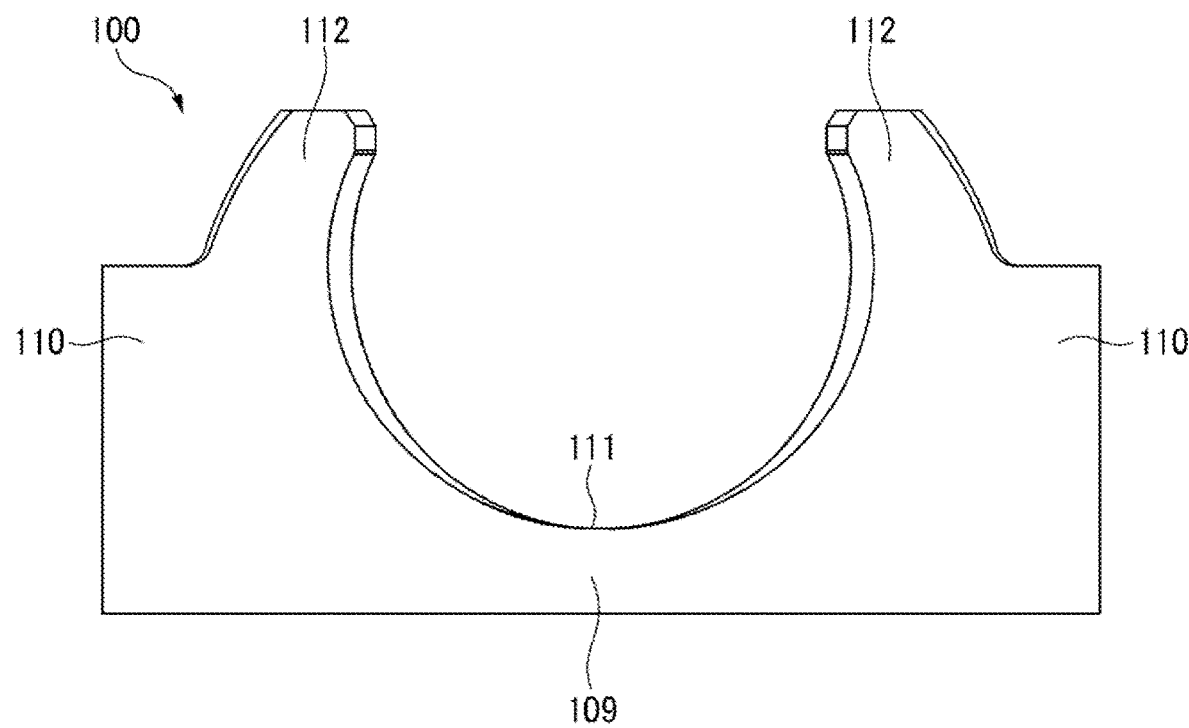
FIG. 35 is a view of a part of a cage according to the related art viewed from the radially outer side.
Figure 36:
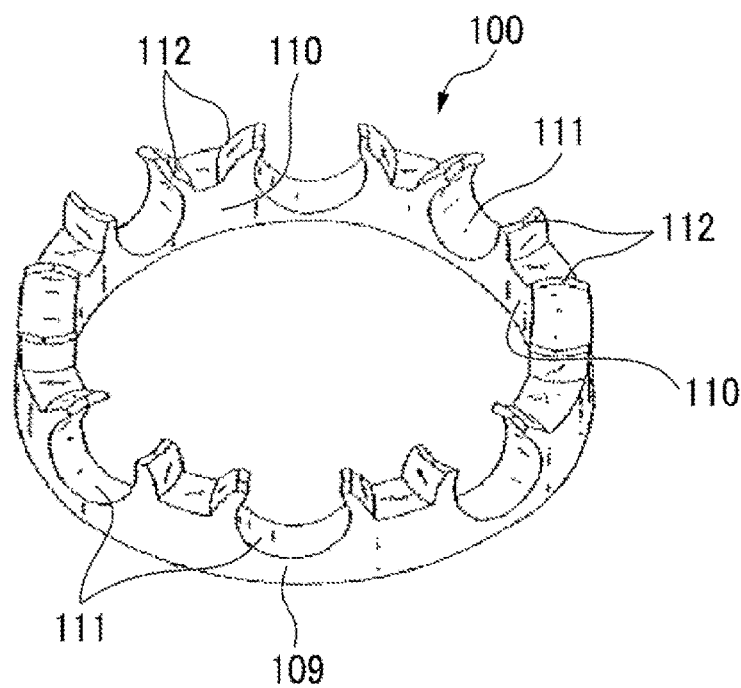
FIG. 36 is a perspective view of the cage according to the related art.

Regarding the size of the cage 10 of the example, the inner diameter of the cage 10 was set to 49 mm, the maximum outer diameter of the main portion 20 was set to 58 mm, the axial height of the cage 10 was set to 10 mm including the first projection portion 28, and the axial thickness H1 of the connection portion 33 of the pillar portion 30 was set to 3 mm (approximately 7 mm in the related art as shown in FIGS. 35 and 36). The radial width of the tip end portion 31A of the claw portion 31 was set to 1.2 mm, the radial width of the opening portion 27 of the main portion 20 was set to 2 mm, the axial width of the second projection portion 29 (the distance from the bottom surface 26 of the main portion 20 to the tip end surface 29B of the second projection portion 29) was set to 0.9 mm, the axial width of the first projection portion 28 was set to 0.2 mm, and the radial width of the first projection portion 28 was set to 1.1 mm.

Regarding the size of the cage 10 of the comparative example which does not have the first projection portions 28, the axial height of the cage 10 was set to 10 mm, and the other dimensions were set the same as those of the cage 10 of the example which has the first projection portions 28.

Figure 28:
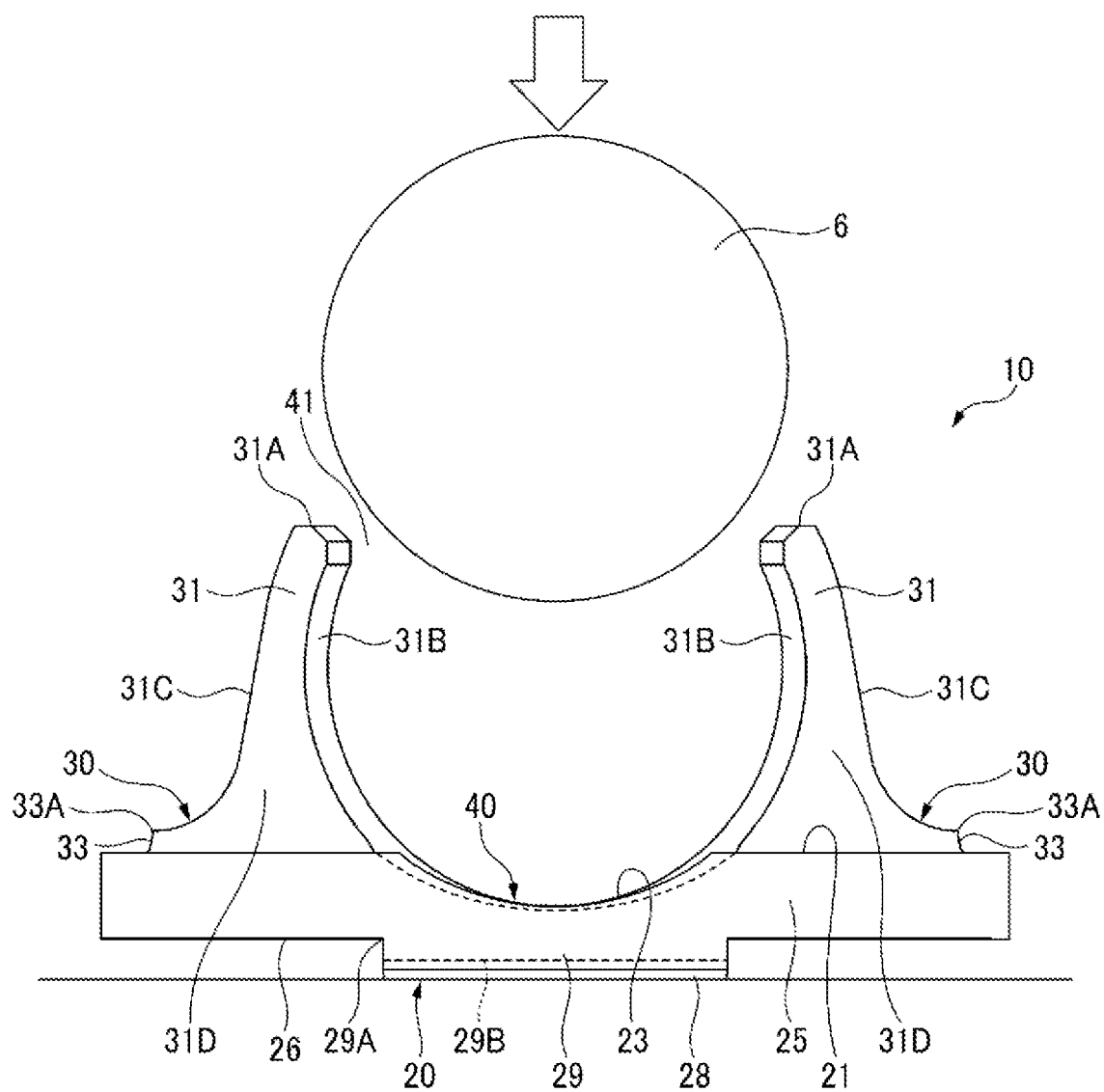
FIG. 28 is a view showing how a ball is incorporated into the cage.
Figure 29:
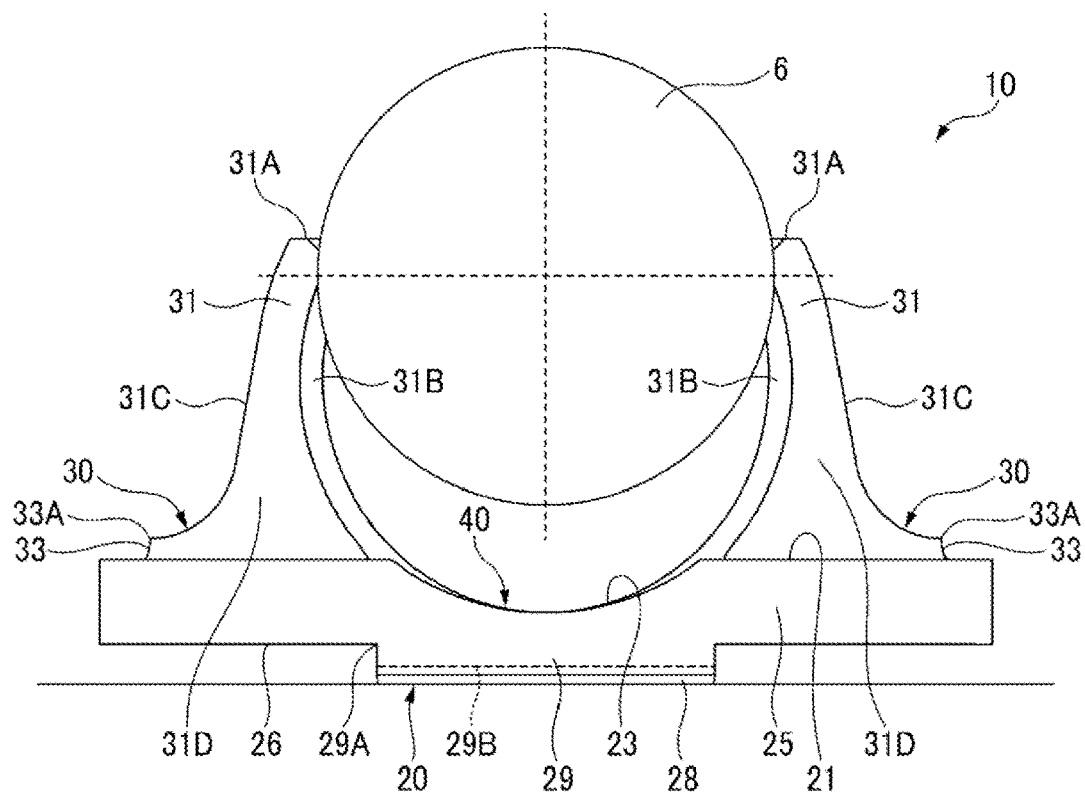
FIG. 29 is a view showing how the ball is incorporated into the cage.

Assuming that the cage 10 of the example and the comparative example is inserted into the ball bearing 1 having the inner ring 3, the outer ring 5, and the balls 6, as shown in FIGS. 28 and 29, by modeling a part of the cage 10 and performing an analysis of pushing the ball 6 into the cage 10, the maximum value of the maximum principal strain generated in the claw portion 31 was calculated.

Values corresponding to the polyamide 46 (PA46) were used as the physical property values of the cages 10 of Examples and Comparative Examples. Specifically, the Young's modulus of the cages 10 of Examples and Comparative Examples was set to 6,500 MPa, and the Poisson's ratio was set to 0.4.

Figure 30:
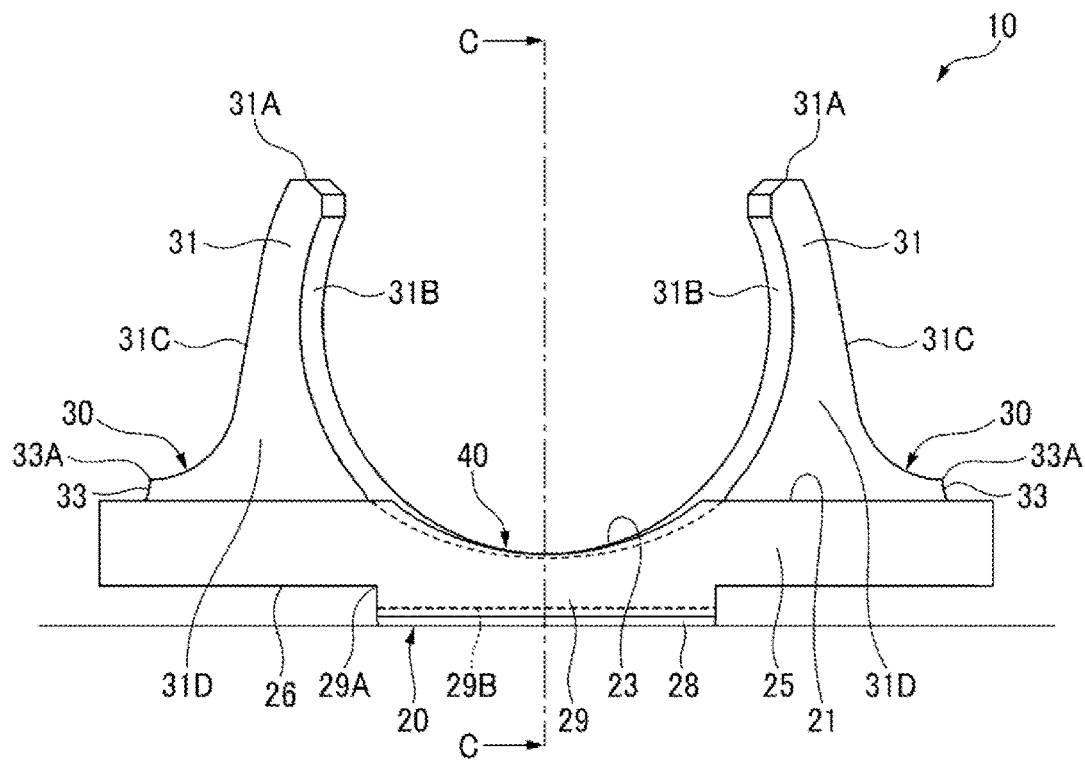
FIG. 30 is a view of a part of a cage according to an example viewed from the radially outer side.
Figure 31:
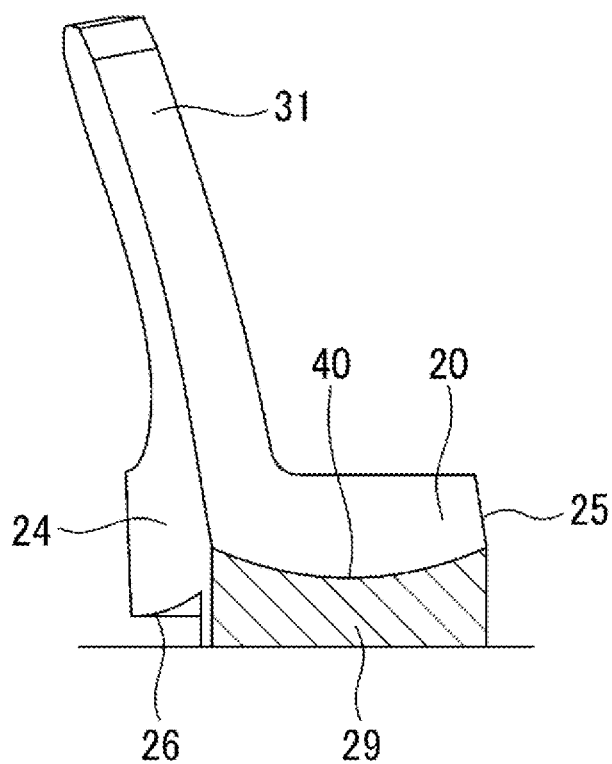
FIG. 31 is a view showing a state of the cage when the balls are incorporated in the D-D cross-sectional view of FIG. 25.
Figure 32:
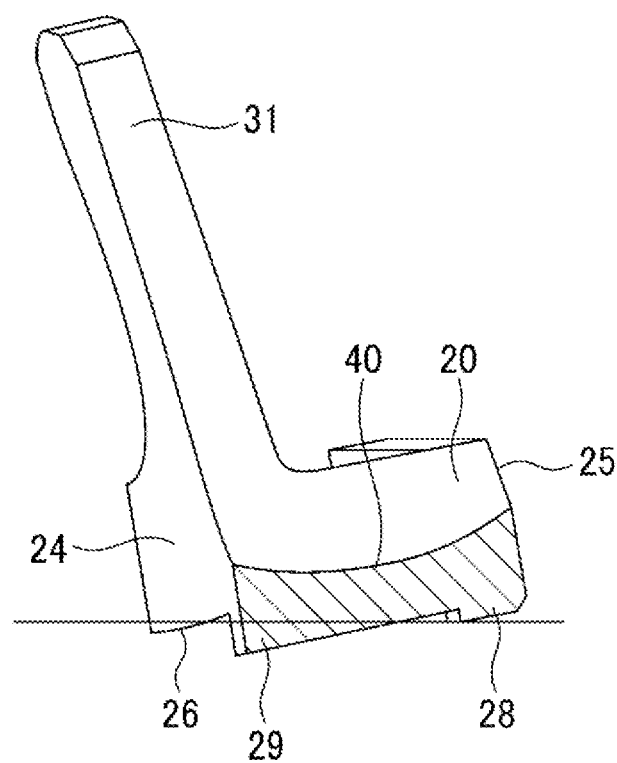
FIG. 32 is a view showing a state of the cage when the balls are incorporated in the C-C cross-sectional view of FIG. 30.

As a result of the analysis, as shown in FIG. 29, strain was maximized when the center of ball 6 reached the tip end portion 31A of the claw portion 31 of cage 10 (the inlet 41 of the pocket 40). It can be seen that, as shown in FIG. 31, which is the D-D cross-sectional view of FIG. 25, the cage 10 of the comparative example has claw portions 31 that are arched, and as shown in FIG. 32, which is the C-C cross-sectional view of FIG. 30, the claw portions 31 of the cage 10 of the example are not arched. In addition, the deformation magnification of the shown drawing was set to 10 times.

According to this analysis result, it can be seen that the strain is reduced by providing the first projection portion 28. Assuming that the maximum strain generated in the claw portions 31 of the cage 10 of the comparative example was set to 1.0, the maximum strain generated in the claw portions 31 of the cage 10 of the example was 0.9, which is a decrease of 10%.

(Principle of Suppression of Strain Generated in Claw Portion)

As described above, with the cage 10 of each embodiment of the present application, the strain generated in the claw portions 31 is suppressed, and the principle thereof will be described in detail below.

Figure 37:
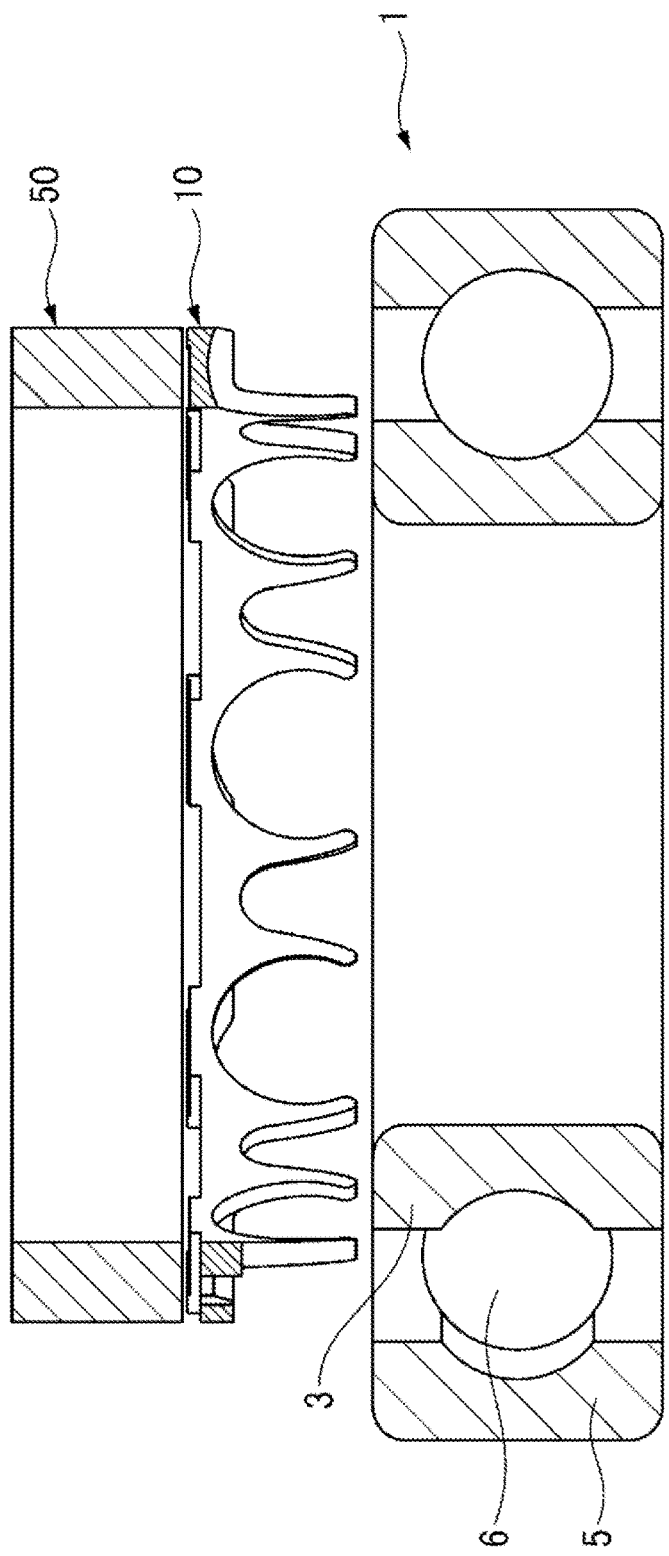
FIG. 37 is a view showing how the cage is incorporated into the ball bearing using a jig.
Figure 38:
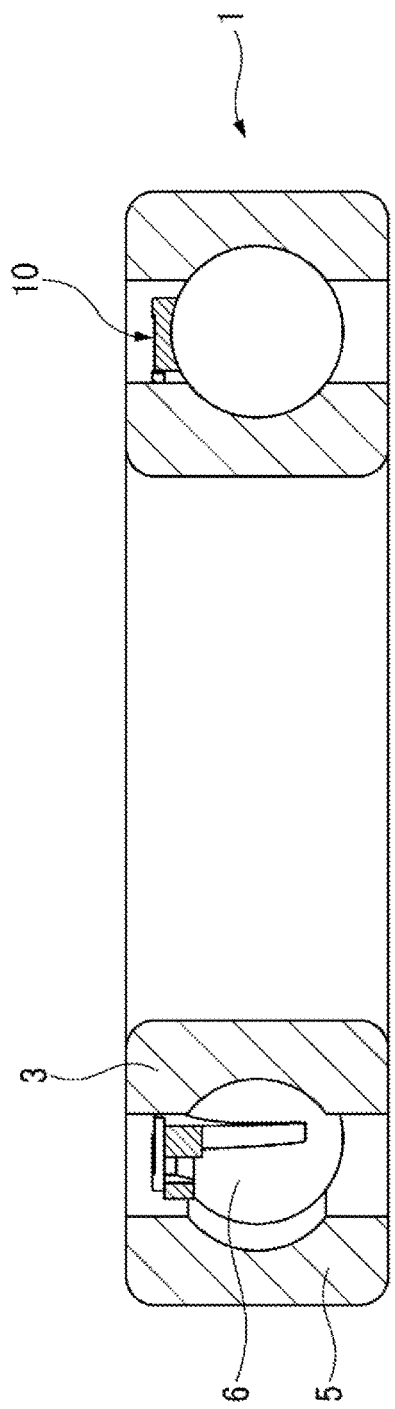
FIG. 38 is a view showing how the cage is incorporated into the ball bearing.

As shown in FIG. 37, the cage 10 of each embodiment is incorporated into the ball bearing 1 in which the plurality of balls 6 are already incorporated between the outer ring 5 and the inner ring 3, using a jig 50. The jig 50 has an annular shape. The inner diameter and the outer diameter of the jig 50 are substantially equal to the inner diameter and the outer diameter of the cage 10, and the cage 10 can be biased in the axial direction toward the ball bearing 1. FIG. 38 shows a state where the cage 10 is incorporated into the ball bearing 1.

Figure 39:
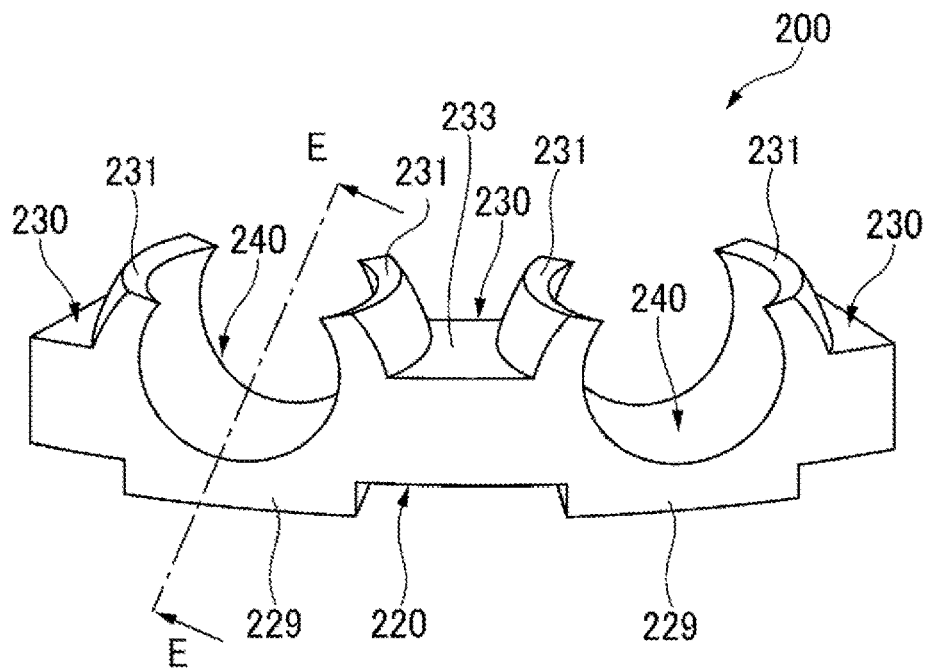
FIG. 39 is a perspective view of a part of a cage according to a comparative example.
Figure 40:
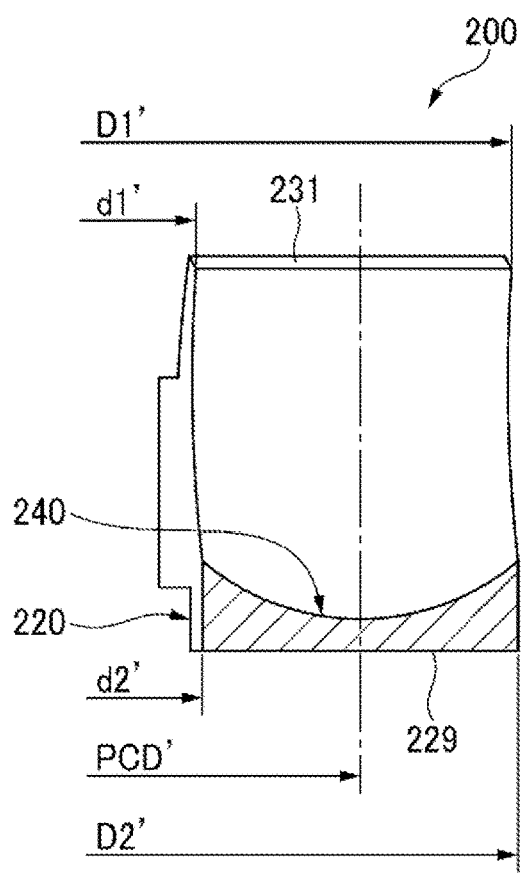
FIG. 40 is a view taken along line E-E of FIG. 39.

First, as a comparative example, a cage 200 described in Patent Literature 3 (JPH11-264418A) will be considered. FIG. 39 is a perspective view of a part of the cage 200 according to a comparative example, and FIG. 40 is a cross-sectional view taken along line E-E of FIG. 39.

The cage 200 is a crown type cage, and includes an annular main portion 220, a plurality of pillar portions 230 protruding in the axial direction from an upper surface of the main portion 220 at predetermined intervals in the peripheral direction, and a spherical pocket 240 formed between the adjacent pillar portions 230 and 230 and capable of holding the balls.

The pillar portion 230 protrudes in the axial direction from the entire radial width of the upper surface of the main portion 220. The pillar portion 230 has a pair of claw portions 231 and 231 and a connection portion 233 that connects the pair of claw portions 231 and 231.

The bottom surface of the main portion 220 is provided with a projection portion 229 that protrudes in the axial direction (the direction opposite to the direction in which the claw portion 231 extends). The projection portion 229 overlaps the pocket 240 in the peripheral direction and the radial direction. That is, the peripheral range and the radial range in which the projection portion 229 is provided are substantially the same as the peripheral range and the radial range in which the pocket 240 is provided. Therefore, the projection portion 229 corresponds to the second projection portion 29 of each embodiment of the present application. Note that the cage 200 does not have a component corresponding to the first projection portion 28 of each embodiment of the present application.

In FIG. 40, the outer diameter of the main portion 220 is indicated by D2', the inner diameter of the main portion is indicated by d2', the outer diameter of the claw portion 231 is indicated by D1', and the inner diameter of the claw portion is indicated by d1'. The outer diameters D2' and D1' of the main portion 220 and the claw portion 231 are equal (D2'=D1'), and the inner diameters d2' and d1' of the main portion 220 and the claw portion 231 are equal (d2'=d1').

On the contrary, taking the cage 10 of the fourth embodiment shown in FIGS. 14 to 21 as an example, the position of the claw portion 31 and the action and function of the first projection portion 28, which are features of the present invention, will be described below.

Figure 41:
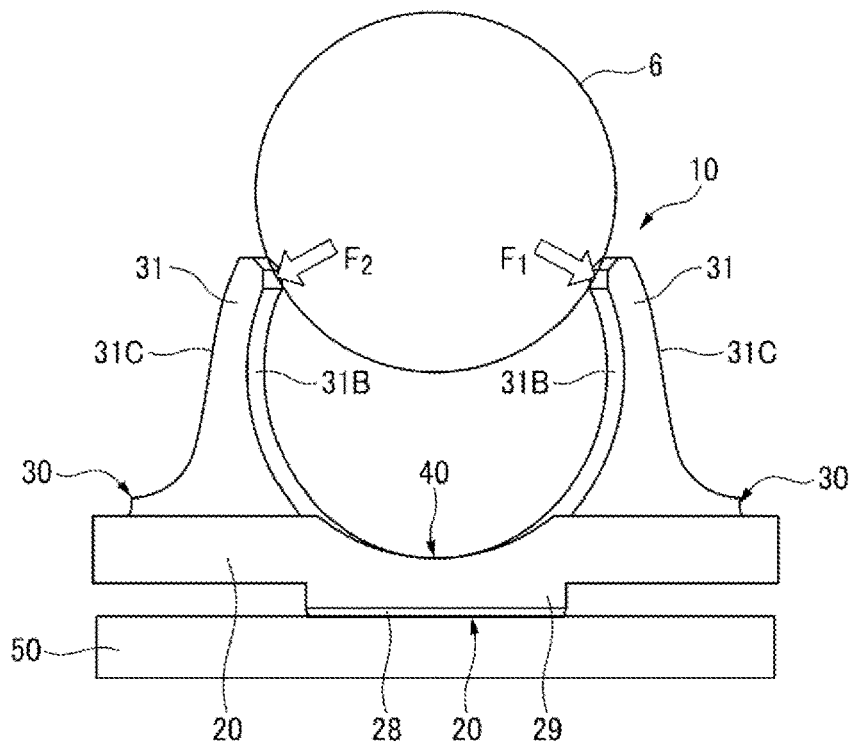
FIG. 41 is a view of a part of the cage according to the fourth embodiment viewed from the radially outer side.
Figure 42:
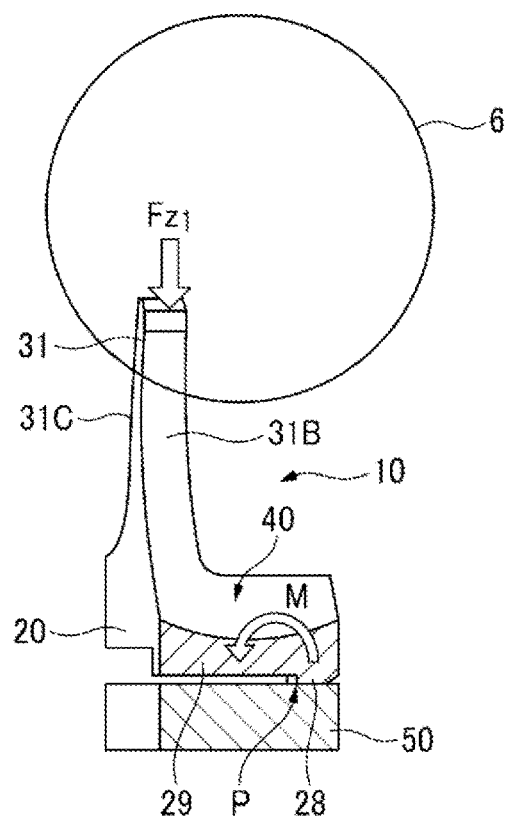
FIG. 42 is a partial cross-sectional view of a part of the cage according to the fourth embodiment viewed from the peripheral direction.
Figure 43:
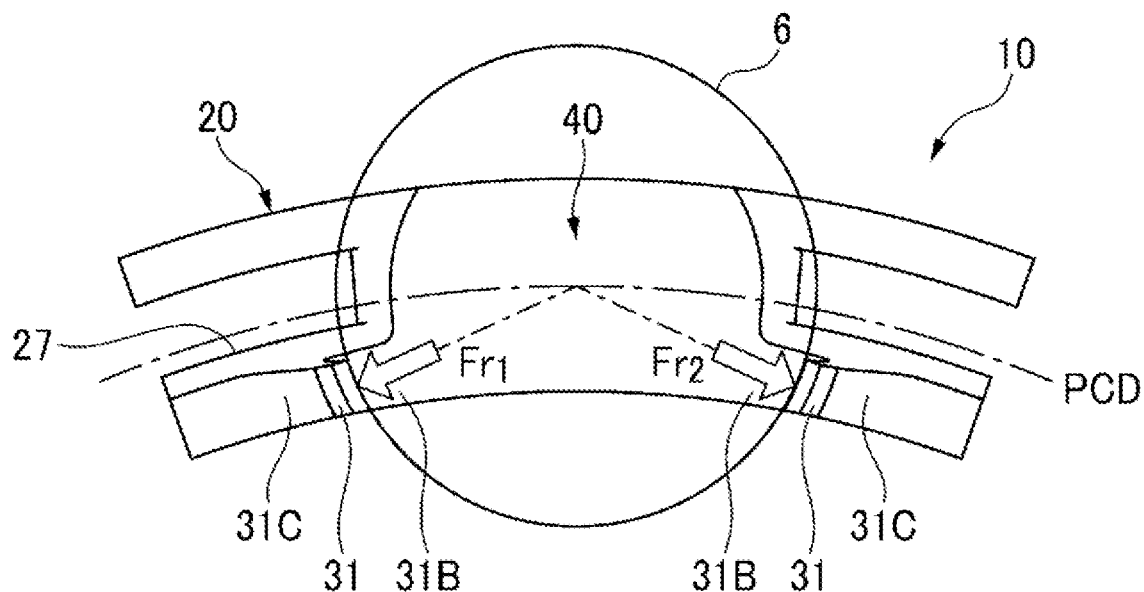
FIG. 43 is a view of a part of the cage according to the fourth embodiment viewed from the upper surface side.

FIGS. 41 to 43 show how the cage 10 of the fourth embodiment is incorporated into the ball 6 by means of the jig 50. FIG. 41 is a view of a part of the cage 10 according to the fourth embodiment viewed from the radially outer side. FIG. 42 is a partial cross-sectional view of a part of the cage 10 according to the fourth embodiment viewed from the peripheral direction. FIG. 43 is a view of a part of the cage 10 according to the fourth embodiment viewed from the upper surface side. In FIGS. 41 to 43, illustration of the inner ring 3 and the outer ring 5 is omitted.

FIGS. 41 to 43 show forces applied to the first peripheral surfaces 31B of the pair of claw portions 31 forming the pocket 40 when the ball 6 is inserted into the pocket 40. Since the ball 6 is incorporated between the outer ring 5 and the inner ring 3, the ball 6 can hardly move in the radial direction. When the ball 6 begins to come into contact with the tip ends of the pair of claw portions 31, as shown in FIG. 41, forces $F_1$ and $F_2$ in the normal direction are applied to the first peripheral surfaces 31B that form the pocket 40 of the pair of claw portions 31, respectively. FIGS. 42 and 43 show the forces $F_1$ and $F_2$ divided into force components $Fz_1$ and $Fz_2$ in the axial direction (vertical direction in FIG. 41) and force components $Fr_1$ and $Fr_2$ in a direction perpendicular to the axial direction. In addition, FIG. 42 shows only one of the pair of claw portions 31, and thus, of the axial forces $Fz_1$ and $Fz_2$, only the force component $Fz_1$ of $F_1$ is shown, and the force component $Fz_2$ of $F_2$ is not shown.

As shown in FIG. 42, the force component $Fz_1$ is applied from the tip end of the claw portion 31 toward the bottom portion of the pocket 40. Although not shown, the same applies to the force component $Fz_2$.

FIG. 43 shows the force components $Fr_1$ and $Fr_2$ in the direction perpendicular to the axial direction of the forces $F_1$ and $F_2$. Here, since the contact part between the ball 6 and the claw portion 31 has a certain range, it is assumed that the contact is made at one point as a resultant force. The shape of the first peripheral surface 31B of the claw portion 31 is mostly spherical, and near the tip end of the claw portion 31, the shape is cylindrical. Therefore, the first peripheral surface 31B of the claw portion 31 has an arcuate cross-sectional shape perpendicular to the axial direction, and is concentric with the center position of the ball 6. Therefore, the direction in which the forces $Fr_1$ and $Fr_2$ are applied is the normal direction of the first peripheral surface 31B of the claw portion 31, and the forces $Fr_1$ and $Fr_2$ pass through the center position of the ball 6.

In the cage 10 of the present application, the first projection portions 28 are provided on the radially outer side, and the claw portions 31 are provided on the radially inner side. Therefore, when the force component $Fz_1$ in the axial direction is applied to the claw portion 31 as shown in FIG. 42, with the inner peripheral edge of the first projection portion 28 which is in contact with the jig 50 as the fulcrum P, the moment M acts in a direction that causes the claw portion 31 to be tilted to the inner peripheral side.

Figure 44:
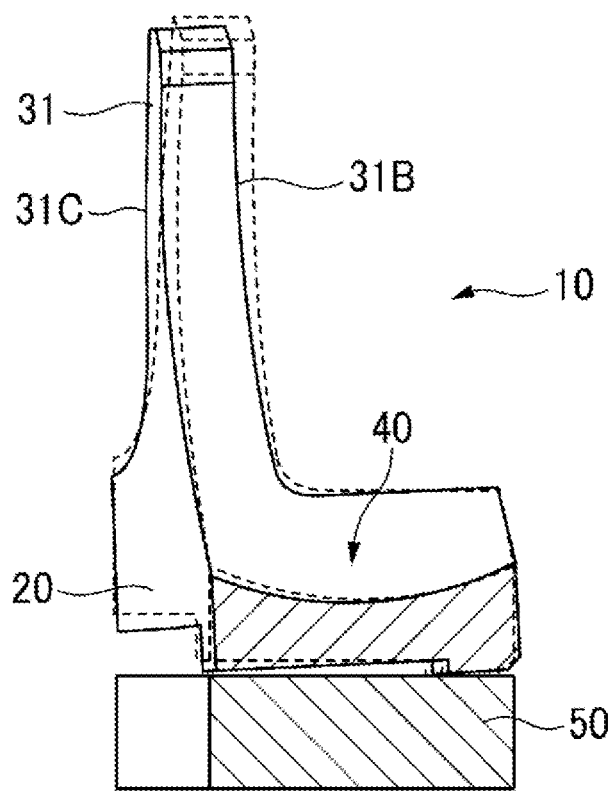
FIG. 44 is a view showing the cage according to the fourth embodiment before and after balls are incorporated.

Further, the cage 10 of the present application is made of resin, and the axial thickness of the main portion 20 is sufficiently thinner than the radial width thereof. Therefore, when the axial forces $Fz_1$ and $Fz_2$ are applied to the claw portion 31, the main portion 20 is screwed, elastically deformed, and tilted to the radially inner side as shown in FIG. 44. In addition, in FIG. 44, the cage 10 after elastic deformation is indicated by a solid line, and the cage 10 before elastic deformation is indicated by a broken line. When the main portion 20 is tilted to the radially inner side, according to this, the claw portion 31 is also tilted to the radially inner side.

Figure 45:
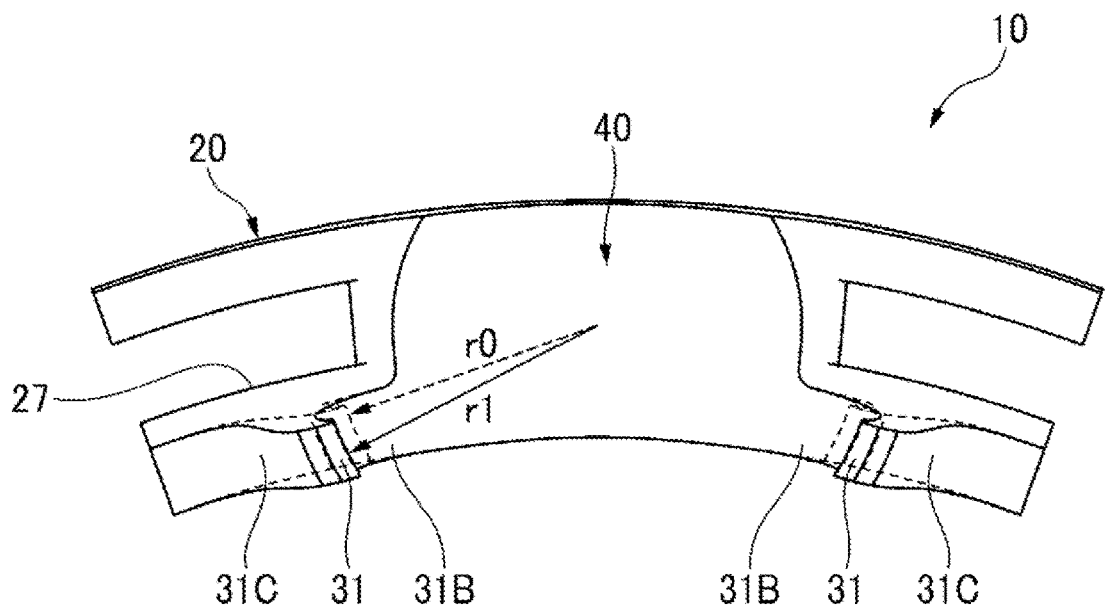
FIG. 45 is a view showing the cage according to the fourth embodiment before and after the balls are incorporated.

The radial width t1 of the claw portions 31 of the cage 10 of the present application is equal to or less than ½ of the radial width t2 of the main portion 20 (refer to FIG. 18), and the claw portions 31 are arranged on the radially inner side of a pitch circle diameter (PCD) of the cage 10. Therefore, when the claw portion 31 is tilted to the radially inner side, as shown in FIG. 45, a radius r0 of the inlet of the narrowest pocket 40, which is formed by the tip end of the claw portion 31, widens similar to r1. In addition, in FIG. 45, the cage 10 after elastic deformation is indicated by a solid line, and the cage 10 before elastic deformation is indicated by a broken line.

When the ball 6 moves further in the axial direction and is inserted into the pocket 40, the ball 6 is incorporated between the outer ring 5 and the inner ring 3, and thus the ball 6 can hardly move in the radial direction. Therefore, since the radius of the inlet of the pocket 40 widens to r1, the amount by which the claw portion 31 is pushed and widens in the radial direction by the force components $Fr_1$ and $Fr_2$ (refer to FIG. 43) in the direction perpendicular to the axial direction is small, and thus the strain and stress generated in the claw portion 31 are reduced.

Next, the case where the cage 200 of the comparative examples shown in FIGS. 39 and 40 is incorporated into a ball bearing.

Figure 46:
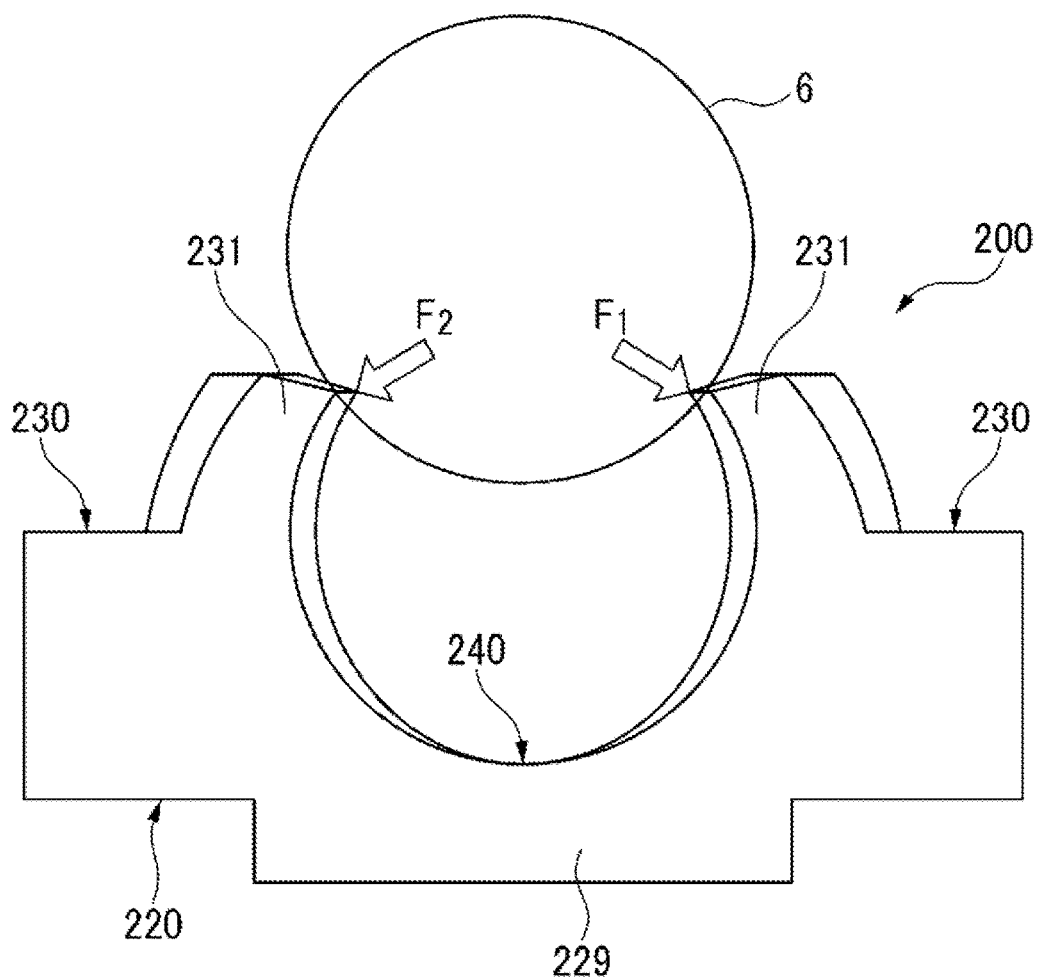
FIG. 46 is a view of a part of a cage according to a comparative example viewed from the radially outer side.
Figure 47:
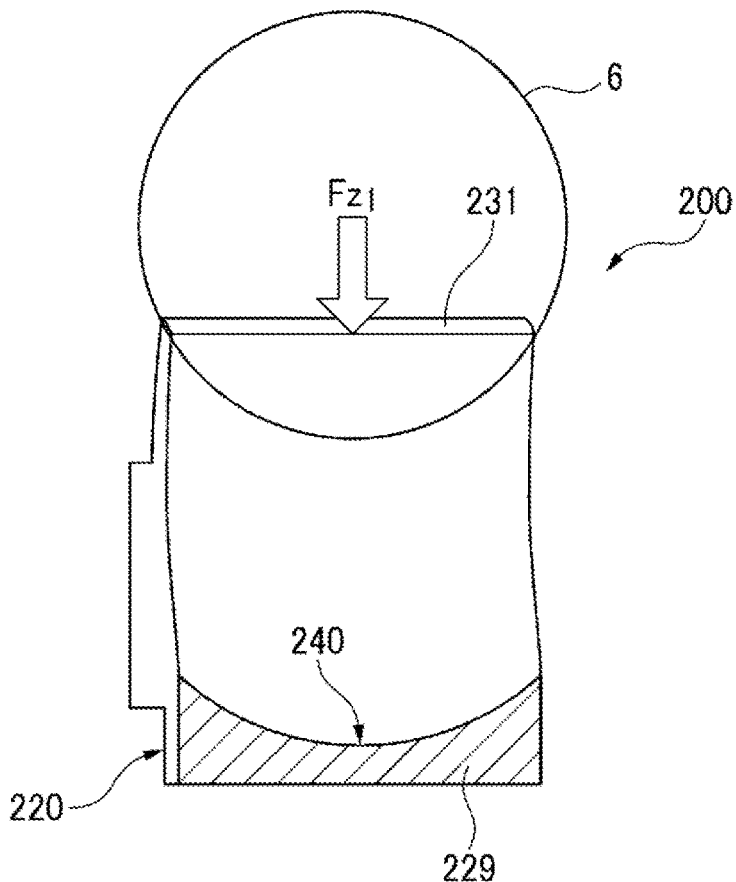
FIG. 47 is a partial cross-sectional view of a part of the cage according to the comparative example viewed from the peripheral direction.
Figure 48:
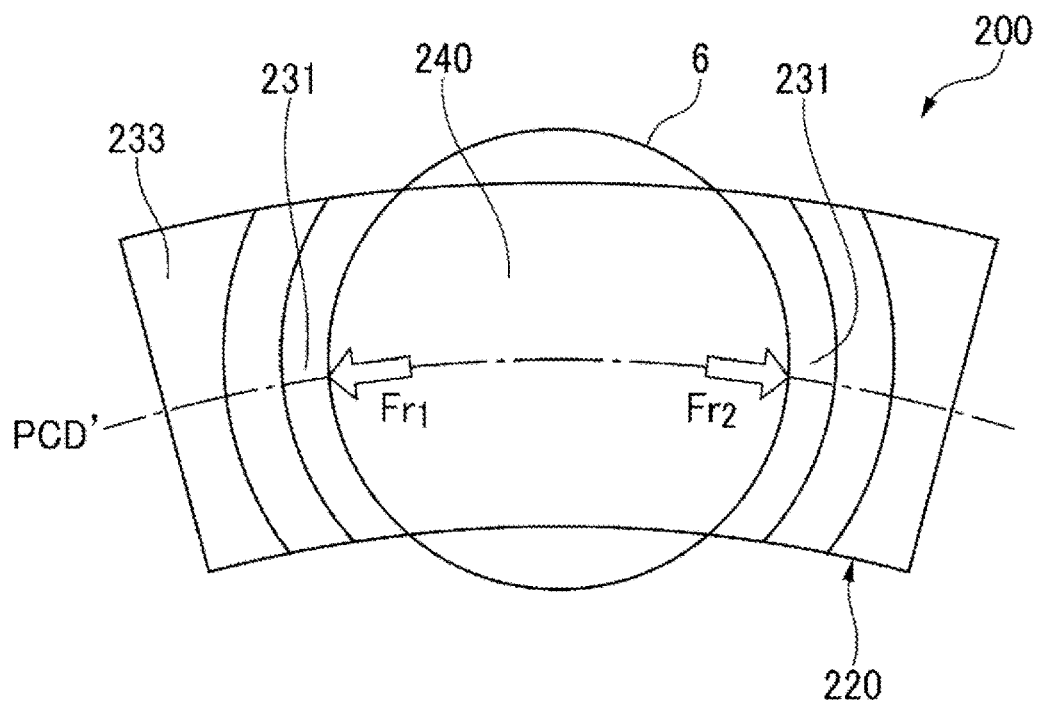
FIG. 48 is a view of a part of the cage according to the comparative example viewed from the upper surface side.

FIGS. 46 to 48 show how the cage 200 of the comparative example is incorporated into the ball 6. FIG. 46 is a view of a part of the cage 200 according to the comparative example viewed from the radially outer side. FIG. 47 is a partial cross-sectional view of a part of the cage 200 according to the comparative example viewed from the peripheral direction. FIG. 48 is a view of a part of the cage 10 according to the comparative example viewed from the upper surface side.

FIGS. 46 to 48 show forces applied to the inner peripheral surface of the pair of claw portions 231 forming the pocket 240 when the ball 6 is inserted into the pocket 240. Since the ball 6 is incorporated between the outer ring 5 and the inner ring 3, the ball 6 can hardly move in the radial direction. When the ball 6 begins to come into contact with the tip ends of the pair of claw portions 231, as shown in FIG. 46, forces F1 and F2 in the normal direction are applied to the inner peripheral surface of the pair of claw portions 231 forming the pocket 240, respectively. FIGS. 47 and 48 show the forces F1 and F2 divided into the force components $F_{z1}$ and $F_{z2}$ in the axial direction (vertical direction in FIG. 47) and the force components $F_{r1}$ and $F_{r2}$ in a direction perpendicular to the axial direction. In addition, FIG. 47 shows only one of the pair of claw portions 231, and thus, of the axial forces $F_{z1}$ and $F_{z2}$, only the force component $F_{z1}$ of F1 is shown, and the force component $F_{z2}$ of F2 is not shown.

As shown in FIG. 47, the force component $F_{z1}$ is applied from the tip end of the claw portion 31 toward the bottom portion of the pocket 40. Although not shown, the same applies to the force component $F_{z2}$.

FIG. 48 shows the force components $F_{r1}$ and $F_{r2}$ in the direction perpendicular to the axial direction of the forces F1 and F2. Here, since the contact part between the ball 6 and the claw portion 231 has a certain range, it is assumed that the contact is made at one point as a resultant force.

When the axial force $F_{z1}$ is applied to the claw portion 231, the resultant force $F_{z1}$ represented by one point is on a pitch circle diameter PCD' of the cage 200, and thus it is considered that the claw portion 231 only deforms in the axial direction or the peripheral direction, and is hardly tilted in the radial direction. Therefore, the cage 200 of the comparative example cannot obtain the effect of the cage 10 of the present application in which the shape and position of the claw portions 31 are devised and the first projection portions 28 are provided.

Figure 49:
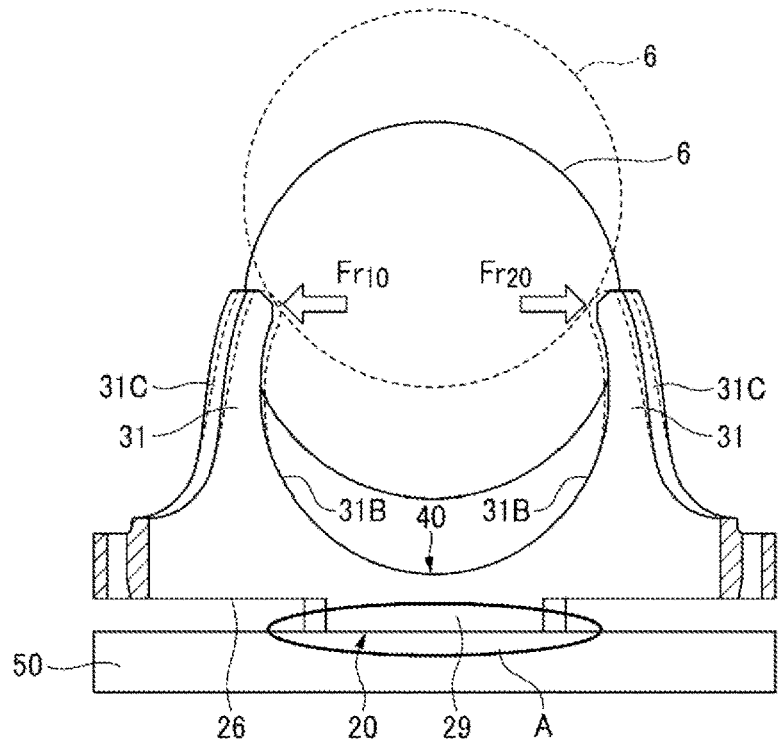
FIG. 49 is a view of a part of a cage according to a comparative example viewed from the radially inner side.
Figure 50:
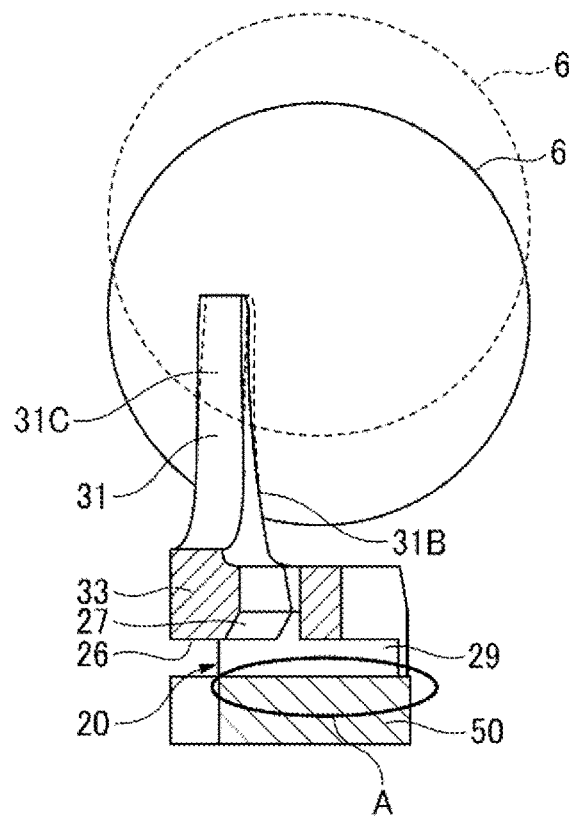
FIG. 50 is a partial cross-sectional view of a part of the cage according to the comparative example viewed from the peripheral direction.

Next, as another comparative example, as shown in FIGS. 49 and 50, the case where the cage 10 of the fourth embodiment does not have the first projection portion 28 will be considered. That is, the cage 10 of the comparative example is provided with the second projection portion 29, but the second projection portion 29 is not provided with the first projection portion 28.

Figure 51:
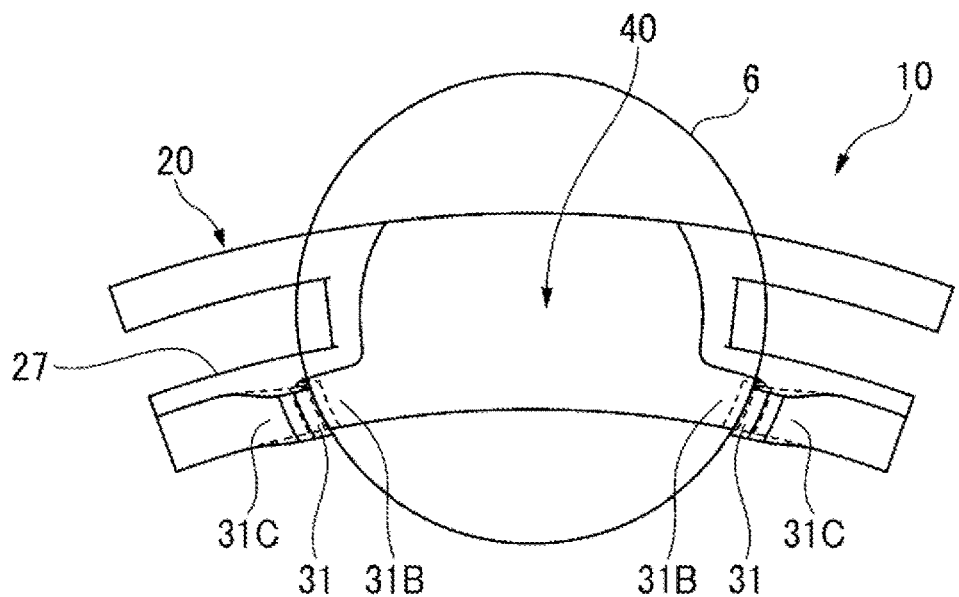
FIG. 51 is a view of a part of the cage according to the comparative example viewed from the upper surface side.

FIG. 49 is a view of a part of the cage 10 according to the comparative example viewed from the radially inner side. FIG. 50 is a partial cross-sectional view of a part of the cage 10 according to the comparative example viewed from the peripheral direction. FIG. 51 is a view of a part of the cage 10 according to the comparative example viewed from the upper surface side. In FIGS. 49 and 50, the ball 6 is shown by broken lines when the ball 6 begins to come into contact with the tip end of the claw portion 31, and the ball 6 is shown by solid lines when the ball 6 reaches the entrance of the pocket 40. In addition, in FIGS. 49 to 51, the cage 10 before elastic deformation is indicated by broken lines, and the cage 10 after elastic deformation is indicated by solid lines.

As can be seen from a contact part A between the second projection portion 29 and the jig 50 shown in FIGS. 49 and 50, the entire surface of the second projection portion 29 is in contact with the jig 50, and a gap is not generated between the second projection portion 29 and the jig 50. When the ball 6 is inserted into the cage 10, the force $Fr_{10}$ and $Fr_{20}$ acting on the tip end of the claw portion 31 tends to push and widen the claw portion 31, but the entire surface of the second projection portion 29 comes into contact with the jig 50. Therefore, the second projection portion 29 can hardly be deformed, and only the claw portion 31 can be deformed. Therefore, in the cage 10 of the comparative example, the strain concentrates on the claw portions 31 unlike the case where the first projection portions 28 are provided as in the present application.

Figure 53:
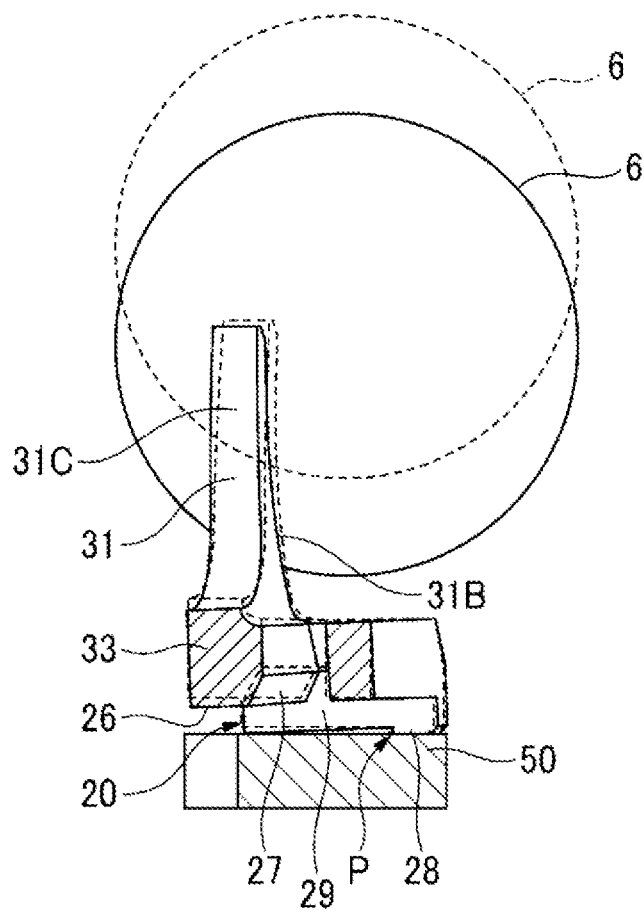
FIG. 53 is a partial cross-sectional view of a part of the cage according to the fourth embodiment viewed from the peripheral direction.
Figure 54:
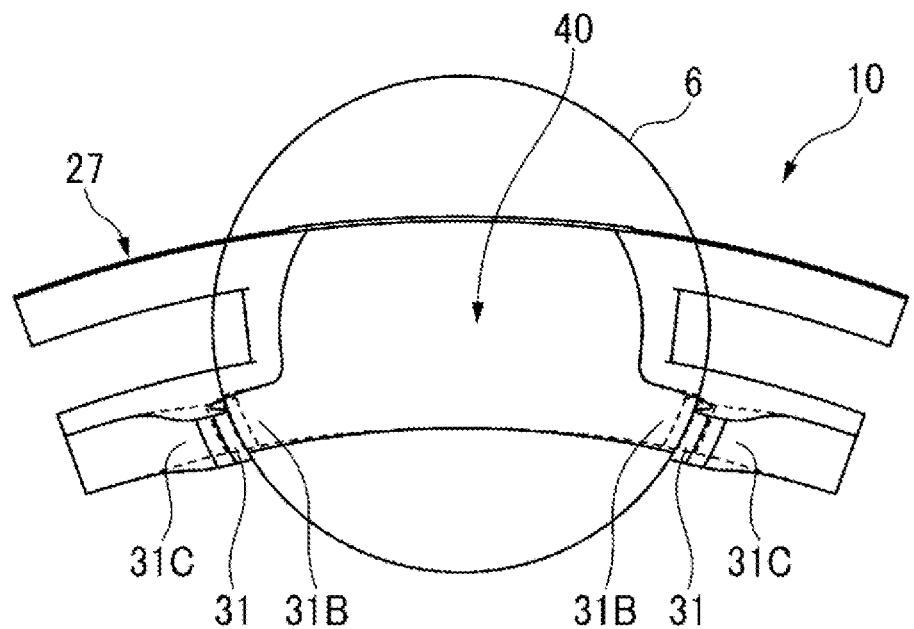
FIG. 54 is a view of a part of the cage according to the fourth embodiment viewed from the upper surface side.

On the other hand, as in the fourth embodiment of the present application, the case where the cage 10 having not only the second projection portion 29 but also the first projection portion 28 is incorporated into the balls 6 will be described in FIGS. 52 to 54.

Figure 52:
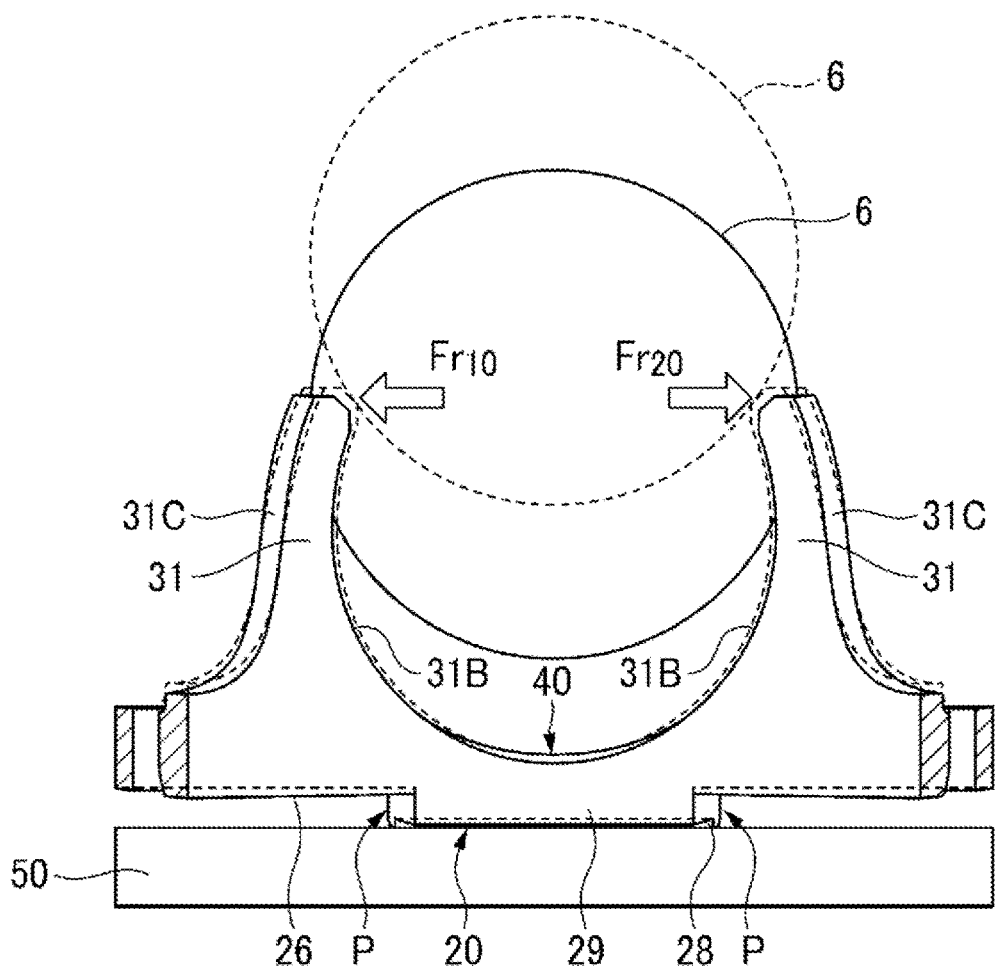
FIG. 52 is a view of a part of the cage according to the fourth embodiment viewed from the radially inner side.

FIG. 52 is a view of a part of the cage 10 according to the fourth embodiment viewed from the radially inner side. FIG. 53 is a partial cross-sectional view of a part of the cage 10 according to the fourth embodiment viewed from the peripheral direction. FIG. 54 is a view of a part of the cage 10 according to the fourth embodiment viewed from the upper surface side. In FIGS. 52 and 53, the ball 6 is shown by broken lines when the ball 6 begins to come into contact with the tip end of the claw portion 31, and the ball 6 is shown by solid lines when the ball 6 reaches the entrance of the pocket 40. In addition, in FIGS. 52 to 54, the cage 10 before elastic deformation is indicated by broken lines, and the cage 10 after elastic deformation is indicated by solid lines.

At this time, the second projection portion 29 does not come into contact with the jig 50. Even if the second projection portion 29 is to come into contact with the jig 50, since the inner peripheral edge of the second projection portion 29 is arc-shaped, only two points at both ends of the inner peripheral edge of the second projection portion 29 in the peripheral direction are slightly in contact with the jig 50. In addition, the inner peripheral edge of the first projection portion 28 comes into contact with the jig 50.

The reason for such a contact state is that, when the ball 6 pushes the claw portion 31 disposed on the radially inner side in the axial direction, with the inner peripheral edge of the first projection portion 28 disposed on the radially outer side as the fulcrum P, the claw portion 31 tends to be tilted to the radially inner side.

Since the claw portions 31 are located only on the radially inner side of the cage 10, a part of the cage 10 on the opposite side of the part in the axial direction where the claw portions 31 are located, that is, the radially inner side portion of the second projection portion 29, hardly comes into contact with the jig 50. Therefore, a gap is generated between the second projection portion 29 and the jig 50.

When the ball 6 is inserted into the cage 10, the forces $Fr_1$ and $Fr_2$ acting on the tip ends of the claw portions 31 tend to push and widen the claw portions 31, but the second projection portions 29 are not in contact with the jig 50. Therefore, the radially inner side portion of the second projection portion 29 can be deformed, and is deformed together with the claw portion 31.

In addition, since the axial thickness of the main portion 20 is sufficiently smaller than the radial width, when the axial forces $Fz_1$ and $Fz_2$ are applied to the claw portions 31, the main portion 20 is screwed and elastically deformed, and is tilted to the radially inner side. When the main portion 20 is tilted to the radially inner side, according to this, the claw portion 31 is also tilted to the radially inner side.

As a result, since the pocket 40 also widens, the forces $Fr_1$ and $Fr_2$ with which the ball 6 pushes and widens the claw portion 31 can be smaller than forces $Fr_{10}$ and $Fr_{20}$ acting on the claw portion 31 ($Fr_1 < Fr_{10}$ and $Fr_2 < Fr_{20}$) when only the second projection portion 29 is provided without the first projection portion 28 as in the comparative example, and thus the deformation amount of the claw portion 31 is also reduced.

As described above, in the cage 10 of the present application, the second projection portion 29 is deformable in addition to the claw portions 31, and thus the force acting on the claw portions 31 is reduced, and the strain generated in the claw portions 31 is reduced.

A crown type cage for a ball bearing and a ball bearing according to seventh to tenth embodiments of the present invention will be described below with reference to the drawings. Here, ball bearings are assembled by placing the plurality of balls equally distributed in the direction of revolution between the inner and outer rings and inserting a cage there. However, in the following description, for ease of understanding, an aspect in which balls are inserted into the cage will be described.

Seventh Embodiment

Figure 55:
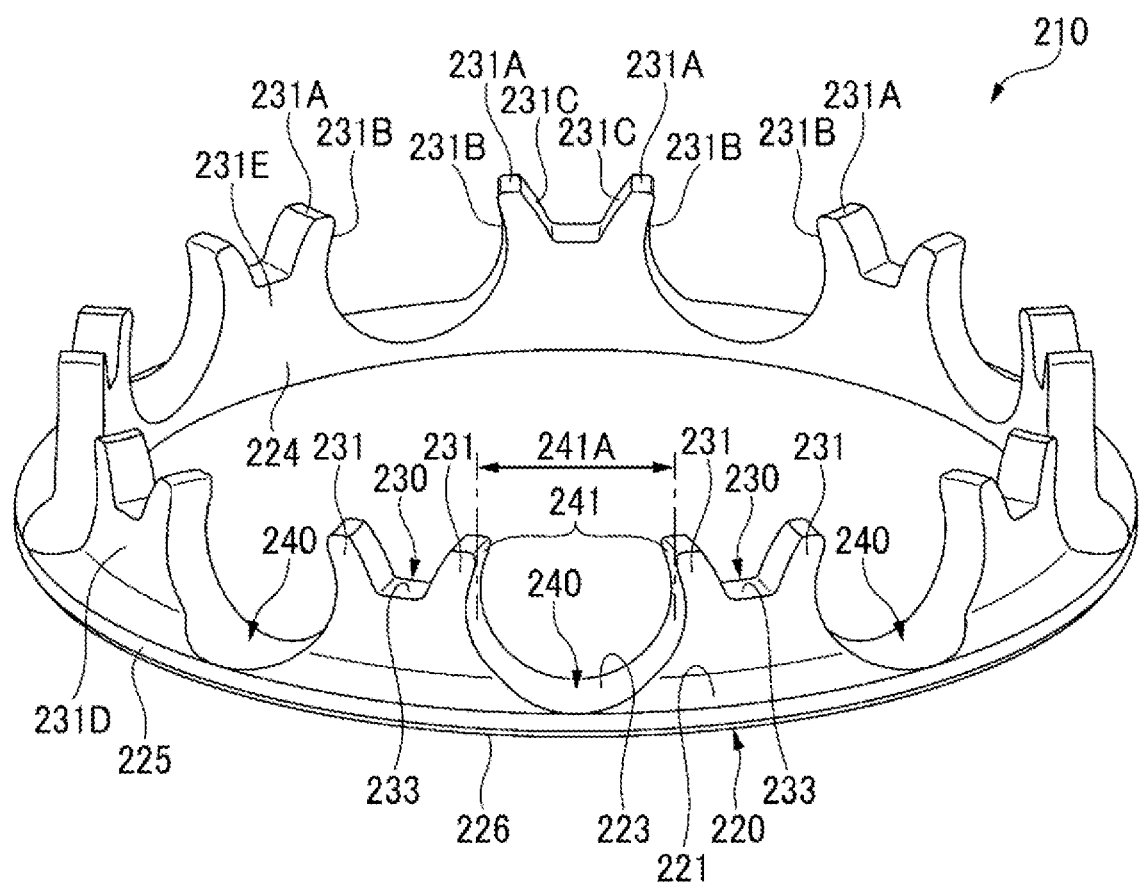
FIG. 55 is a perspective view of a cage according to a seventh embodiment.
Figure 56:
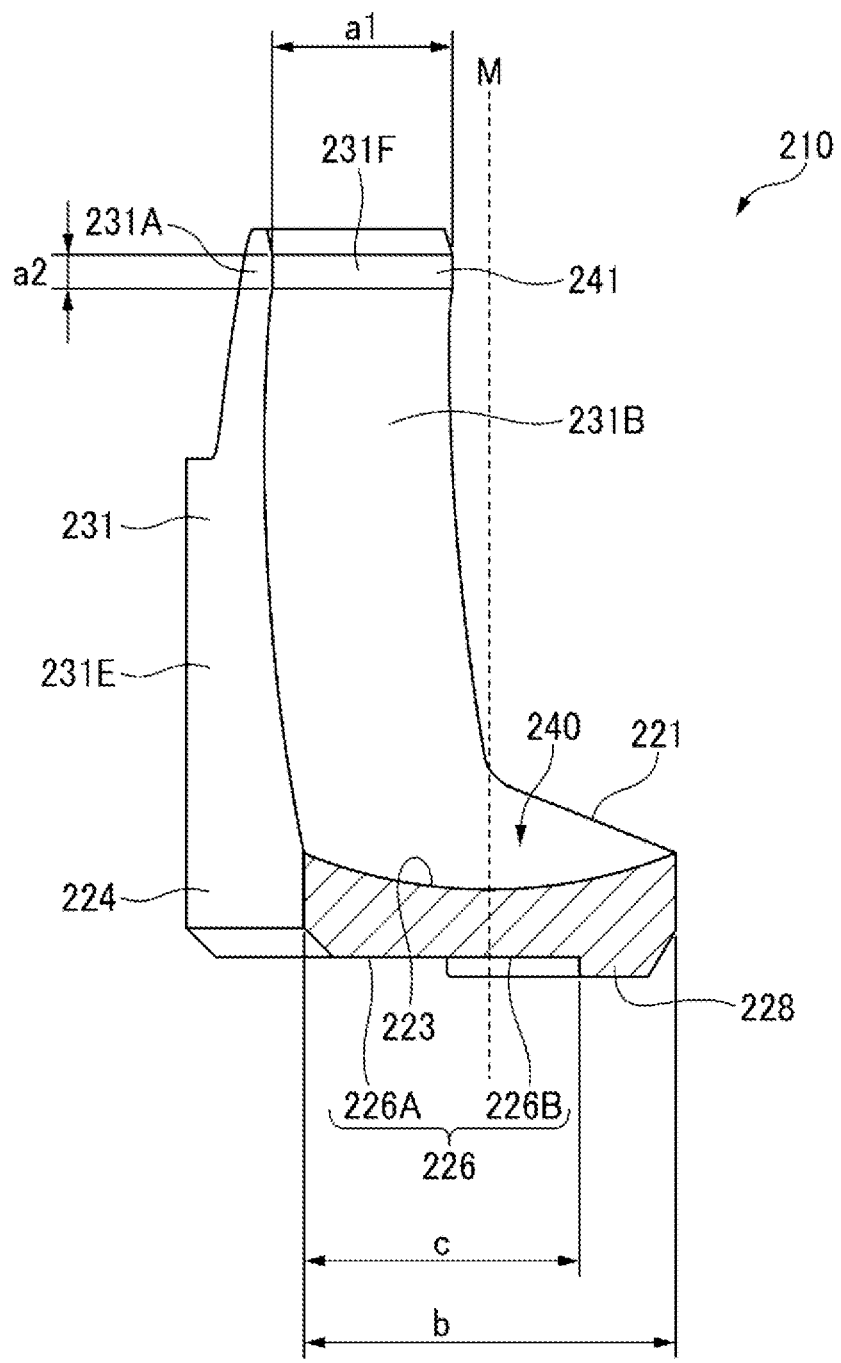
FIG. 56 is a partial cross-sectional perspective view of a part of the cage according to the seventh embodiment.
Figure 57:
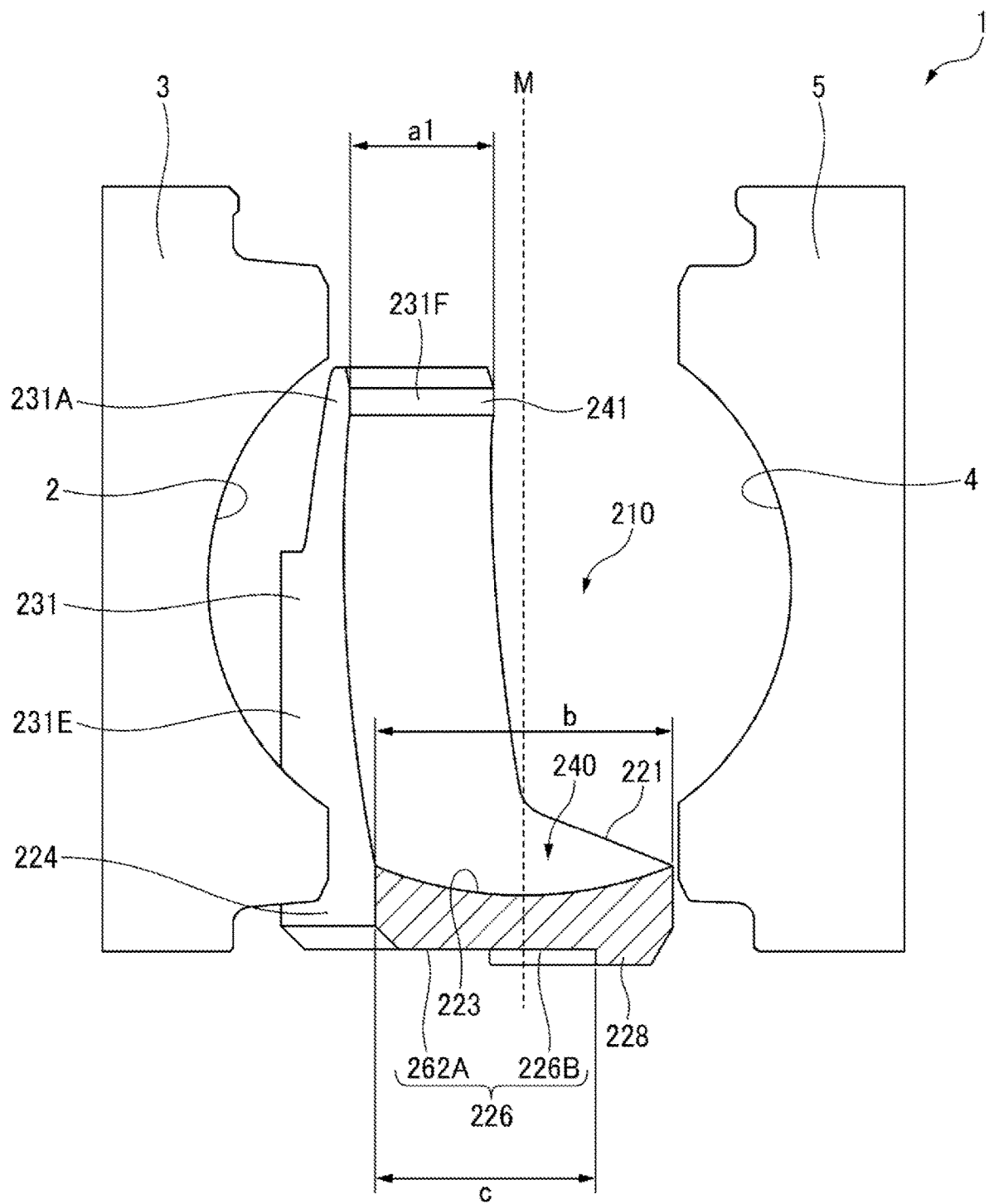
FIG. 57 is a partial cross-sectional perspective view of a part of the cage according to the seventh embodiment.

As shown in FIGS. 55 to 57, a crown type cage for a ball bearing (hereinafter also referred to as a "crown type cage" or simply a "cage") 210 of the present embodiment is applied to the ball bearing 1 shown in FIG. 34 similarly to the cage 100 of the related art shown in FIGS. 35 and 36.

The crown type cage 210 is made of a resin material such as polyamide 6 (PA6), polyamide 66 (PA66), polyamide 46 (PA46), polyamide 9T (PA9T), polyamide 10T (PA10T), polyphenylene sulfide (PPS), polyetheretherketone (PEEK), polyacetal (POM), polybutylene terephthalate (PBT), or polyethylene terephthalate (PET), or other resin materials. Moreover, in order to improve the strength of the cage 210, a resin composition to which 5 to 50% by weight of a fiber-reinforced material (glass fiber, carbon fiber, aramid fiber, cellulose nanofiber, and the like) is added may be used. As a method for manufacturing the cage 210, a method of injection molding using a mold and a manufacturing method with a 3D printer are exemplified.

The crown type cage 210 includes the annular main portion 220, the plurality of pillar portions 230 protruding to one axial side (upper side in the drawing) from the upper surface 221 of the main portion 220 at predetermined intervals in the peripheral direction, and the spherical pocket 240 formed between the adjacent pillar portions 230 and 230 and capable of holding the balls 6 (refer to FIG. 34).

A plurality of spherical recessed surfaces 223 are formed on the upper surface 221 of the main portion 220 at predetermined intervals in the peripheral direction. This recessed surface 223 is formed over the entire radial width of the main portion 220 and forms the pocket 240.

The pillar portion 230 protrudes to the one axial side from the radially inner side portion of the upper surface 221 of the main portion 220. Therefore, an outer peripheral surface 231D of the pillar portion 230 is positioned on the radially inner side of the outer peripheral surface 225 of the main portion 220, and the upper surface 221 of the main portion 220 is exposed on the radially outer side of the pillar portion 230. In the crown type cage 100 (refer to FIGS. 35 and 36) of the related art, the pillar portion 110 protrudes in the axial direction from the entire radial width of the upper surface of the main portion 109, and thus the pillar portion 230 of the present application is different in this respect.

The pillar portion 230 has a pair of claw portions 231 and 231 and a connection portion 233 that connects the pair of claw portions 231 and 231.

Tip end portions 231A and 231A of the pair of claw portions 231 and 231 are spaced apart from each other in the peripheral direction. Further, between the tip end portions 231A and 231A of the two adjacent claw portions 231 and 231 forming the pocket 240, a pocket opening portion 241 having a pocket opening diameter 241A shorter than the diameter of the ball 6 (refer to FIG. 34) and for inserting the ball 6 toward the other axial side, which is opposite to the one axial side is provided.

The claw portion 231 has a spherical first peripheral surface 231B forming the pocket 240 and a second peripheral surface 231C opposite to the first peripheral surface 231B.

The second peripheral surfaces 231C and 231C of the pair of claw portions 231 and 231 are curved, respectively, and connected to each other by the connection portion 233.

The first peripheral surfaces 231B and 231B of the two adjacent claw portions 231 and 231 and the recessed surface 223 of the main portion 220 form the pocket 240. These two first peripheral surfaces 231B and 231B and the recessed surface 223 are smoothly connected to each other to form the spherical recessed surface of the pocket 240. The radius of curvature of the spherical recessed surface of pocket 240 is set larger than the radius of curvature of the rolling surface of the ball 6 (refer to FIG. 34). In addition, an inner peripheral surface 231E of the claw portion 231 (pillar portion 230) is smoothly connected to the inner peripheral surface 224 of the main portion 220 and forms the inner peripheral surface of the cage 210 without a step.

In the pocket opening portion 241 of the cage 210, the balls 6 are inserted from the one axial side (upper side in the drawing) toward the other axial side (lower side in the drawing) opposite to the one axial side. A part of the tip end portion 231A of the claw portion 231, which is positioned closest to the pocket 240 side and forms the pocket opening portion 241, is referred to as a most tip end portion 231F. The most tip end portion 231F is the first contact part when the ball 6 is inserted into the pocket opening portion 241.

The most tip end portion 231F of the present embodiment extends flat across the entire radial width of the tip end portion 231A of the claw portion 231. More specifically, the most tip end portion 231F has a rectangular shape (a1>a2) having the radial width a1 and the axial width a2 when viewed from the peripheral direction. The entire most tip end portion 231F is disposed on the radially inner side of the radially central portion (the radially central portion of the recessed surface 223 of the main portion 220) M of the pocket 240. That is, the radial width a1 of the most tip end portion 231F is equal to or less than half the radial width b of the bottom (recessed surface 223) of the pocket 240 (a1≤b/2).

As described above, when the entire most tip end portion 231F is positioned on the radially inner side of the radially central portion M of the pocket 240, the bottom surface 226 of the main portion 220 is formed protruding toward the other axial side (lower side in the drawing) at a radially outer side part 226B of the radially central portion M of the pocket 240 compared to a radially inner side part 226A of the radially central portion M of the pocket 240.

In the present embodiment, the bottom surface 226 of the main portion 220 is provided with a projection portion 228 which is a part that protrudes to the other axial side. In addition, a radial distance c from the inner peripheral surface 224 of the main portion 220 to the inner peripheral surface of the projection portion 228 is equal to or greater than half the radial width b of the bottom (recessed surface 223) of the pocket 240 (b/2≤c). Therefore, the entire projection portion 228 is disposed on the radially outer side of the radially central portion M of the pocket 240. With such a configuration, the bottom surface 226 of the main portion 220 protrudes to the other axial side (lower side in the drawing) at the radially outer side part 226B compared to the radially inner side part 226A.

The projection portion 228 of the present embodiment is provided on the radially outer side portion of the bottom surface 226 of the main portion 220 over the entire periphery.

Note that the projection portion 228 does not necessarily have to be provided over the entire periphery of the bottom surface 226 of the main portion 220, and at least a part of the projection portion 228 may be provided at a position overlapping the pocket 240 in the peripheral direction and the radial direction (a position overlapping the pocket 240 when viewed from the axial direction). In this case, the plurality of projection portions 228 are preferably provided at predetermined intervals in the peripheral direction at positions overlapping the pockets 240 in the peripheral direction and the radial direction (positions overlapping the pockets 240 when viewed from the axial direction).

Figure 58:
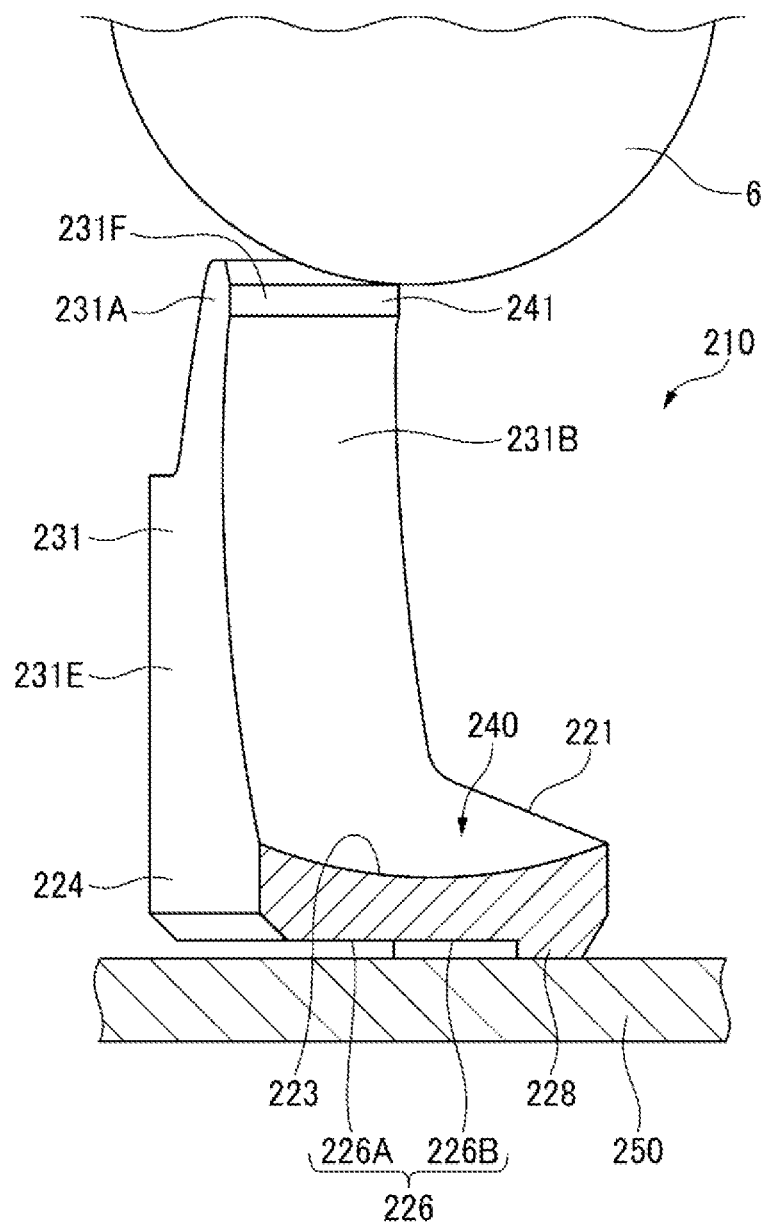
FIG. 58 is a view showing how the cage of the seventh embodiment is incorporated into a bearing.
Figure 59:
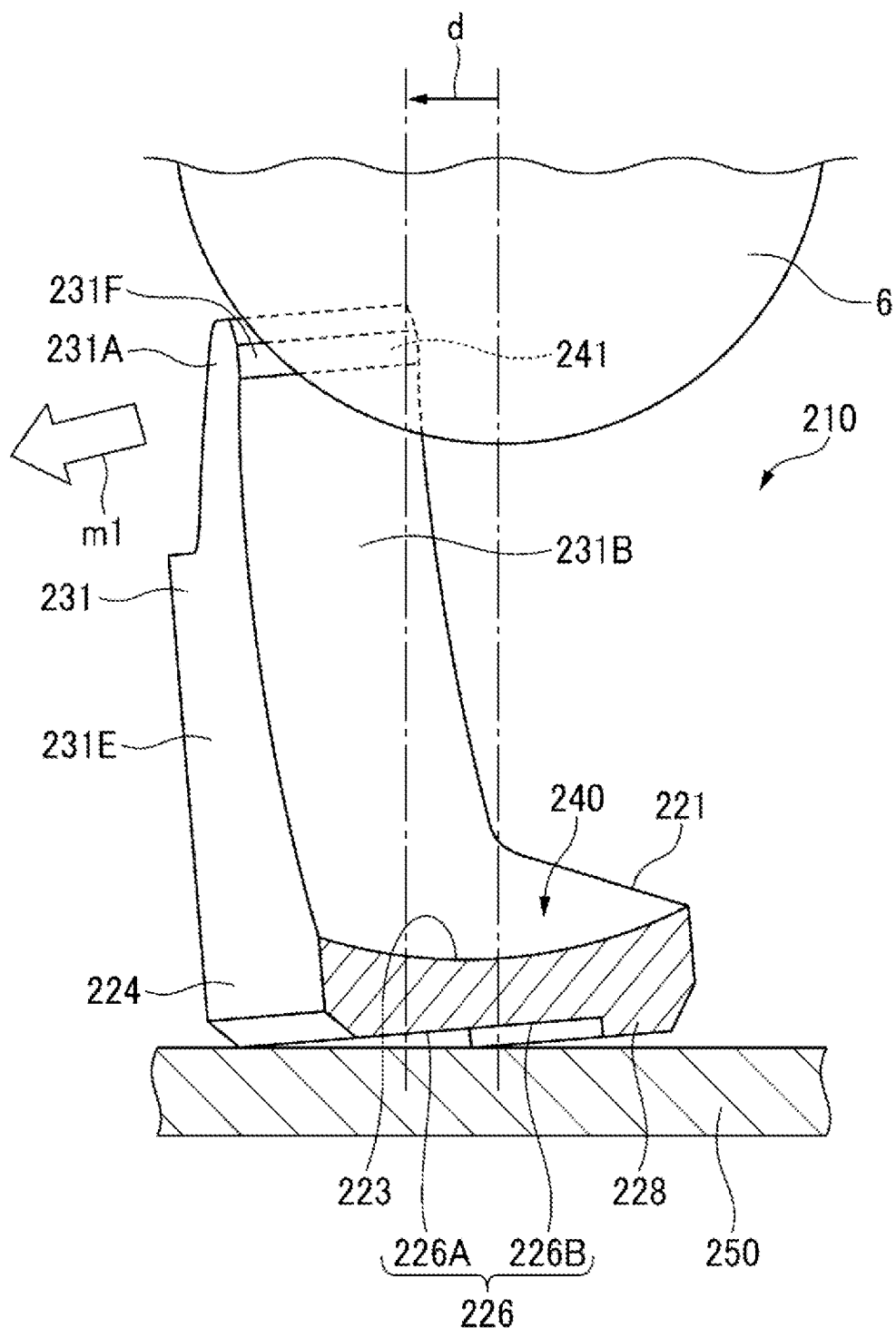
FIG. 59 is a view showing how the cage of the seventh embodiment is incorporated into the bearing.

FIGS. 58 and 59 show how the balls 6 are incorporated into the cage 210 in a state where the cage 210 is placed on the plate-shaped member 250. FIG. 58 shows a state immediately before the balls 6 are incorporated into the cage 210, and FIG. 59 shows a state while the balls 6 are being incorporated into the cage 210.

As shown in FIGS. 58 and 59, since the bottom surface 226 is provided with the projection portion 228, when the ball 6 is incorporated into the cage 210 on the plate-shaped member 250, the claw portion 231 is tilted in the direction opposite to the position where the projection portion 228 is located. That is, since the projection portion 228 is located on the radially outer side, the claw portion 231 is tilted to the radially inner side. In FIG. 59, an arrow m1 indicates the direction in which the claw portion 231 is tilted. In addition, d represents the radial movement amount of the tip end portion 231A of the claw portion 231 between before the ball 6 is incorporated (FIG. 58) and during the ball 6 is incorporated (FIG. 59).

Since the pocket opening portion 241 near the tip end portion 231A of the claw portion 231 moves to the radially inner side in this manner, the contact position between the pocket opening portion 241 and the ball 6 also shifts to the radially inner side. Therefore, when the balls 6 are incorporated, the small diameter part of the balls 6 passes through the pocket opening portion 241, and thus the strain generated in the claw portions 231 is reduced, and the service life of the cage 210 can be extended.

Figure 60:
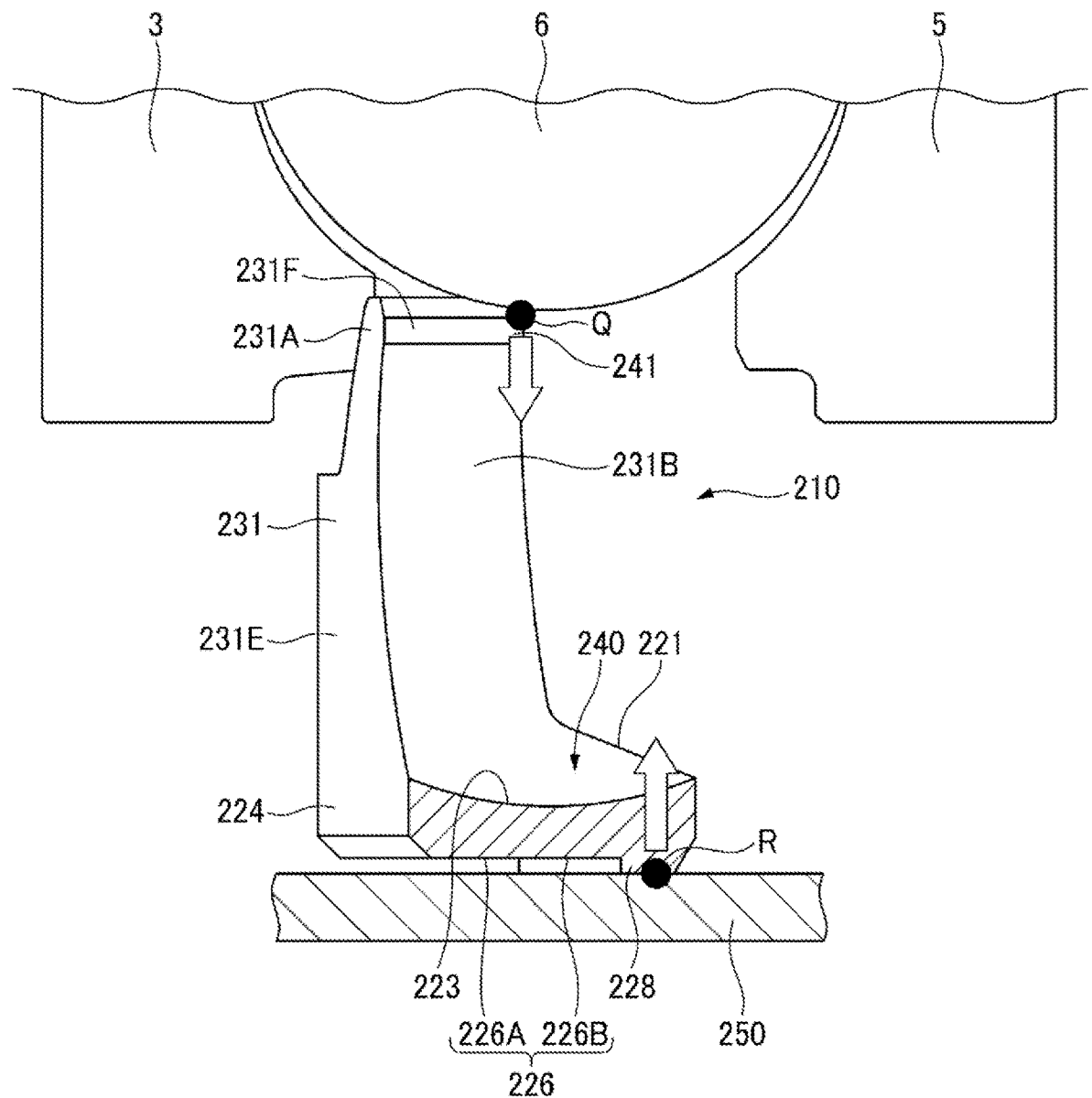
FIG. 60 is a view showing how the cage of the seventh embodiment is incorporated into the bearing.
Figure 61:
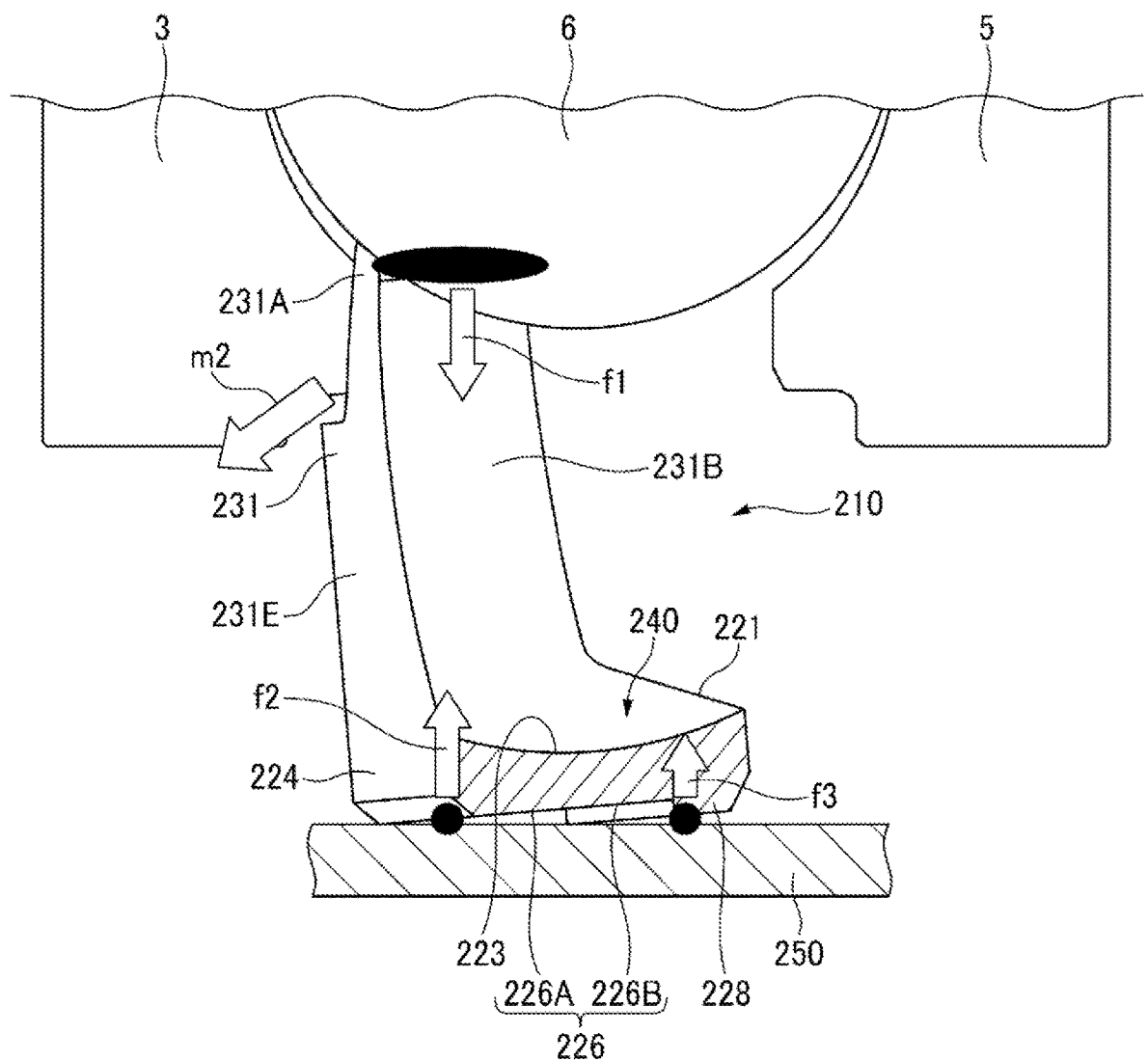
FIG. 61 is a view showing how the cage of the seventh embodiment is incorporated into the bearing.

Similarly to FIGS. 58 and 59, FIGS. 60 and 61 shows how the ball 6 is incorporated into the cage 210 in a state where the cage 210 is placed on the plate-shaped member 250 (the plate-shaped member 250 corresponds to a jig for incorporating the cage 210 into the plurality of balls 6 in the actual bearing assembly step). FIG. 60 shows a state immediately before the balls 6 are incorporated into the cage 210, and FIG. 61 shows a state while the balls 6 are being incorporated into the cage 210. In FIG. 61, an arrow m2 indicates the direction in which the claw portion 231 is tilted.

As shown in FIGS. 60 and 61, the reason why the claw portion 231 is tilted when the ball 6 is incorporated into the cage 210 is that, a point (load point Q) where the ball 6 and the cage 210 (most tip end portion 231F) come into contact with each other, and the contact point (support point R) between the projection portion 228 and the plate-shaped member 250 are far apart, the load direction is not balanced, and thus, the balls 6 are incorporated into the pockets 240 while pushing down the claw portions 231 in the radial direction in an attempt to make a balance. That is, as shown in FIG. 61, while the claw portion 231 is tilted such that a contact load f1 from the balls 6 to the cage 210 and contact loads f2 and f3 from the plate-shaped member 250 to the cage 210 are balanced, the ball 6 is incorporated into the pocket 240.

With this cage 210, even when a material with little elongation is used, the balls 6 can be incorporated without increasing the pocket opening diameter 241A.

(Analysis Result)

FIGS. 62A to 63C show the results of analyzing the strain generated in the cage when the balls are incorporated into the cage. This analysis result is the result when the diameter of the ball 6 reaches the maximum value thereof at the position of the pocket opening portion 241 when the ball 6 is gradually pushed into the cage 210.

Figure 62A:
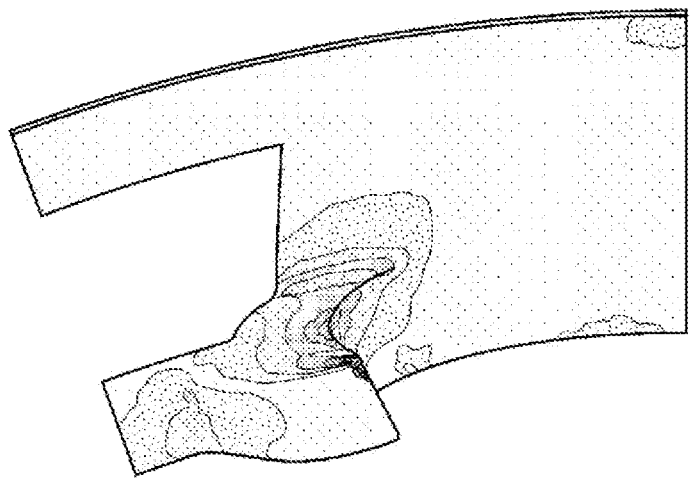
FIG. 62A shows the cage of the seventh embodiment.
Figure 62B:
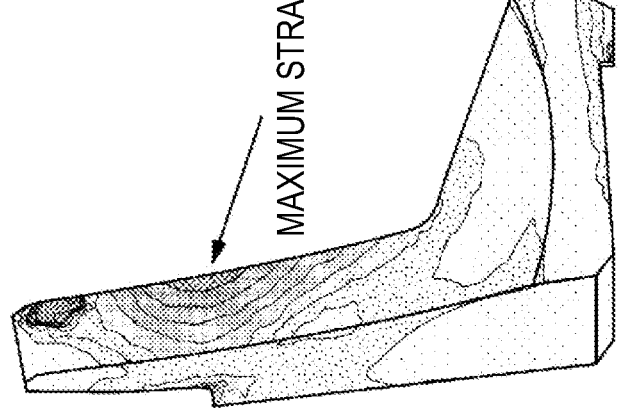
FIGS. 62B and 62C show the strain generated in the cage when the cage of the seventh embodiment is incorporated into the bearing.
Figure 62C:
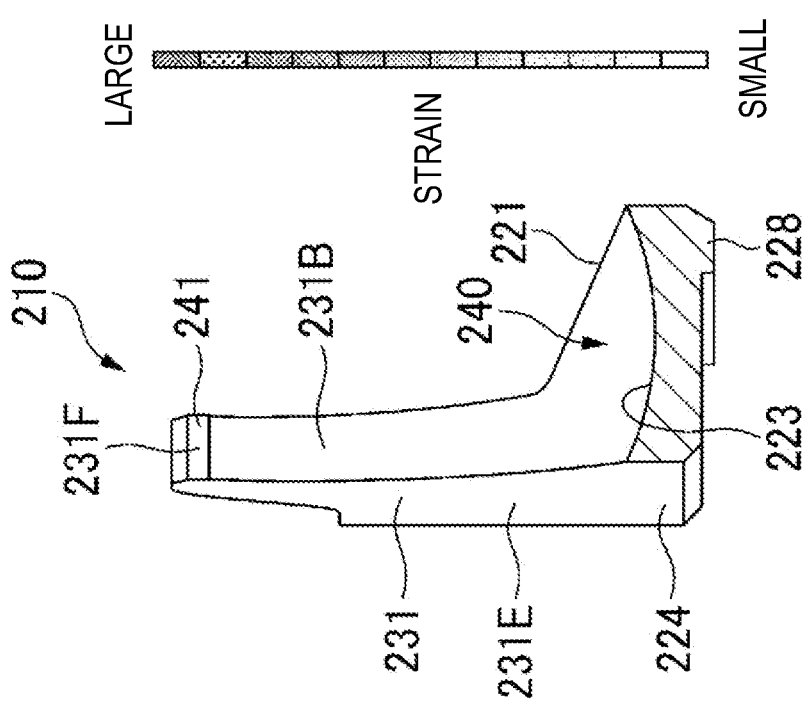

FIG. 62A shows the cage 210 of the seventh embodiment, and FIGS. 62B and 62C show the strain generated in the cage 210 when the ball 6 is incorporated into the cage 210 of the seventh embodiment. FIG. 62B is a view of the cage 210 viewed from the peripheral direction, and FIG. 62C is a view of the cage 210 viewed from one axial side (upper side).

Figure 63A:
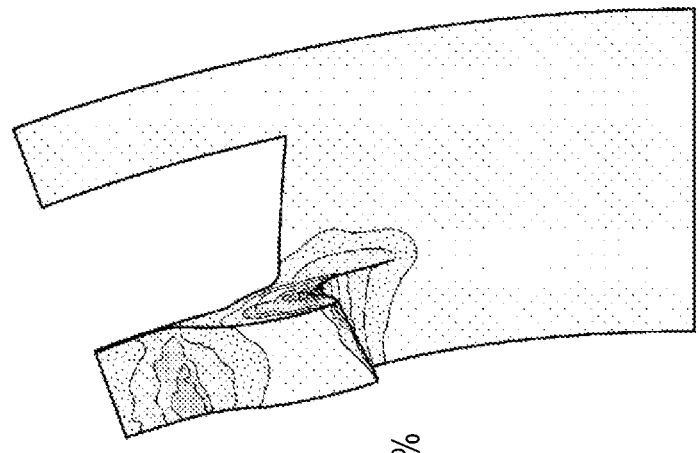
FIG. 63A shows a cage of a comparative example.
Figure 63B:
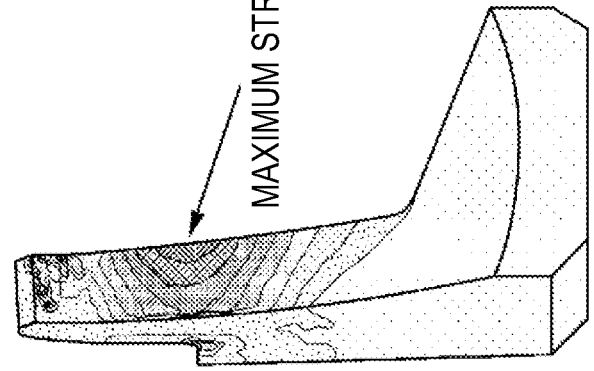
FIGS. 63B and 63C show the strain generated in the cage when the cage of the comparative example is incorporated into the bearing.
Figure 63C:
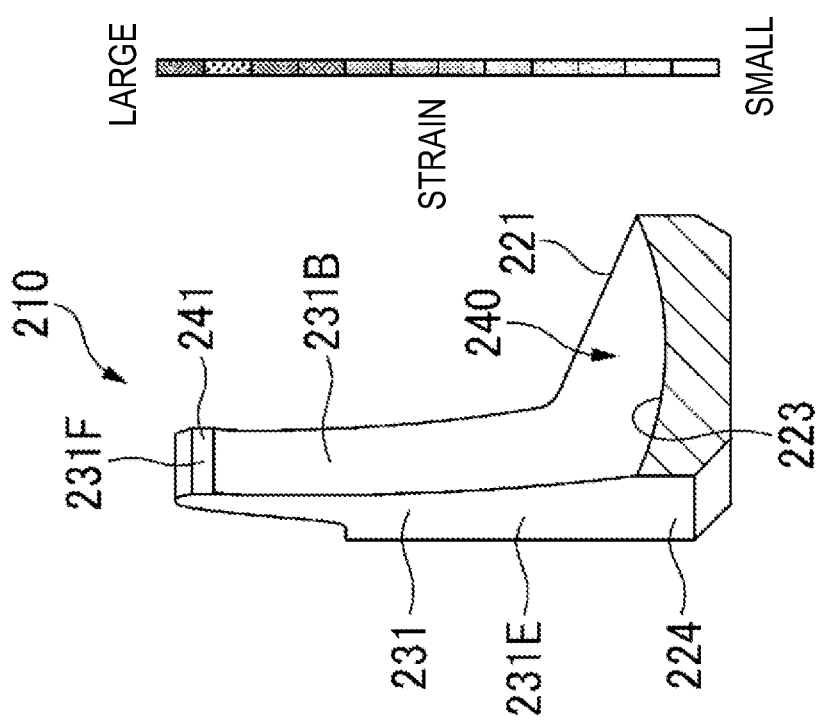

FIG. 63A shows the cage 210 of the comparative example, and FIGS. 63B and 63C show the strain generated in the cage 210 when the ball 6 is incorporated into the cage 210 of the comparative example. FIG. 63B is a view of the cage 210 viewed from the peripheral direction, and FIG. 63C is a view of the cage 210 viewed from the one axial side (upper side). Incidentally, in the cage 210 of the comparative example, the projection portion 228 is not provided on the bottom surface 226 of the main portion 220. The configurations other than the projection portion 228 are the same in the cages 210 of the seventh embodiment and the comparative example.

While the maximum strain generated in the cage 210 of the comparative example was 3.7%, the maximum strain generated in the cage 210 of the seventh embodiment was 2.3%, and it was clarified that the cage 210 of the seventh embodiment could suppress the generation of strain.

Here, Table 1 shows bending breaking strains of thermoplastic resin materials.

TABLE 1

| Material | Bending breaking strain. % |
|---|---|
| PA46-GF25 | 5.2 |
| PA9T-GF25 | 3.2 |
| PA9T-CF20 | 3.2 |
| PA10-CF20 | 2.5 |

Incidentally, "PA46-GF25" is obtained by adding 25% by weight of glass fiber to polyamide 46, "PAST-GF25" is obtained by adding 25% by weight of glass fiber to polyamide 9T, "PA9T-CF20" is obtained by adding 20% by weight of carbon fiber to polyamide 9T, and "PA10T-CF20" is obtained by adding 20% by weight of carbon fiber to polyamide 10T.

Among the thermoplastic resins shown in Table 1, even materials with small bending breaking strain (PAST-GF25, PAST-CF20, and PA10T-CF20) can be adopted as the material for the cage 210 of the seventh embodiment. As described above, with the cage 210 of the seventh embodiment, it is possible to suppress the generation of strain, and thus, even when the material is made of a material having a small elongation, the ball 6 can be incorporated without increasing the pocket opening diameter 241A.

Modification Example of Seventh Embodiment

Figure 64:
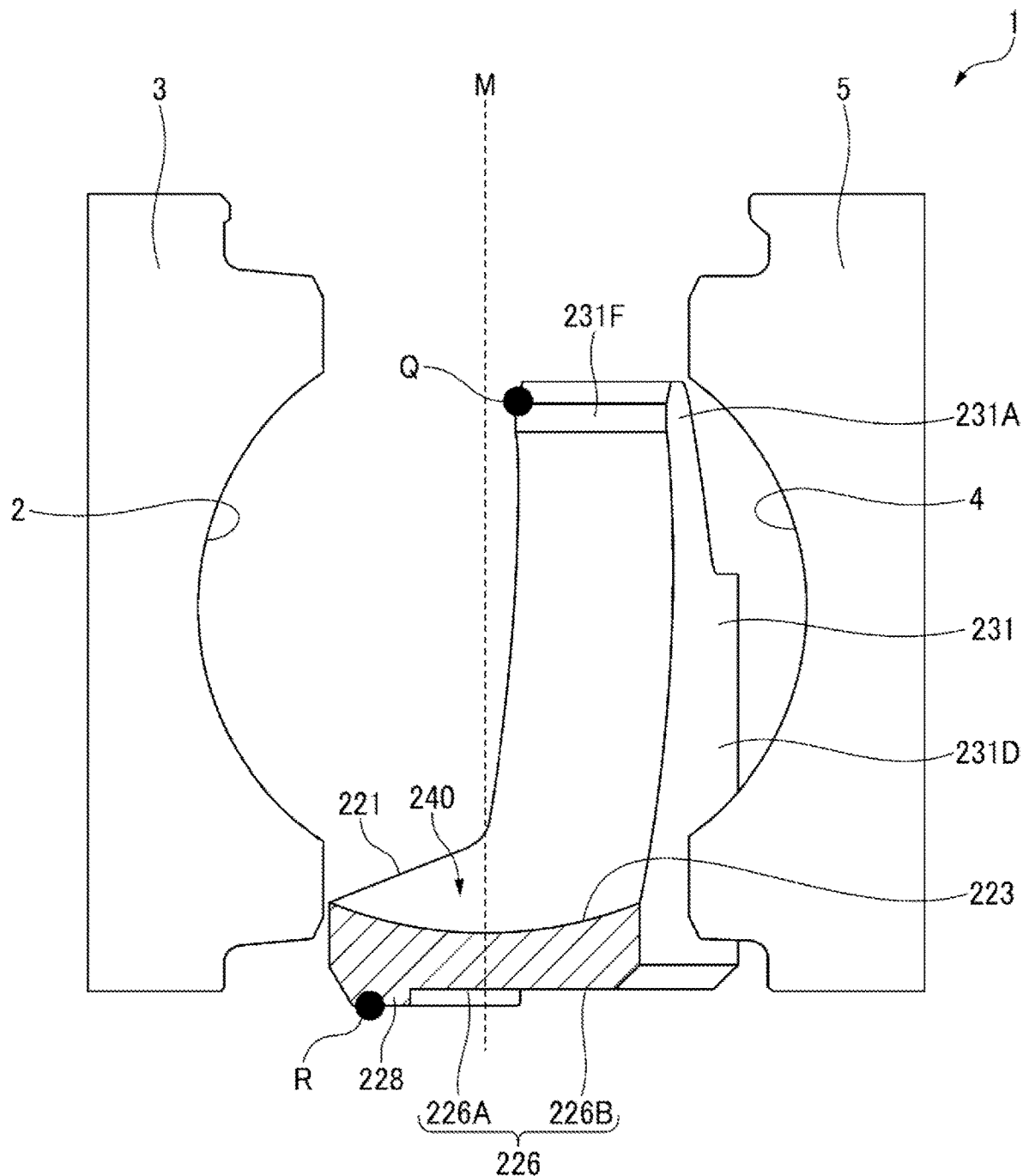
FIG. 64 is a partial cross-sectional perspective view of a part of the cage according to a modification example of the seventh embodiment.

In addition, in the present embodiment, the pillar portion 230 protrudes from the radially inner side portion of the upper surface 221 of the main portion 220 toward the one axial side, and the entire most tip end portion 231F of the claw portion 231 (pocket opening portion 241) was disposed on the radially inner side of the radially central portion M of the pocket 240. However, the present invention is not limited to this configuration, and as shown in FIG. 64, the pillar portion 230 protrudes to the one axial side from the radially outer side portion on the upper surface of the main portion 220, and the entire most tip end portion 231F of the claw portion 231 (pocket opening portion 241) may be disposed on the radially outer side of the radially central portion M of the pocket 240.

When the entire most tip end portion 231F of the claw portion 231 is disposed on the radially outer side of the radially central portion M of the pocket 240, the bottom surface 226 of the main portion 220 protrudes toward the other axial side (lower side in the drawing) at a radially inner side part 226A of the radially central portion M of the pocket 240 compared to the radially outer side part 226B of the radially central portion M of the pocket 240.

Specifically, the projection portion 228 that protrudes to the other axial side is provided on the bottom surface 226 of the main portion 220. In addition, the entire projection portion 228 is disposed on the radially inner side of the radially central portion M of the pocket 240. With such a configuration, the bottom surface 226 of the main portion 220 protrudes to the other axial side (lower side in the drawing) at the radially inner side part 226A compared to the radially outer side part 226B.

With this configuration, when the balls 6 are incorporated into the cage 210 on the plate-shaped member 250 (refer to FIGS. 58 to 61), the point (load point Q) where the ball 6 and the cage 210 (most tip end portion 231F) come into contact with each other, and the contact point (support point R) between the projection portion 228 and the plate-shaped member 250 are far apart, the load direction is not balanced, and thus, the balls 6 are incorporated into the pockets 240 while pushing down the claw portions 231 in the radial direction in an attempt to make a balance. That is, while the most tip end portion 231F of the claw portion 231 is located on the radially outer side, the projection portion 228 is located on the radially inner side, the claw portion 231 is tilted to the radially outer side.

Therefore, when the balls 6 are incorporated into the cage 210, the claw portion 231 is tilted to the radially outer side, the small diameter part of the balls 6 passes through the pocket opening portion 241, and thus the strain generated in the claw portions 231 is reduced, and the service life of the cage 210 can be extended.

Eighth Embodiment

Figure 65:
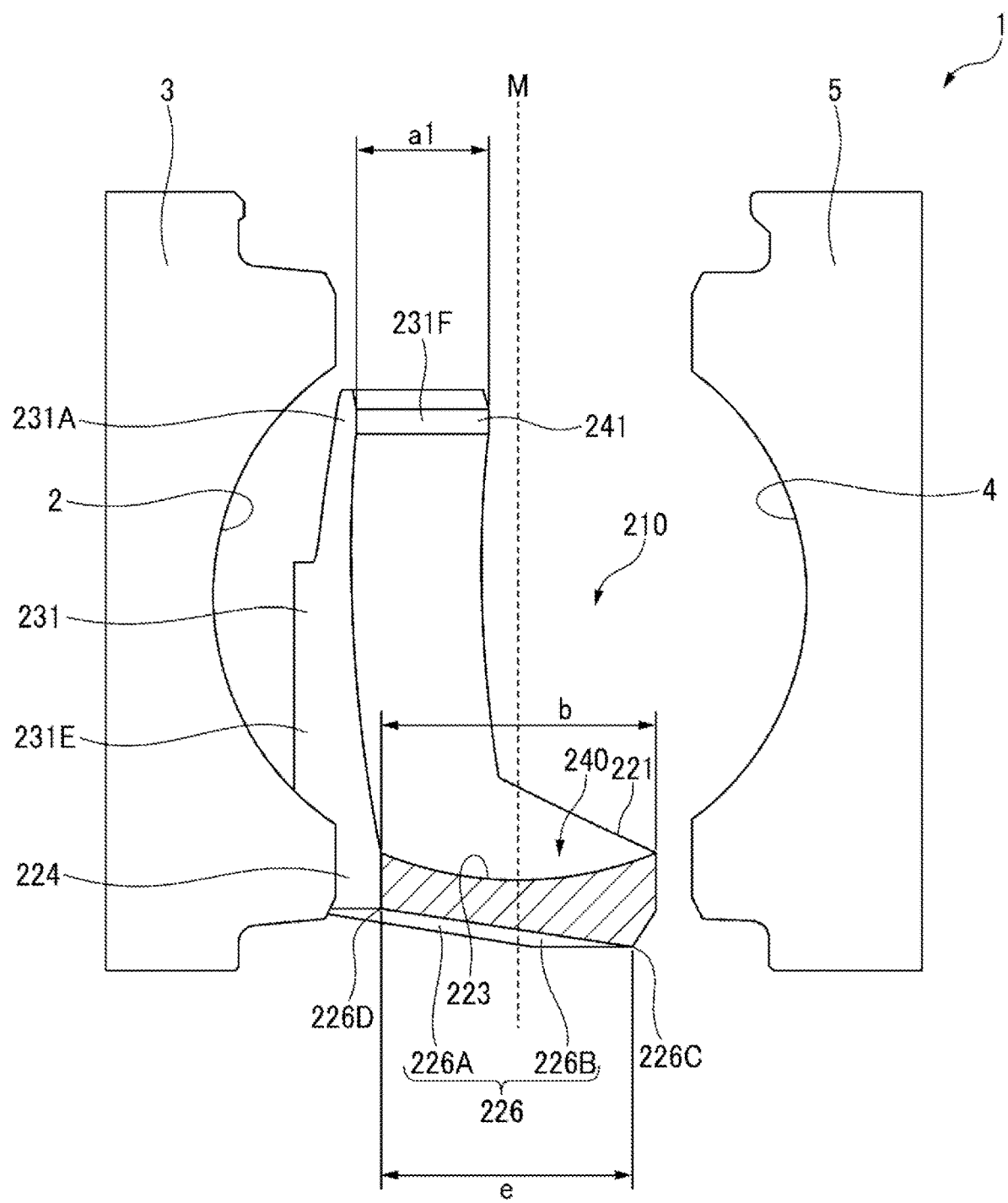
FIG. 65 is a partial cross-sectional perspective view of a part of a cage according to an eighth embodiment.

FIG. 65 discloses a cage 210 according to an eighth embodiment. The cage 210 of the present embodiment differs from the cage 210 of the seventh embodiment in that the bottom surface 226 of the main portion 220 is an inclined surface. Since the rest of the configuration is substantially the same as that of the above-described embodiment, the description thereof will be omitted by attaching reference numerals to the drawings.

In the present embodiment, the entire most tip end portion 231F (pocket opening portion 241) of the claw portion 231 is disposed on the radially inner side of the radially central portion M of the pocket 240, similarly to the seventh embodiment. However, unlike the seventh embodiment, the bottom surface 226 of the main portion 220 is not provided with the projection portion 228.

The part that protrudes to the other axial side is provided on the bottom surface of the main portion 220. That is, the bottom surface 226 of the main portion 220 is an inclined surface that protrudes to the other axial side (lower side in the drawing) from the radially inner side toward the radially outer side. A radially outermost portion 226C (a part that protrudes most to the other axial side) of the inclined surface of the bottom surface 226 is disposed on the radially outer side of the radially central portion M of the pocket 240. That is, a radial distance e from the inner peripheral surface 224 of the main portion 220 to the radially outermost portion 226C is set to be equal to or greater than half the radial width b of the bottom (recessed surface 223) of the pocket 240 (e≥b/2).

In this manner, the bottom surface 226 of the main portion 220 further protrudes to the other axial side (lower side in the drawing) at the radially outer side part 226B of the radially central portion M of the pocket 240 compared to the radially inner side part 226A of the radially central portion M of the pocket 240.

With this configuration, when the balls 6 are incorporated into the cage 210 on the plate-shaped member 250 (refer to FIGS. 58 to 61), the contact point between the ball 6 and the cage 210 (most tip end portion 231F) and the contact point between the radially outermost portion 226C of the bottom surface (inclined surface) 226 and the plate-shaped member 250 are far apart, the load direction is not balanced, and thus, the balls 6 are incorporated into the pockets 240 while pushing down the claw portions 231 in the radial direction in an attempt to make a balance. That is, while the most tip end portion 231F of the claw portion 231 is located on the radially inner side, the radially outermost portion 226C of the bottom surface (inclined surface) 226 is located on the radially outer side, the claw portion 231 is tilted to the radially inner side.

Therefore, when the balls 6 are incorporated into the cage 210, the claw portion 231 is tilted to the radially inner side, the small diameter part of the balls 6 passes through the pocket opening portion 241, and thus the strain generated in the claw portions 231 is reduced, and the service life of the cage 210 can be extended.

Modification Example of Eighth Embodiment

Figure 66:
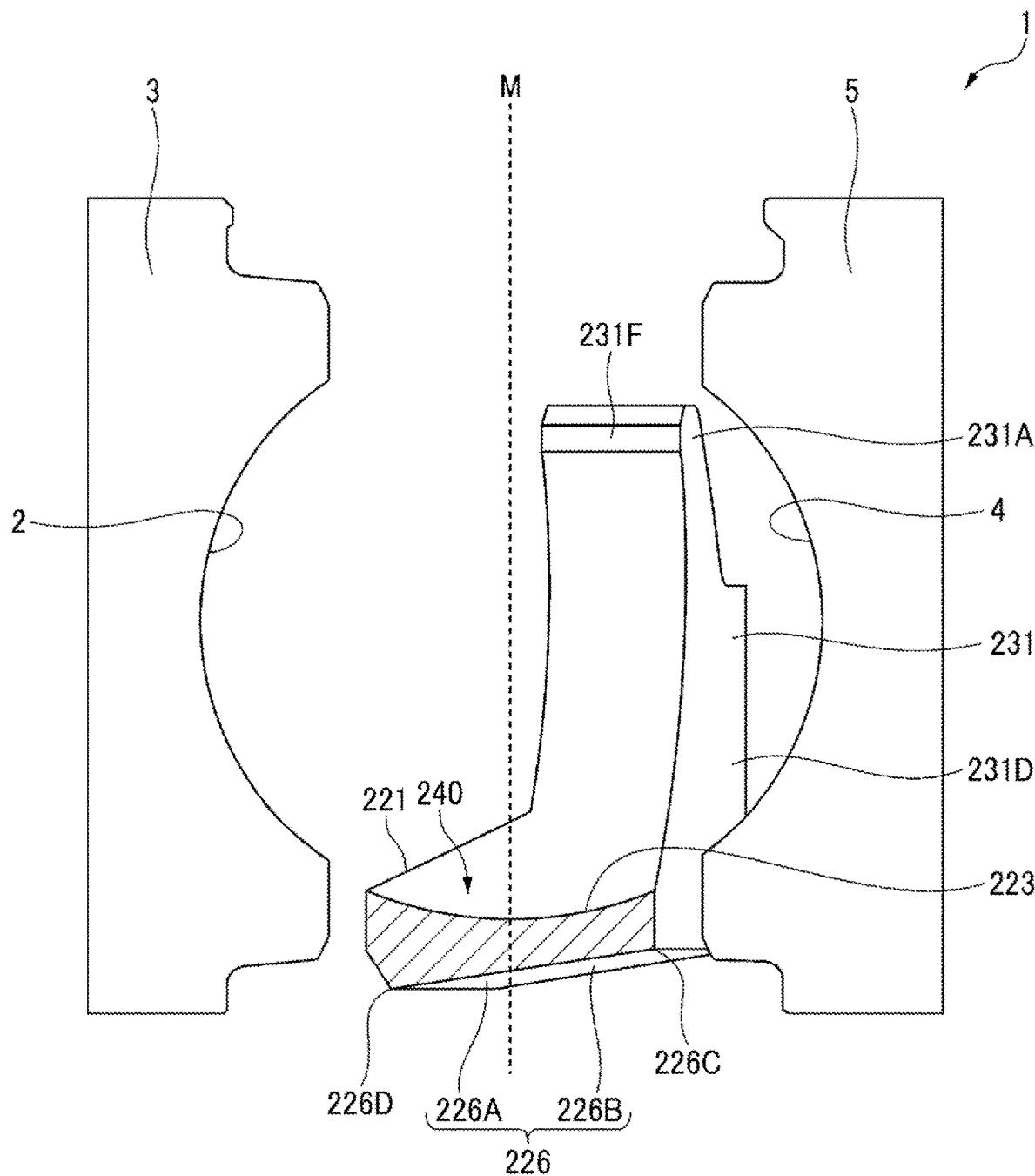
FIG. 66 is a partial cross-sectional perspective view of a part of the cage according to the modification example of the eighth embodiment.

In addition, in the present embodiment, the pillar portion 230 protrudes from the radially inner side portion of the upper surface 221 of the main portion 220 toward the one axial side, and the entire most tip end portion 231F of the claw portion 231 (pocket opening portion 241) is disposed on the radially inner side of the radially central portion M of the pocket 240. However, the present invention is not limited to this configuration, and as shown in FIG. 66, the pillar portion 230 protrudes to the one axial side from the radially outer side portion on the upper surface 221 of the main portion 220, and the entire most tip end portion 231F of the claw portion 231 (pocket opening portion 241) may be disposed on the radially outer side of the radially central portion M of the pocket 240.

When the entire most tip end portion 231F (pocket opening portion 241) of the claw portion 231 is disposed on the radially outer side of the radially central portion M of the pocket 240, the bottom surface 226 of the main portion 220 protrudes toward the other axial side (lower side in the drawing) at a radially inner side part 226A of the radially central portion M of the pocket 240 compared to the radially outer side part 226B of the radially central portion M of the pocket 240.

Specifically, the bottom surface 226 of the main portion 220 is an inclined surface that protrudes to the other axial side (lower side in the drawing) from the radially outer side toward the radially inner side. A radially innermost portion 226D (a part that protrudes most to the other axial side) of the inclined surface of the bottom surface 226 is disposed on the radially inner side of the radially central portion M of the pocket 240. With such a configuration, the bottom surface 226 of the main portion 220 protrudes to the other axial side (lower side in the drawing) at the radially inner side part 226A compared to the radially outer side part 226B.

With this configuration, when the balls 6 are incorporated into the cage 210 on the plate-shaped member 250 (refer to FIGS. 58 to 61), the contact point between the ball 6 and the cage 210 (most tip end portion 231F) and the contact point between the radially innermost portion 226D of the bottom surface (inclined surface) 226 and the plate-shaped member 250 are far apart, the load direction is not balanced, and thus, the balls 6 are incorporated into the pockets 240 while pushing down the claw portions 231 in the radial direction in an attempt to make a balance. That is, while the most tip end portion 231F of the claw portion 231 is located on the radially outer side, the radially innermost portion 226D of the bottom surface (inclined surface) 226 is located on the radially inner side, the claw portion 231 is tilted to the radially outer side.

Therefore, when the balls 6 are incorporated into the cage 210, the claw portion 231 is tilted to the radially outer side, the small diameter part of the balls 6 passes through the pocket opening portion 241, and thus the strain generated in the claw portions 231 is reduced, and the service life of the cage 210 can be extended.

Ninth Embodiment

Figure 67:
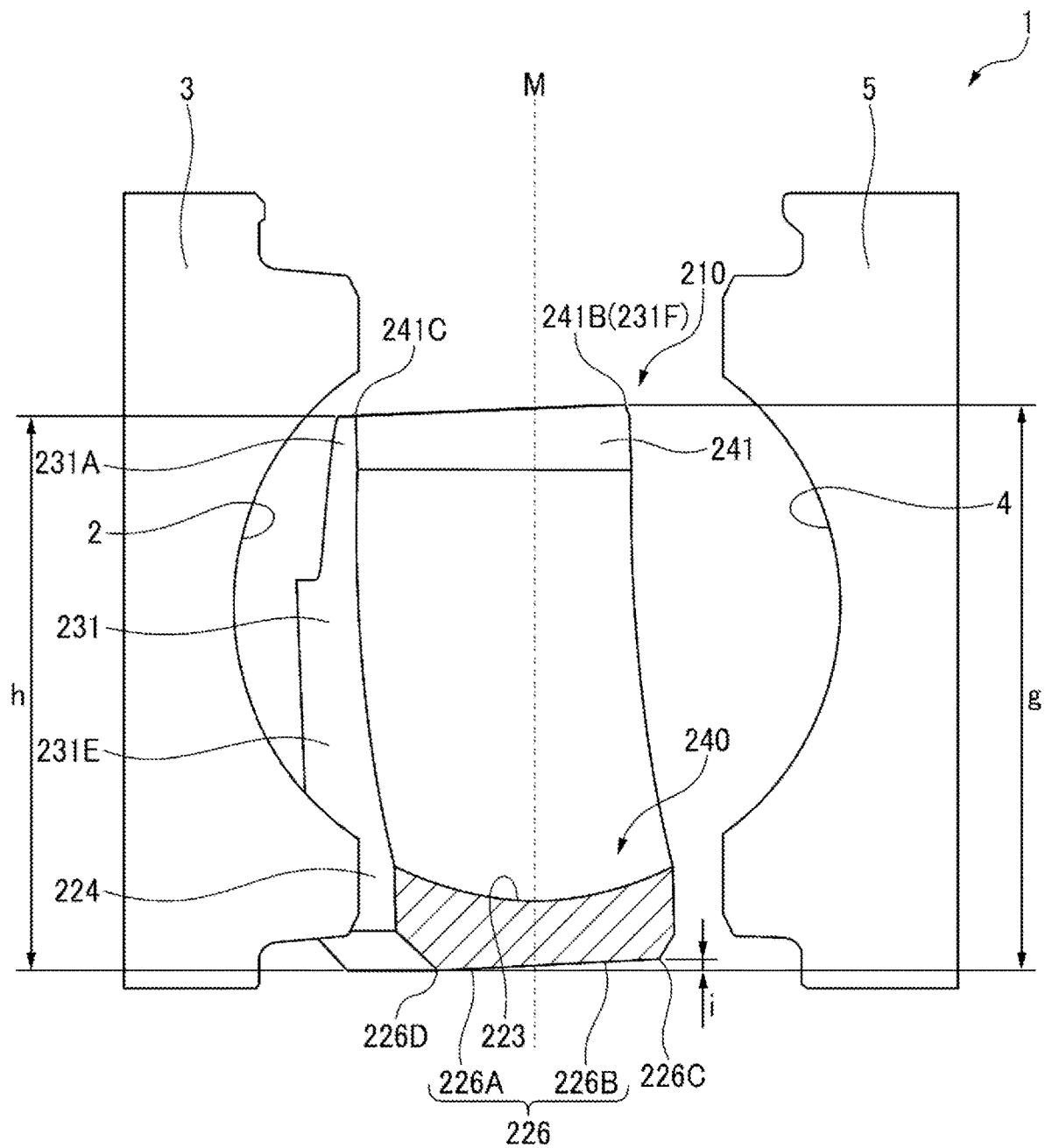
FIG. 67 is a partial cross-sectional perspective view of a part of a cage according to a ninth embodiment.

FIG. 67 discloses the cage 210 according to a ninth embodiment. The cage 210 of the present embodiment differs from the cage 210 of the above-described embodiment in that the bottom surface 226 of the main portion 220 is an inclined surface and the tip end portion 231A of the claw portion 231 is an inclined surface. Since the rest of the configuration is substantially the same as that of the above-described embodiment, the description thereof will be omitted by attaching reference numerals to the drawings.

In the present embodiment, the tip end portion 231A of the claw portion 231 is formed as an inclined surface that protrudes to the one axial side (upper side in the drawing) from the radially inner side to the radially outer side. As a result, the pocket opening portion 241 also protrudes to the one axial side from the radially inner side to the radially outer side. Therefore, the most tip end portion 231F of the claw portion 231, which is the part that forms the pocket opening portion 241 and is the part that first comes into contact when the ball 6 is inserted into the cage 210, is positioned at the radially outermost portion 241B of the pocket opening portion 241. In addition, the most tip end portion 231F (radially outermost portion 241B) of the claw portion 231 is positioned on the radially outer side of the radially central portion M of the pocket 240, and a radially innermost portion 241C of the pocket opening portion 241 is positioned on the radially inner side of the radially central portion M of the pocket 240.

The bottom surface 226 of the main portion 220 is an inclined surface that protrudes to the other axial side (lower side in the drawing) from the radially outer side toward the radially inner side. A radially innermost portion 226D (a part that protrudes most to the other axial side) of the inclined surface of the bottom surface 226 is disposed on the radially inner side of the radially central portion M of the pocket 240.

In this manner, the bottom surface 226 of the main portion 220 further protrudes to the other axial side (lower side in the drawing) at the radially inner side part 226A of the radially central portion M of the pocket 240 compared to the radially outer side part 226B of the radially central portion M of the pocket 240.

That is, when the axial distance from the radially innermost portion 226D of the bottom surface 226 to the end portion on the one axial side (upper side in the drawing) of the radially outermost portion 241B (most tip end portion 231F) of the pocket opening portion 241 is defined as g, the axial distance from the radially innermost portion 226D of the bottom surface 226 to the end portion on the one axial side (upper side in the drawing) of the radially innermost portion 241C of the pocket opening portion 241 is defined as h, and the axial distance from the radially innermost portion 226D of the bottom surface 226 to the radially outermost portion 226C of the bottom surface 226 is defined as i, the relationships of g>h and i>0 are satisfied.

With this configuration, when the ball 6 is incorporated into the cage 210 on the plate-shaped member 250 (refer to FIGS. 58 to 61), the contact point between the ball 6 and the most tip end portion 231F (radially outermost portion 241B) of the claw portion 231 of the cage 210 and the contact point between the radially innermost portion 226D of the bottom surface (inclined surface) 226 and the plate-shaped member 250 are far apart, the load direction is not balanced. Therefore, the ball 6 is incorporated into the pocket 240 while pushing down the claw portion 231 in the radial direction such that the gap (radial distance i) between the radially outermost portion 226C of the bottom surface 226 and the plate-shaped member 250 on the other axial side (lower side in the drawing) is filled in order to balance the load directions. That is, while the most tip end portion 231F of the claw portion 231 is located on the radially outer side, the radially innermost portion 226D of the bottom surface (inclined surface) 226 is located on the radially inner side, the claw portion 231 is tilted to the radially outer side.

Therefore, when the balls 6 are incorporated into the cage 210, the claw portion 231 is tilted to the radially outer side, the small diameter part of the balls 6 passes through the pocket opening portion 241, and thus the strain generated in the claw portions 231 is reduced, and the service life of the cage 210 can be extended.

Modification Example of Ninth Embodiment

In addition, in the present embodiment, the tip end portion 231A of the claw portion 231 is an inclined surface that protrudes to one axial side (upper side in the drawing) from the radially inner side toward the radially outer side, and accordingly, the pocket opening portion 241 also protrudes to the one axial side from the radially inner side to the radially outer side. As a result, the most tip end portion 231F of the claw portion 231 was positioned at the radially outermost portion 241B of the pocket opening portion 241.

Figure 68:
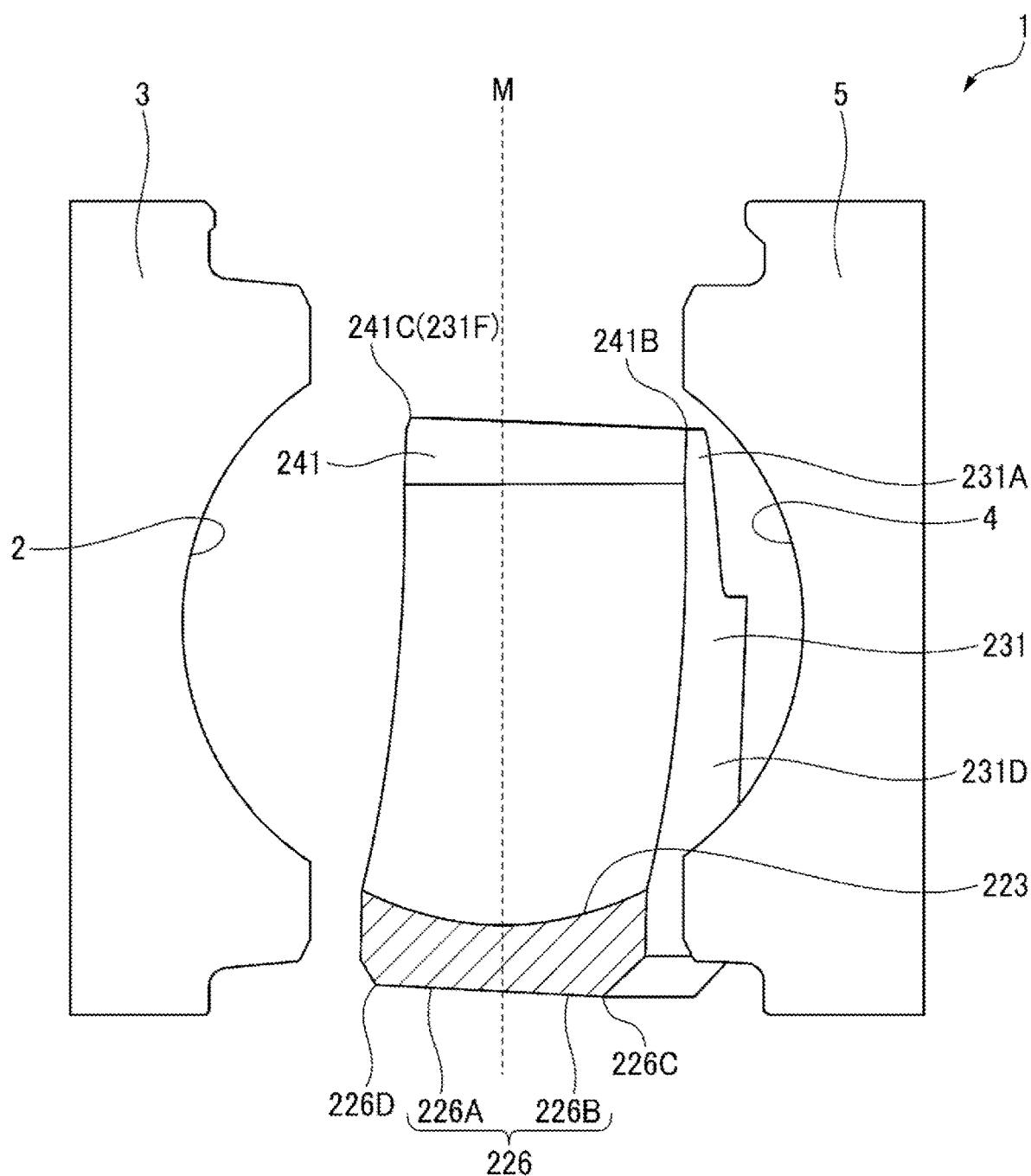
FIG. 68 is a partial cross-sectional perspective view of a part of the cage according to a modification example of the ninth embodiment.

However, the present invention is not limited to this configuration, and as shown in FIG. 68, the tip end portion 231A of the claw portion 231 may be formed as an inclined surface that protrudes to one axial side (upper side in the drawing) from the radially outer side to the radially inner side. In this case, the pocket opening portion 241 also protrudes to the one axial side from the radially outer side to the radially inner side. Therefore, the most tip end portion 231F of the claw portion 231, which is the part that forms the pocket opening portion 241 and is the part that first comes into contact when the ball 6 is inserted, is positioned at the radially innermost portion 241C of the pocket opening portion 241.

In this case, the most tip end portion 231F (radially innermost portion 241C) of the claw portion 231 is positioned on the radially inner side of the radially central portion M of the pocket 240, and the radially outermost portion 241B of the pocket opening portion 241 is positioned on the radially outer side of the radially central portion M of the pocket 240.

The bottom surface 226 of the main portion 220 further protrudes to the other axial side (lower side in the drawing) at the radially outer side part 226B of the radially central portion M of the pocket 240 compared to the radially inner side part 226A of the radially central portion M of the pocket 240.

Specifically, the bottom surface 226 of the main portion 220 is an inclined surface that protrudes to the other axial side (lower side in the drawing) from the radially inner side toward the radially outer side. A radially outermost portion 226C (a part that protrudes most to the other axial side) of the inclined surface of the bottom surface 226 is disposed on the radially outer side of the radially central portion M of the pocket 240. With such a configuration, the bottom surface 226 of the main portion 220 protrudes to the other axial side (lower side in the drawing) at the radially outer side part 226B compared to the radially inner side part 226A.

With this configuration, when the ball 6 is incorporated into the cage 210 on the plate-shaped member 250 (refer to FIGS. 58 to 61), the contact point between the ball 6 and the most tip end portion 231F (radially innermost portion 241C) of the claw portion 231 of the cage 210 and the contact point between the radially outermost portion 226C of the bottom surface (inclined surface) 226 and the plate-shaped member 250 are far apart, the load direction is not balanced. Therefore, the ball 6 is incorporated into the pocket 240 while pushing down the claw portion 231 in the radial direction such that the gap between the radially innermost portion 226D of the bottom surface 226 and the plate-shaped member 250 on the other axial side (lower side in the drawing) is filled in order to balance the load directions. That is, while the most tip end portion 231F of the claw portion 231 is located on the radially inner side, the radially outermost portion 226C of the bottom surface (inclined surface) 226 is located on the radially outer side, the claw portion 231 is tilted to the radially inner side.

Therefore, when the balls 6 are incorporated into the cage 210, the claw portion 231 is tilted to the radially inner side, the small diameter part of the balls 6 passes through the pocket opening portion 241, and thus the strain generated in the claw portions 231 is reduced, and the service life of the cage 210 can be extended.

Tenth Embodiment

Figure 69:
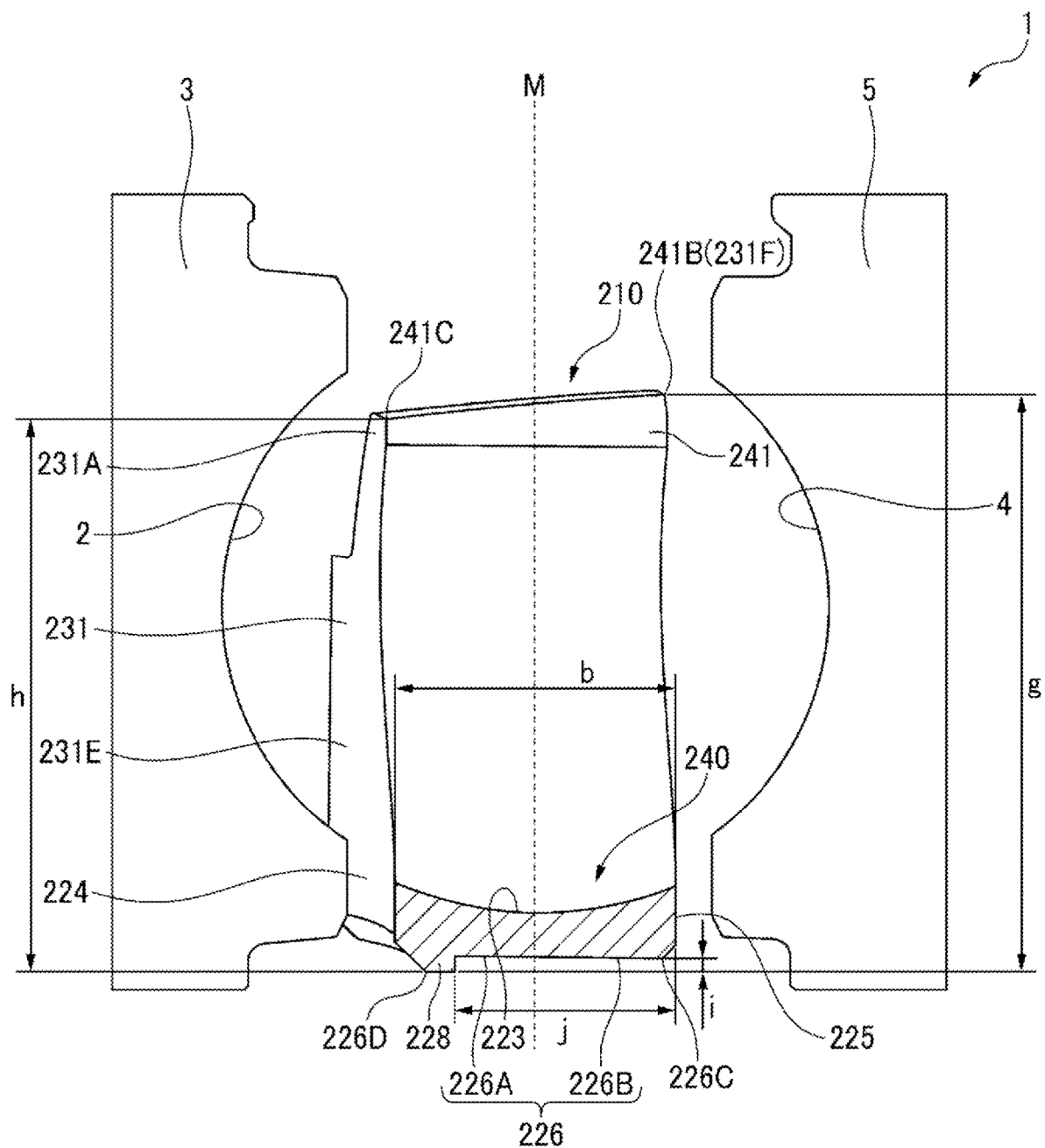
FIG. 69 is a partial cross-sectional perspective view of a part of a cage according to a tenth embodiment.

FIG. 69 discloses a cage 210 according to a tenth embodiment. The cage 210 of the present embodiment differs from the cage 210 of the above-described embodiment in that the bottom surface 226 of the main portion 220 is provided with the projection portion 228 and the tip end portion 231A of the claw portion 231 is an inclined surface. Since the rest of the configuration is substantially the same as that of the above-described embodiment, the description thereof will be omitted by attaching reference numerals to the drawings.

In the present embodiment, the tip end portion 231A of the claw portion 231 is formed as an inclined surface that protrudes to the one axial side (upper side in the drawing) from the radially inner side to the radially outer side. As a result, the pocket opening portion 241 also protrudes to the one axial side from the radially inner side to the radially outer side. Therefore, the most tip end portion 231F of the claw portion 231, which is the part that forms the pocket opening portion 241 and is the part that first comes into contact when the ball 6 is inserted into the cage 210, is positioned at the radially outermost portion 241B of the pocket opening portion 241. In addition, the most tip end portion 231F (radially outermost portion 241B) of the claw portion 231 is positioned on the radially outer side of the radially central portion M of the pocket 240, and a radially innermost portion 241C of the pocket opening portion 241 is positioned on the radially inner side of the radially central portion M of the pocket 240.

The bottom surface 226 of the main portion 220 further protrudes to the other axial side (lower side in the drawing) at the radially inner side part 226A of the radially central portion M of the pocket 240 compared to the radially outer side part 226B of the radially central portion M of the pocket 240.

Specifically, the projection portion 228 that protrudes to the other axial side is provided on the bottom surface 226 of the main portion 220. In addition, the entire projection portion 228 is disposed on the radially inner side of the radially central portion M of the pocket 240. That is, a radial distance j from the outer peripheral surface 225 of the main portion 220 to the outer peripheral surface of the projection portion 228 is set to be equal to or greater than half the radial width b of the bottom (recessed surface 223) of the pocket 240 (j≥b/2). With such a configuration, the bottom surface 226 of the main portion 220 protrudes to the other axial side (lower side in the drawing) at the radially inner side part 226A compared to the radially outer side part 226B.

That is, when the axial distance from the radially innermost portion 226D of the bottom surface 226 to the end portion on the one axial side (upper side in the drawing) of the radially outermost portion 241B (most tip end portion 231F) of the pocket opening portion 241 is defined as g, the axial distance from the radially innermost portion 226D of the bottom surface 226 to the end portion on the one axial side (upper side in the drawing) of the radially innermost portion 241C of the pocket opening portion 241 is defined as h, and the axial distance from the radially innermost portion 226D of the bottom surface 226 to the outer peripheral surface of the radially outermost portion 226C of the bottom surface 226 is defined as i, the relationships of g>h and i>0 are satisfied.

With this configuration, when the ball 6 is incorporated into the cage 210 on the plate-shaped member 250 (refer to FIGS. 58 to 61), the contact point between the ball 6 and the most tip end portion 231F (radially outermost portion 241B) of the claw portion 231 of the cage 210 and the contact point between the projection portion 228 of the bottom surface (inclined surface) 226 and the plate-shaped member 250 are far apart, the load direction is not balanced. Therefore, the ball 6 is incorporated into the pocket 240 while pushing down the claw portion 231 in the radial direction such that the gap (radial distance i) between the radially outermost portion 226C of the bottom surface 226 and the plate-shaped member 250 on the other axial side (lower side in the drawing) is filled in order to balance the load directions. That is, while the most tip end portion 231F of the claw portion 231 is located on the radially outer side, the projection portion 228 of the bottom surface (inclined surface) 226 is located on the radially inner side, the claw portion 231 is tilted to the radially outer side.

Therefore, when the balls 6 are incorporated into the cage 210, the claw portion 231 is tilted to the radially outer side, the small diameter part of the balls 6 passes through the pocket opening portion 241, and thus the strain generated in the claw portions 231 is reduced, and the service life of the cage 210 can be extended.

Modification Example of Tenth Embodiment

In addition, in the present embodiment, the tip end portion 231A of the claw portion 231 is an inclined surface that protrudes to one axial side (upper side in the drawing) from the radially inner side toward the radially outer side, and accordingly, the pocket opening portion 241 also protrudes to the one axial side from the radially inner side to the radially outer side. As a result, the most tip end portion 231F of the claw portion 231 was positioned at the radially outermost portion 241B of the pocket opening portion 241.

Figure 70:
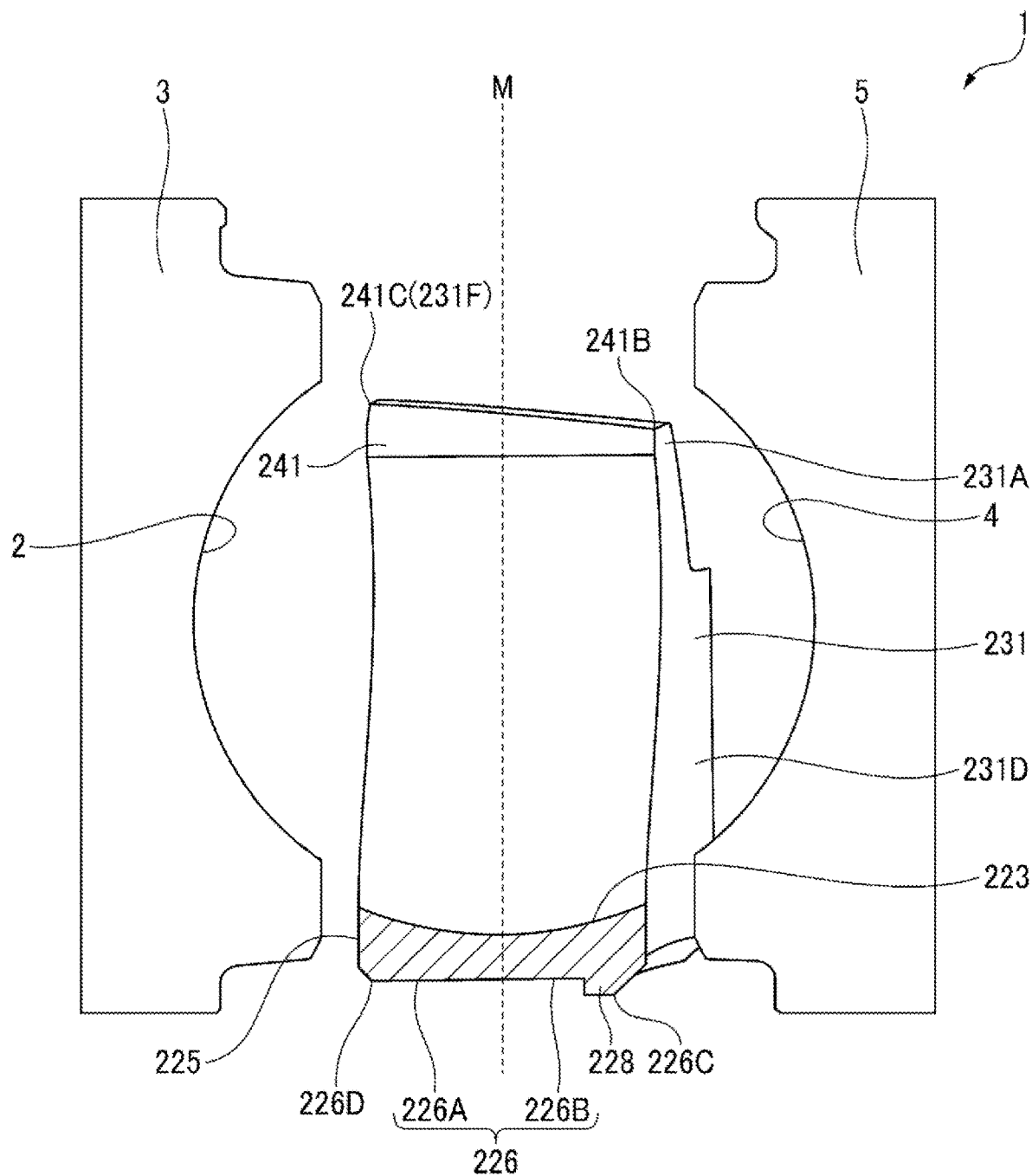
FIG. 70 is a partial cross-sectional perspective view of a part of the cage according to a modification example of the tenth embodiment.

However, the present invention is not limited to this configuration, and as shown in FIG. 70, the tip end portion 231A of the claw portion 231 may be formed as an inclined surface that protrudes to one axial side (upper side in the drawing) from the radially outer side to the radially inner side. In this case, the pocket opening portion 241 also protrudes to the one axial side from the radially outer side to the radially inner side. Therefore, the most tip end portion 231F of the claw portion 231, which is the part that forms the pocket opening portion 241 and is the part that first comes into contact when the ball 6 is inserted, is positioned at the radially innermost portion 241C of the pocket opening portion 241.

In this case, the most tip end portion 231F (radially innermost portion 241C) of the claw portion 231 is positioned on the radially inner side of the radially central portion M of the pocket 240, and the radially outermost portion 241B of the pocket opening portion 241 is positioned on the radially outer side of the radially central portion M of the pocket 240.

The bottom surface 226 of the main portion 220 further protrudes to the other axial side (lower side in the drawing) at the radially outer side part 226B of the radially central portion M of the pocket 240 compared to the radially inner side part 226A of the radially central portion M of the pocket 240.

Specifically, the projection portion 228 that protrudes to the other axial side is provided on the bottom surface 226 of the main portion 220. In addition, the entire projection portion 228 is disposed on the radially outer side of the radially central portion M of the pocket 240. With such a configuration, the bottom surface 226 of the main portion 220 protrudes to the other axial side (lower side in the drawing) at the radially outer side part 226B compared to the radially inner side part 226A.

With this configuration, when the ball 6 is incorporated into the cage 210 on the plate-shaped member 250 (refer to FIGS. 58 to 61), the contact point between the ball 6 and the most tip end portion 231F (radially innermost portion 241C)

of the claw portion 231 of the cage 210 and the contact point between the projection portion 228 of the bottom surface (inclined surface) 226 and the plate-shaped member 250 are far apart, the load direction is not balanced. Therefore, the ball 6 is incorporated into the pocket 240 while pushing down the claw portion 231 in the radial direction such that the gap between the radially innermost portion 226D of the bottom surface 226 and the plate-shaped member 250 on the other axial side (lower side in the drawing) is filled in order to balance the load directions. That is, while the most tip end portion 231F of the claw portion 231 is located on the radially inner side, the projection portion 228 of the bottom surface (inclined surface) 226 is located on the radially outer side, the claw portion 231 is tilted to the radially inner side.

Therefore, when the balls 6 are incorporated into the cage 210, the claw portion 231 is tilted to the radially inner side, the small diameter part of the balls 6 passes through the pocket opening portion 241, and thus the strain generated in the claw portions 231 is reduced, and the service life of the cage 210 can be extended.

A crown type cage for a ball bearing and a ball bearing according to eleventh to fourteenth embodiments of the present invention will be described below with reference to the drawings. In addition, in the specification, there is a part where it is described for the sake of convenience that "the balls 6 are inserted into the pockets 340 of the cage 310", but more precisely, instead of inserting the balls 6 into each pocket 340 of the cage 310, the cage 310 is incorporated into the ball bearing 1 by fitting the cage 310 into the plurality of balls 6 arranged between the inner ring 3 and the outer ring 5 of the ball bearing 1. It should be noted that the following description also describes "the ball 6 is inserted into the pocket 340," "the ball 6 is pushed into the pocket 340," and the like, but these are for the sake of convenience.

Eleventh Embodiment

Figure 80:
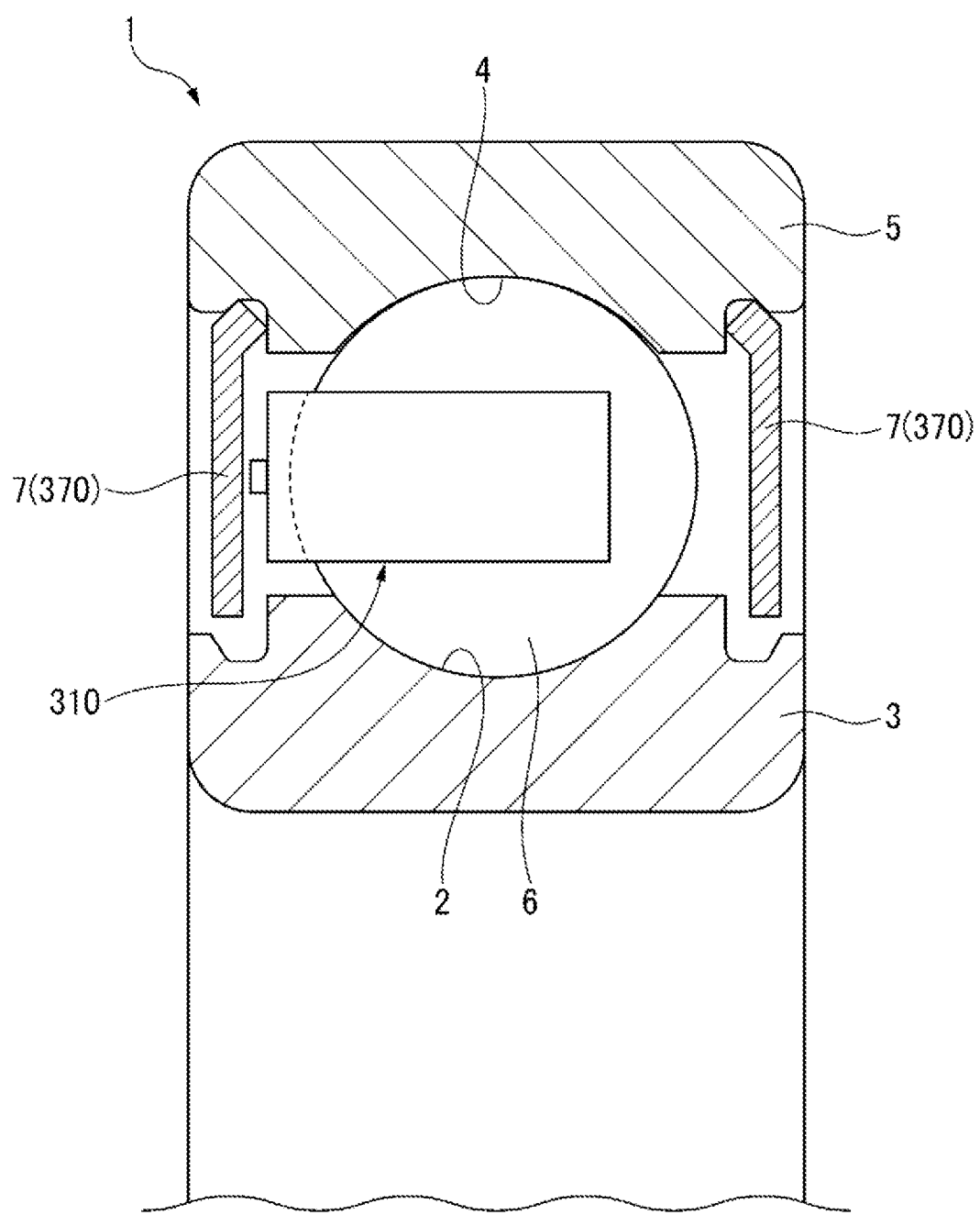
FIG. 80 is a cross-sectional view of a ball bearing provided with the crown type cage for a ball bearing according to the eleventh embodiment of the present invention.

FIGS. 71 to 74 show a crown type cage for a ball bearing (hereinafter also referred to as "crown type cage" or simply "cage") 310 according to the eleventh embodiment of the present invention, and FIG. 80 shows a ball bearing 1 to which this crown type cage for a ball bearing 310 is applied.

Before describing the crown type cage for a ball bearing 310, the ball bearing 1 of FIG. 80 will be described. The ball bearing 1 is a device that supports the rotation parts of various rotary machines, and includes the inner ring 3 having the inner ring raceway 2 on the outer peripheral surface thereof, the outer ring 5 disposed concentrically with the inner ring 3 and having the outer ring raceway 4 on the inner peripheral surface thereof, and the plurality of balls 6 arranged to freely roll between the inner ring raceway 2 and the outer ring raceway 4.

Each ball 6 is rotatably held by the cage 310. In addition, outer peripheral edges of a pair of circular ring-shaped shield plates 7 and 7 are respectively locked to both end portions of the inner peripheral surface of the outer ring 5 in the axial direction. The pair of shield plates 7 and 7 prevents lubricant such as grease existing in the bearing space from leaking to the outside and dust floating outside from entering the bearing space. As a sealing device, a contact type seal may be used instead of the non-contact type shield plates 7 and 7.

Next, the crown type cage 310 of the eleventh embodiment will be described. As the material for the crown type cage 310, a resin composition obtained by adding 10 to 50% by weight of a fiber-reinforced material (for example, glass fiber or carbon fiber) to resins such as thermoplastic resin, particularly, polyamide resins (for example, polyamide 46 and polyamide 66), polybutylene terephthalate, polyphenylene sulfide (PPS), polyetheretherketone (PEEK), and polyethernitrile (PEN).

As the material of the cage 310, a resin material having a higher flexural modulus than polyamide 46 or polyamide 66 can also be used.

Specifically, the cage 310 may be made of a resin composition containing a thermoplastic resin such as polyamide 9T (PA9T) and a fiber-reinforced material. The fiber-reinforced material is preferably carbon fibers having a fiber diameter of 6 µm or more and 8 µm or less, which are added to the resin composition at a ratio of 15% by mass or more and 35% by mass or less. As the carbon fiber, it is preferable to use a PAN-based one obtained by sintering acrylonitrile fiber. Polyamide 9T can be obtained by adding carbon fiber "Torayca (registered trademark) middle fiber" manufactured by Toray Industries, Inc. to PA9T "Genestar (registered trademark)" manufactured by Kuraray Co., Ltd.

The cage 310 may be made of a resin composition containing polyamide 10T (PA10T) and a fiber-reinforced material. The fiber-reinforced material is preferably glass fiber having a fiber diameter of 6 µm or more and 13 µm or less, which is added at a ratio of 20% by mass or more and 50% by mass or less in the resin composition, or a carbon fiber having a fiber diameter of 5 µm or more and 9 µm or less, which is added at a ratio of 20% by mass or more and 35% by mass or less in the resin composition. Furthermore, the cage 310 preferably contains at least one of copper iodide and potassium iodide as an iodide-based heat stabilizer. As polyamide 10T, "XecoT (registered trademark)" manufactured by Unitika Ltd. containing glass fiber can be used.

As a method for manufacturing the cage 310, a method of injection molding using a mold and a manufacturing method with a 3D printer are exemplified. When the injection molding method is used, an annular cavity corresponding to the bearing cage, which is a molded body, is formed in the molding die, a melted resin material (thermoplastic resin) is injected from a resin injection gate provided at the peripheral edge portion of the cavity, the resin material is cooled and solidified, and accordingly, the cage 310 is manufactured.

Figure 71:
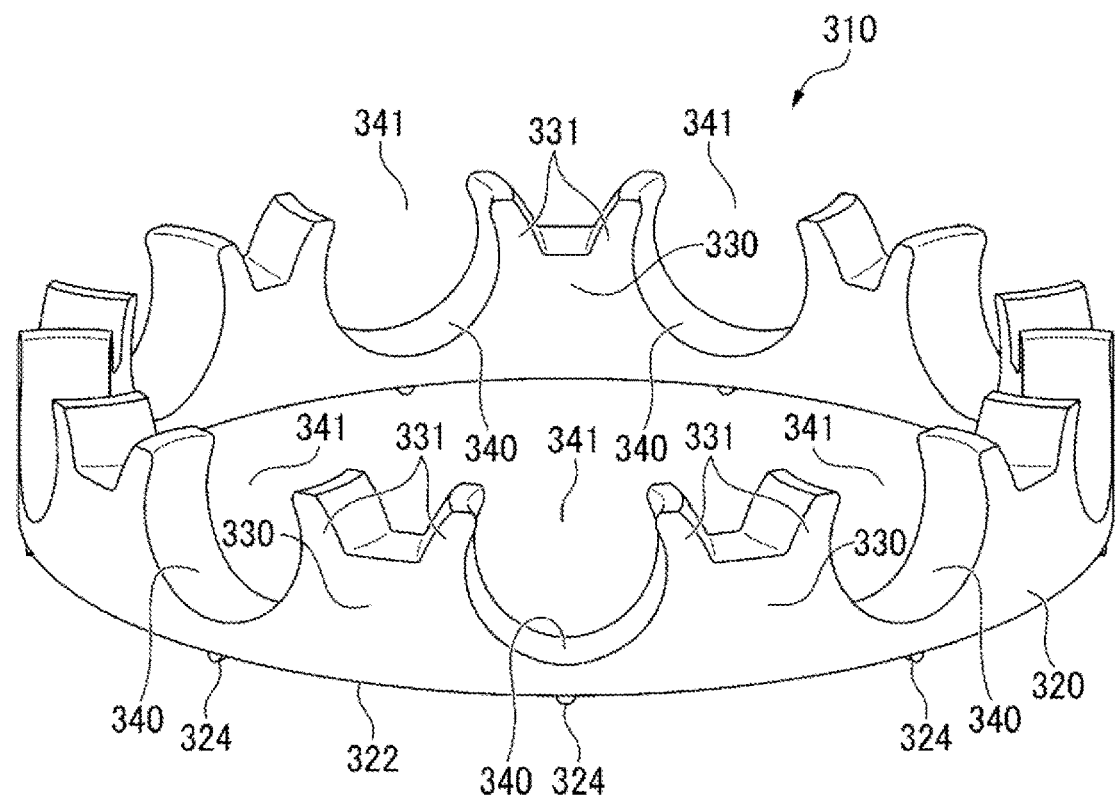
FIG. 71 is a perspective view of a crown type cage for a ball bearing according to an eleventh embodiment of the present invention.
Figure 72:
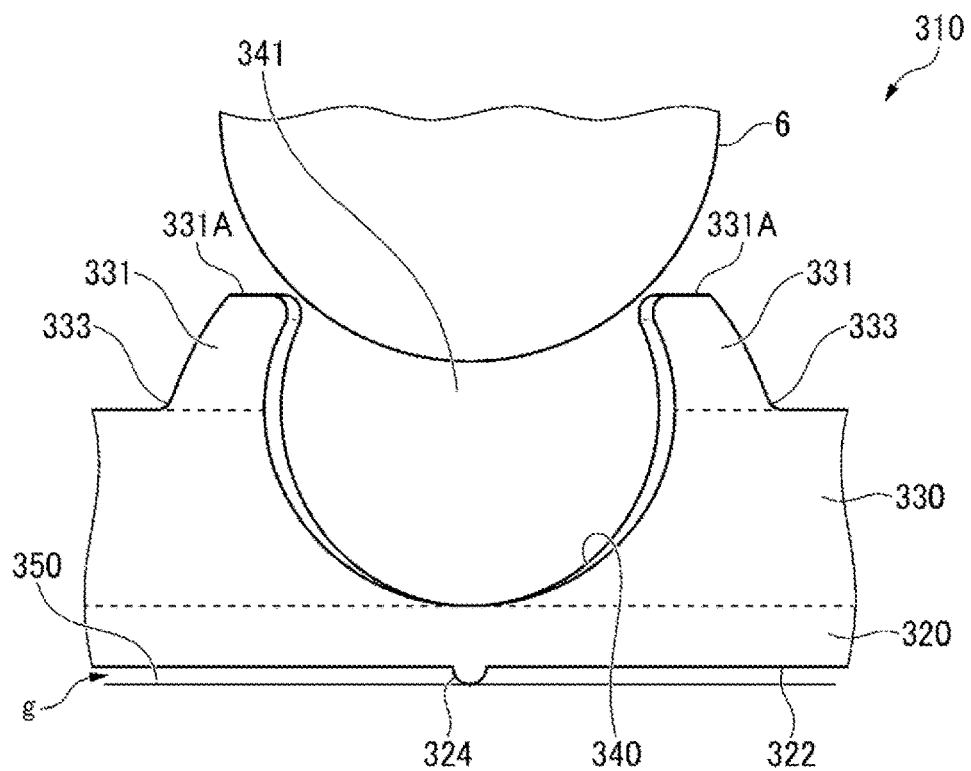
FIG. 72 is an enlarged view of a main part of the crown type cage for a ball bearing of FIG. 71, and shows a state where balls are in contact with a pair of claw portions of the crown type cage for a ball bearing.

Next, the structure of the crown type cage 310 will be described. As shown in FIGS. 71 and 72, the crown type cage 310 includes an annular main portion 320, and a plurality of pillar portions 330 that protrude in the axial direction from the upper surface of the main portion 320 at predetermined intervals in the peripheral direction. Moreover, the crown type cage 310 has a plurality of spherical pockets 340 formed between the adjacent pillar portions 330 and 330 and capable of holding the balls 6.

Further, the crown type cage 310 has a pair of claw portions 331 that protrude in the axial direction to face the axial opening of the respective pockets 340 at the end portion of the pillar portion 330 in the axial direction. The pocket 340 side of the claw portion 331 is smoothly connected to the surface of the pocket 340, and the opposite side of the claw portion 331 to the pocket 340 is integrally connected to the pillar portion 330 via the connection portion 333.

Considering the pillar portion 330 as a center, the pair of claw portions 331 and 331 are formed to protrude from both end portions of one pillar portion 330 in the peripheral direction. On the other hand, considering the pocket 340 as a center, the pair of claw portions 331 and 331 are adjacent to each other with the pocket 340 interposed therebetween, and the tip end portions 331A and 331A of the pair of claw portions 331 and 331 are spaced apart from each other in the peripheral direction. Between the tip end portions 331A and 331A of the two adjacent claw portions 331 and 331 with the pocket 340 interposed therebetween, an inlet 341 having a width shorter than the diameter of the ball 6 and for inserting the ball 6 is provided. The two adjacent claw portions 331 and 331 with the pocket 340 interposed therebetween hold the ball 6, thereby preventing the cage 310 from slipping out from between the outer ring 5 and the inner ring 3 in the axial direction.

In addition, in the present embodiment, a planar bottom surface (back surface, other axial side surface) 322 is defined to be positioned on the opposite side in the axial direction to the surface on which the pillar portion 330 is formed (the upper surface of the main portion 320) in the main portion 320. In addition, the part that protrudes in the axial direction is provided on the bottom surface 322 of the main portion 320. That is, at least one projection 324 as a protruding portion is formed to protrude from the bottom surface 322 in the axial direction. In the present embodiment, the plurality of projections 324 are formed on the bottom surface 322 at predetermined intervals in the peripheral direction of the crown type cage 310. In particular, each projection 324 is formed at a position corresponding to the pocket 340 in the peripheral direction.

Figure 73:
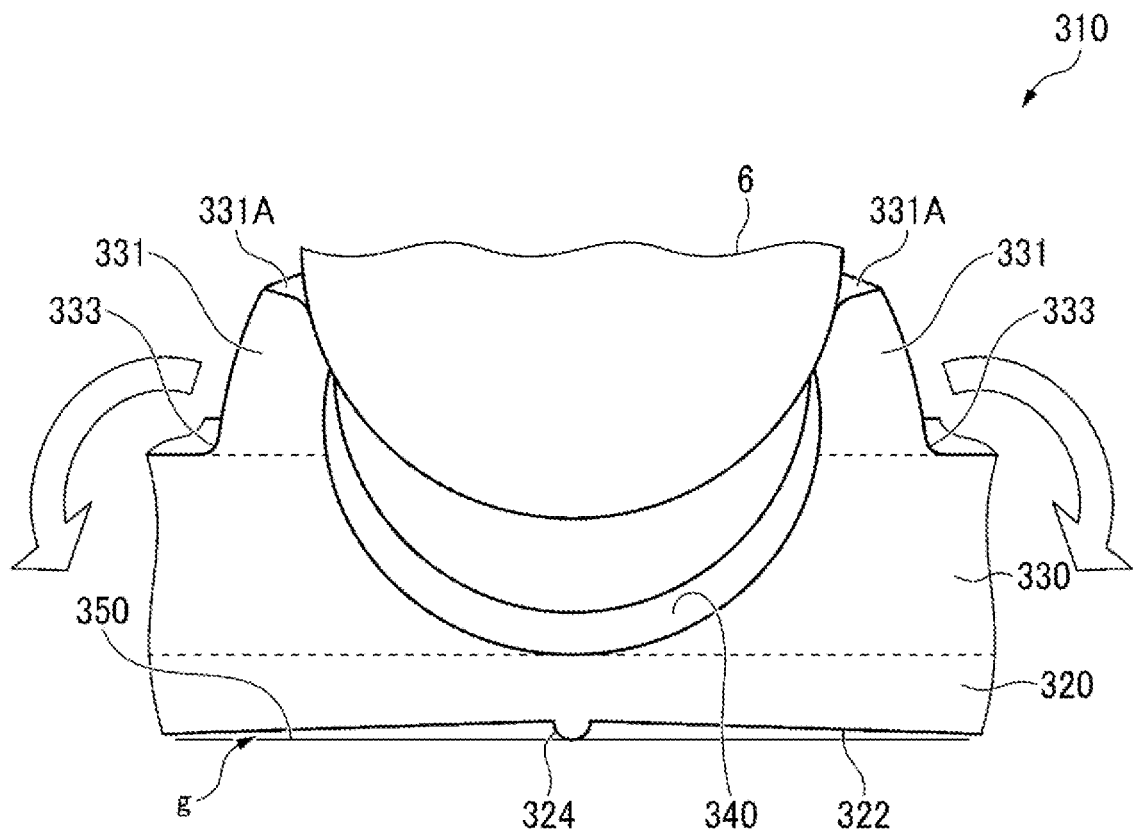
FIG. 73 is an enlarged view of a main part of the crown type cage for a ball bearing of FIG. 71, and shows a process of inserting the ball between the pair of claw portions of the crown type cage for a ball bearing from the state of FIG. 71.

In assembling the ball bearing 1, the cage 310 is inserted into the ball bearing 1 having the inner ring 3, the outer ring 5 and the balls 6. As shown in FIGS. 72 and 73, this can be equated with a model in which the ball 6 is pushed into the cage 310 in a state where a jig 350 that supports the bottom surface 322 fixes the cage 310 at a predetermined position. Since the width of the inlet 341 is shorter than the diameter of the ball 6, the claw portion 331 widens to the peripheral outer side, and the stress and strain are generated in the claw portion 331 and the connection portion 333 due to deformation.

In the cage of the related art, the projection 324 of the present embodiment is not formed on the bottom surface, and the cage is held in a state where the entire bottom surface is in surface contact with the jig. When the ball is pushed in this state, the claw portions are the only part of the cage that can be deformed, excessive stress or strain is generated at the claw portion and the connection portion, and there is a concern about the service life of the cage 310 being shortened.

In order to deal with the above problem, the work of inserting the ball into the pocket is performed by limiting the widening range of the claw portions to the extent that the decrease in service life of the cage can be suppressed. However, according to this method, the smaller the elongation of the resin material used for the cage, the larger the diameter of the inlet should be set. When the diameter of the inlet is made extremely wide, the possibility of the cage coming off the ball when subjected to axial vibration increases.

On the other hand, the cage 310 of the eleventh embodiment has projections 324 formed to protrude from the bottom surface 322 in the axial direction, and the projections 324 are formed at positions corresponding to the pockets 340 in the peripheral direction. As shown in FIG. 72, the tip end portions of the projections 324 come into contact with the jig 350 to secure the gap g between the bottom surface 322 of the cage 310 and the jig 350. When the ball 6 is inserted into the pocket 340 of the cage 310 from this state, as indicated by the arrow in FIG. 73, as the two claw portions 331 and 331 open in the peripheral direction, the part between the pockets 340 and 340 including the connection portion 333 is deformed toward the jig 350 with the tip end portion of the projection 324 as a fulcrum. Due to this deformation action, the stress and strain can be dispersed using the entire cage 310, and the stress and strain generated in the claw portions 331 and connection portions 333 can be reduced more than in the cage of the related art, and it is possible to prevent the service life of the cage 310 from being shortened.

Further, with the cage 310 of the eleventh embodiment, when the ball 6 is inserted, the part between the pockets 340 and 340 is largely deformed to widen the inlet 341 between the two claw portions 331 and 31. Therefore, there is no need to increase the diameter of the inlet 341 even when a resin material with little elongation is used. Therefore, it is possible to suppress coming-off of the cage 310 from the balls 6, that is, the ball bearing 1, even when subjected to axial vibration.

Figure 74:
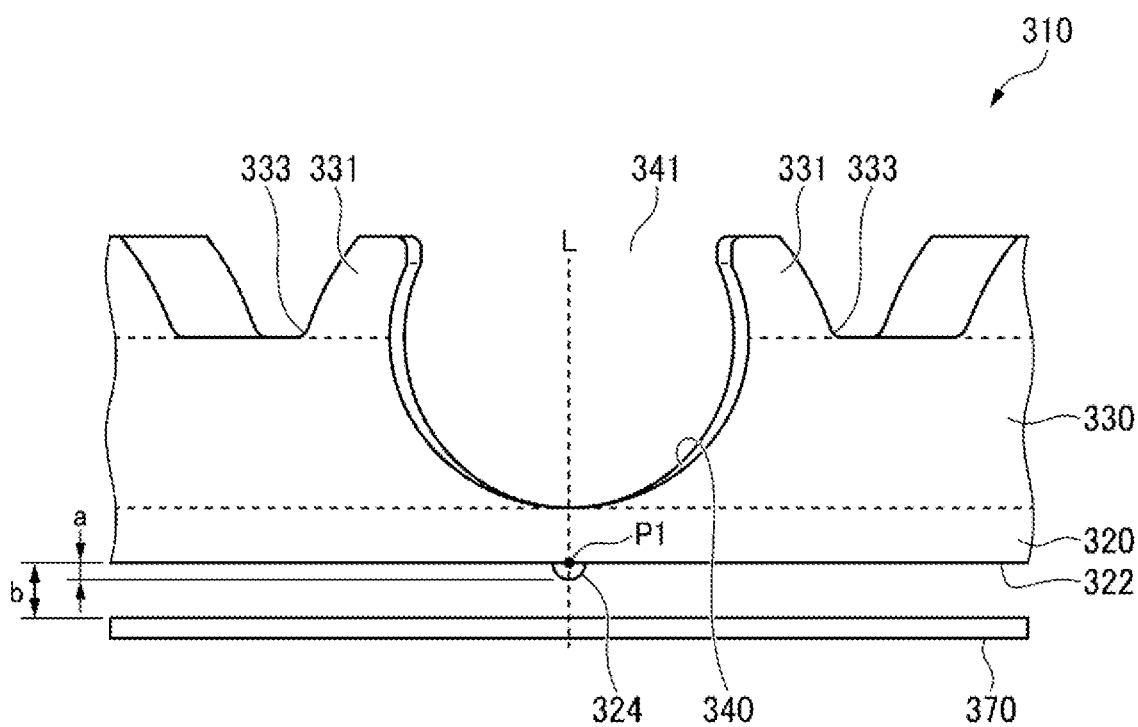
FIG. 74 is a side view of the crown type cage for a ball bearing and a sealing member which is a facing member according to the eleventh embodiment.

As the protrusion height of the projection 324 increases, the effect of deforming the claw portion 331 and the connection portion 333 increases. However, when the cage 310 is incorporated into the ball bearing 1 and used as shown in FIG. 80, the bottom surface 322 of the cage 310 generally faces another facing member 370 such as the shield plate 7 or the like in the axial direction. Therefore, when the protrusion height of the projection 324 is extremely high, there is a concern about the projection 324 coming into contact with the facing member 370. Therefore, as shown in FIG. 74, the protrusion height a in the axial direction from the bottom surface 322 of the projection 324 is preferably set to be smaller than the axial distance b from the bottom surface 322 to the facing member 370 (a<b). By configuring the relationship between the projection 324 provided on the cage 310 in the ball bearing 1 and the shield plate 7 (or seal) in this manner, the friction between the projection 324 and the shield plate 7 (or seal) during rotation of the bearing can be avoided, and wear of the cage can be suppressed.

Moreover, as shown in FIG. 74, the projection 324, particularly the tip end portion of the projection 324, is preferably formed on the bottom surface 322 at a position P1 on the centerline L of the pocket 340 in the peripheral direction. By forming the projection 324 at this position, the parts on both sides of the pocket 340 are evenly deformed, and the work of inserting the ball 6 into the pocket becomes smooth.

Twelfth Embodiment

Figure 75:
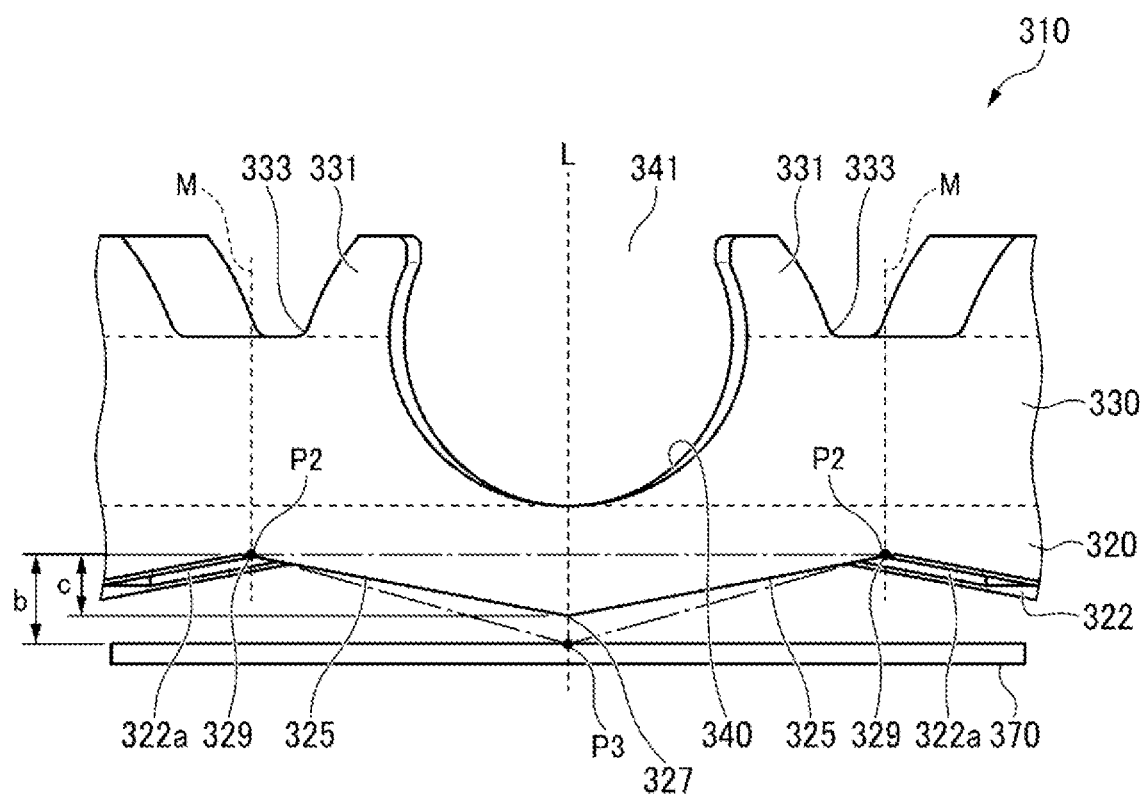
FIG. 75 is a side view of a crown type cage for a ball bearing and a sealing member which is a facing member according to a twelfth embodiment.

FIG. 75 shows a crown type cage 310 of a twelfth embodiment. In the present embodiment, instead of the projection 324, at least two inclined surfaces 325 and 325 inclined in the axial direction are formed on the bottom surface 322 as protruding portions, and the two inclined surfaces 325 and 325 intersect each other to form a top portion 327. According to the present embodiment, when the cage 310 is incorporated into the bearing as shown in FIGS. 72 and 73, the top portion 327 comes into contact with the jig 350, and the gap g (refer to FIGS. 72 and 73) is secured between the bottom surface 322 of the cage 310 and the jig 350. Therefore, an effect equivalent to that of the eleventh embodiment can be obtained.

The inclined surface 325 is defined between the top portion 327 and a bottom portion 329 furthest in the axial direction from the top portion 327. That is, the inclined surface 325 is inclined in the axial direction toward the pillar portion 330 from the top portion 327 to the bottom portion 329 in the peripheral direction. As an inclination height c (axial height) of the inclined surface 325 in the axial direction from the bottom portion 329 to the top portion 327 increases, the effect of deforming the claw portion 331 and the connection portion 333 increases. However, when the cage 310 is incorporated into the ball bearing 1 and used as shown in FIG. 80, the bottom surface 322 of the cage 310 generally faces another facing member 370 such as the shield plate 7 or the like in the axial direction. Therefore, when the inclination height c of the inclined surface 325 is extremely high, there is a concern about the top portion 327 coming into contact with the facing member 370. Therefore, as shown in FIG. 75, the inclination height c of the inclined surface 325 is preferably set to be smaller than the axial distance b from the bottom portion 329 to the facing member 370 (c<b).

Moreover, as shown in FIG. 75, the top portion 327 is preferably formed on the bottom surface 322 at the position on the centerline L of the pocket 340 in the peripheral direction. By forming the top portion 327 at this position, the parts on both sides of the pocket 340 in the peripheral direction are evenly deformed, and the work of inserting the ball 6 into the pocket 340 becomes smooth.

Furthermore, when the bottom surface 322 faces another facing member 370 when the cage 310 is used, two bottom surface intermediate positions P2 of the bottom surface 322 positioned on an intermediate position M between each of other two pockets 340 to which the pocket 340 is adjacent in the peripheral direction, and a facing member center position P3 positioned on the centerline L of the pocket 340 in the peripheral direction of the facing member 370 are defined. In this state, the two inclined surfaces 325 and 325 and the top portion 327 are preferably positioned in a region surrounded by the line segment P2-P2 and the two line segments P2-P3 and P2-P3 in the peripheral direction. When the two inclined surfaces 325 and 325 and the top portion 327 are formed outside this region, at the time of incorporating the cage 310 into the bearing as shown in FIGS. 72 and 73, there is a concern that a sufficient gap cannot be secured between the jig 350 and the cage 310, thereby hindering smooth deformation of the cage 310.

Further, in the present embodiment, at each peripheral position where the pillar portion 330 is formed, a thinned part 322a is formed from the bottom surface 322 toward the pillar portion 330.

Thirteenth Embodiment

Figure 76:
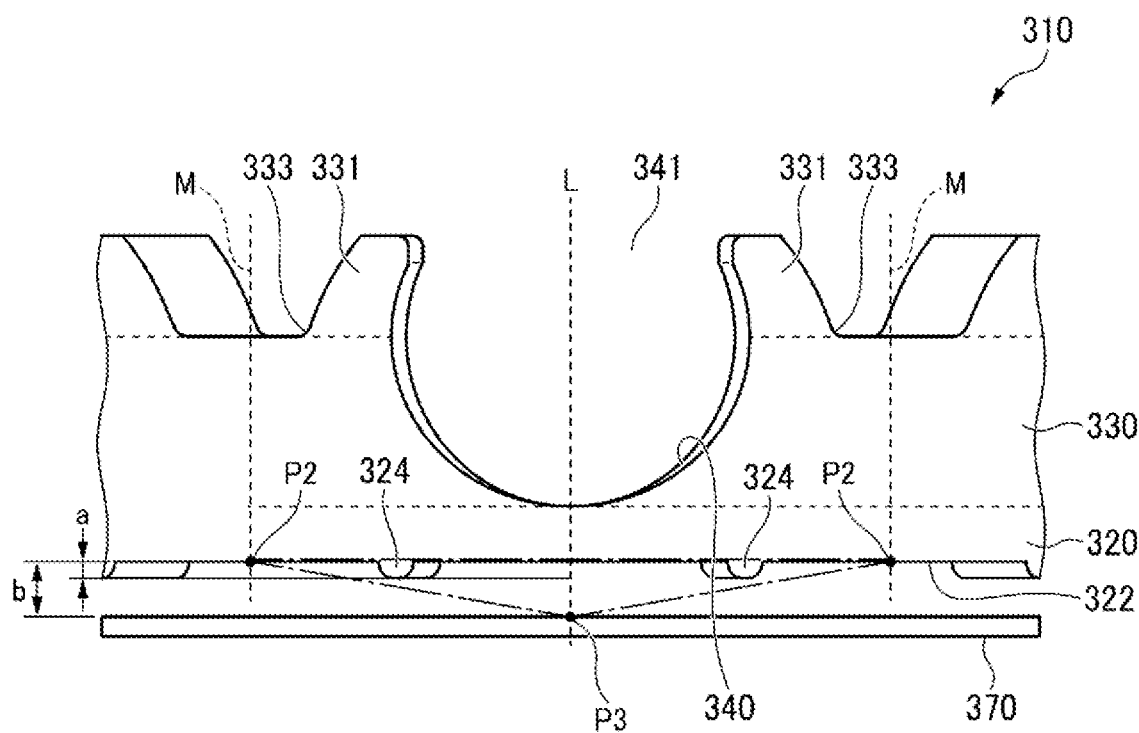
FIG. 76 is a side view of a crown type cage for a ball bearing and a sealing member which is a facing member according to a thirteenth embodiment.

FIG. 76 shows a crown type cage 310 of a thirteenth embodiment. In the present embodiment, the two projections 324 and 324 as protruding portions are positioned corresponding to the pocket 340 in the peripheral direction, but are formed symmetrically with respect to the centerline L at positions off the position on the centerline L of the pocket 340 in the peripheral direction. According to such a configuration, the two projections 324 and 324 are in contact with the jig 350 during the work shown in FIGS. 72 and 73, and thus the cage 310 can be stably deformed. In addition, the parts on both sides of the pocket 340 in the peripheral direction are evenly deformed, and the work of inserting the ball 6 into the pocket 340 becomes smooth. Furthermore, the number of projections 324 is not limited to two, and any plurality of projections 324 can be provided.

Even in the present embodiment, as described in the twelfth embodiment, the plurality of projections 324 are preferably positioned in a region surrounded by the line segment P2-P2 and two line segments P2-P3 and P2-P3 in the peripheral direction. When the plurality of projections 324 and 324 are formed outside this region, at the time of incorporating the cage 310 into the bearing as shown in FIGS. 72 and 73, there is a concern that a sufficient gap cannot be secured between the jig 350 and the cage 310, thereby hindering smooth deformation of the cage 310.

In addition, in the crown type cage 310 of the eleventh embodiment, as in the twelfth and thirteenth embodiments, the projections 324 are preferably positioned in the region surrounded by the line segment P2-P2 and the two line segments P2-P3 and P2-P3 in the peripheral direction.

Fourteenth Embodiment

Figure 77:
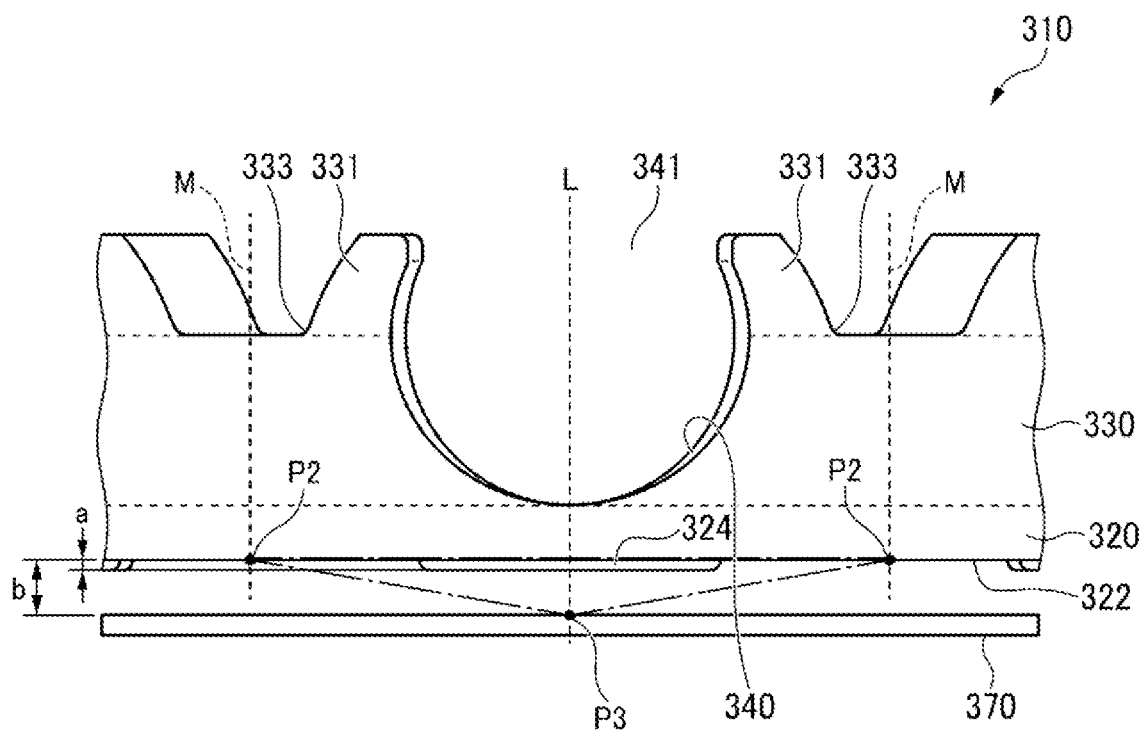
FIG. 77 is a side view of a crown type cage for a ball bearing and a sealing member which is a facing member according to a fourteenth embodiment.

FIG. 77 shows a crown type cage 310 of a fourteenth embodiment. In the present embodiment, the projection 324 as the protruding portion is a flat projection and has a flat tip end surface. In the shown example, the peripheral width of the projection 324 is substantially equal to the peripheral width of the pocket 340, but may be increased or decreased as appropriate. According to such an aspect, when the cage 310 is incorporated into the bearing as shown in FIGS. 72 and 73, the planar tip end surface of the projection 324 comes into contact with the jig 350, and thus the cage 310 can be deformed in a stable state. Furthermore, even in the present embodiment, as described in the twelfth and thirteenth embodiments, the flat projection 324 is preferably positioned in a region surrounded by the line segment P2-P2 and two line segments P2-P3 and P2-P3 in the peripheral direction. When the flat projection 324 is formed outside this region, at the time of incorporating the cage 310 into the bearing as shown in FIGS. 72 and 73, there is a concern that a sufficient gap cannot be secured between the jig 350 and the cage 310, thereby hindering deformation of the cage 310.

Figure 78:
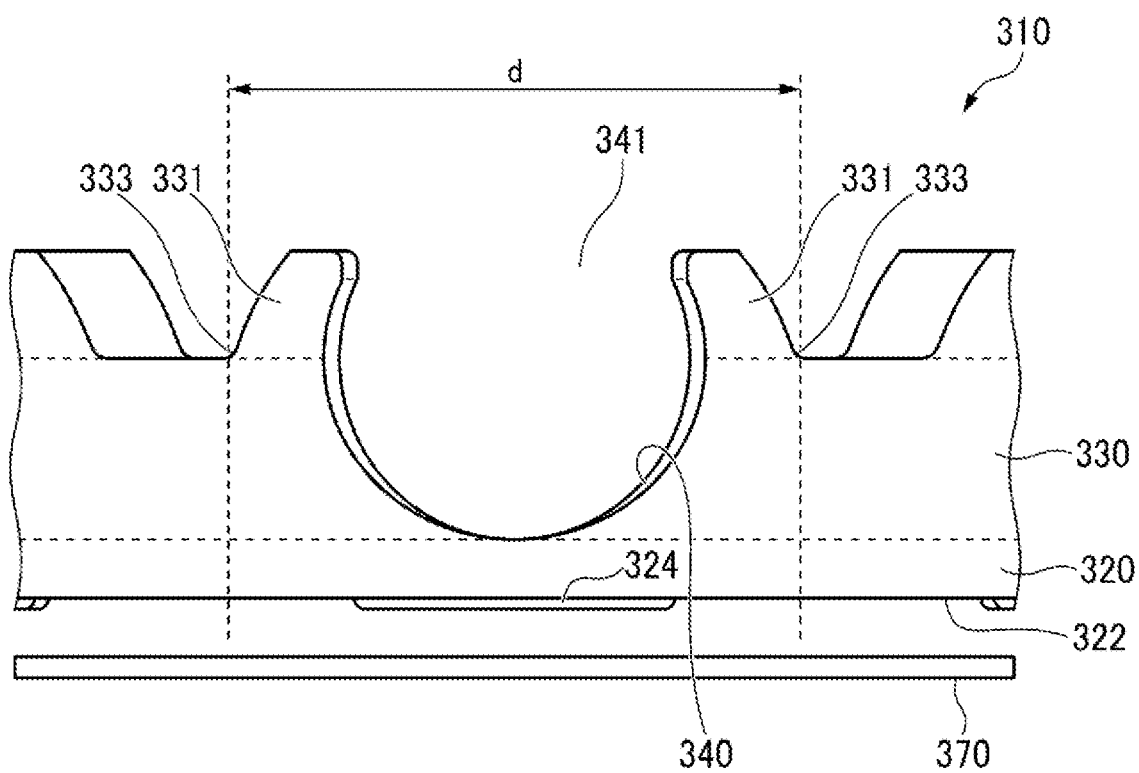
FIG. 78 is a side view of the crown type cage for a ball bearing and the sealing member which is the facing member according to the fourteenth embodiment.

In addition, as shown in FIG. 78, the projection 324 is preferably formed between two connection portions 333 indicated by a region d in the peripheral direction. That is, the projection 324 is disposed at a position overlapping the pocket 340, the pair of claw portions 331 and 331, and the connection portion 333 in the peripheral direction. When the projection 324 is formed outside this region, at the time of incorporating the cage 310 into the bearing as shown in FIGS. 72 and 73, there is a concern that the cage 310 is stretched, and deformation of the cage 310 is suppressed. Furthermore, although FIG. 78 is explained using the configuration of the fourteenth embodiment, the projection 324 of the eleventh embodiment (refer to FIGS. 71 to 74) and the thirteenth embodiment (refer to FIG. 76) is also similarly preferably formed between the two connection portions 333 in the peripheral direction.

Figure 79:
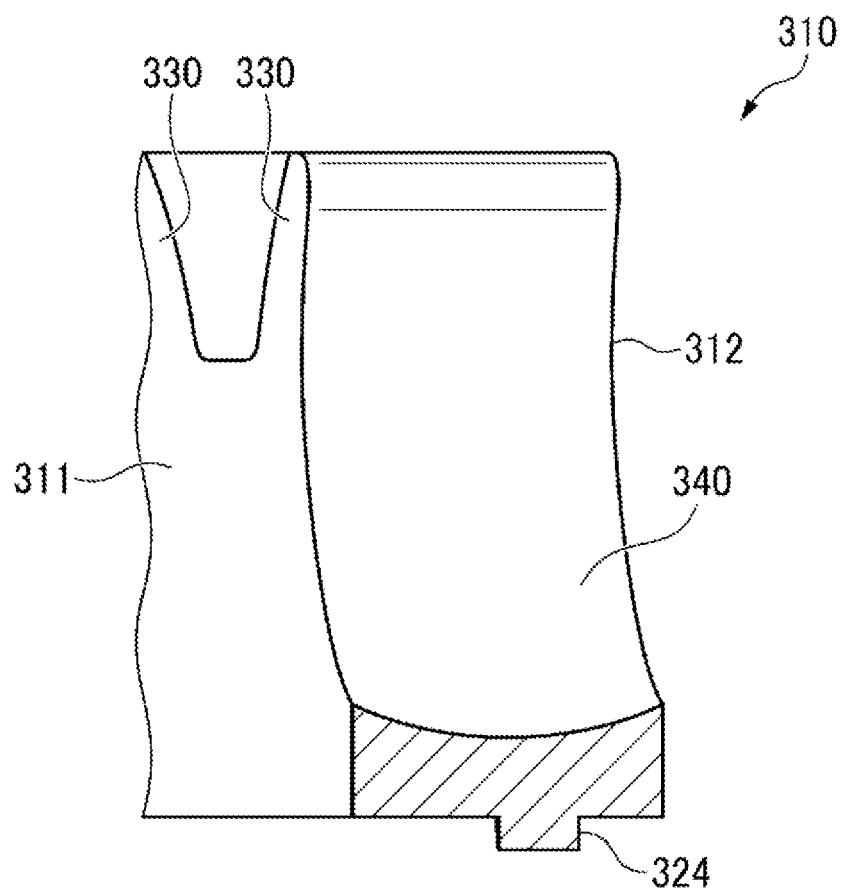
FIG. 79 is a cross-sectional view of a main part of the crown type cage for a ball bearing according to the eleventh embodiment.

The projection 324 do not need to be connected in the radial direction between an inner diameter surface 311 and an outer diameter surface 312, but are partially formed between the inner diameter surface 311 and the outer diameter surface 312 in the radial direction as shown in FIG. 79.

The protruding portion of the present invention may be a part that protrudes from the bottom surface 322 at a position corresponding to the pocket 340 in the peripheral direction, and the specific shape of the protruding portion is not particularly limited. Examples of the protruding portion include the projection in which the tip end is curved as shown in FIGS. 71 to 74, and 76, a flat projection as shown in FIGS. 77 and 78, and a top portion composed of two inclined surfaces as shown in FIG. 75, but the projection or the like having a curved surface (arch surface) with curved side surfaces may be employed. In addition, the inclined surface 325 may be not only a straight inclined surface but also a curved inclined surface. The top portion 327 formed by the intersection of the inclined surfaces 325 and 325 may also be a curved surface.

The present invention is not limited to the above-described embodiments, and combinations of the configurations of the embodiments with each other, modifications, and applications by those skilled in the art based on the descriptions in the specification and well-known techniques are also contemplated by the present invention and are included in the scope of protection.

The present application is based on Japanese Patent Application No. 2021-005914 filed on Jan. 18, 2021, Japanese Patent Application No. 2021-005915 filed on Jan. 18, 2021, and Japanese Patent Application No. 2021-041572 filed on Mar. 15, 2021, and the contents thereof are incorporated herein by reference.

REFERENCE SIGNS LIST

1 Ball bearing
2 Inner ring raceway
3 Inner ring
4 Outer ring raceway
5 Outer ring
6 Ball
7 Shield plate (facing member)
10 Crown type cage for ball bearing
20 Main portion
21 Upper surface
23 Recessed surface
24 Inner peripheral surface
25 Outer peripheral surface
26 Bottom surface
27 Opening portion
28 First projection portion
29 Second projection portion
29A Root portion
29B Tip end surface
30 Pillar portion
31 Claw portion
31A Tip end portion
31B First peripheral surface
31C Second peripheral surface
31D Outer peripheral surface
31E Inner peripheral surface
33 Connection portion
33A Upper surface
40 Pocket
41 Inlet
210 Crown type cage for ball bearing
220 Main portion
221 Upper surface
223 Recessed surface
224 Inner peripheral surface
225 Outer peripheral surface
226 Bottom surface
226A Radially inner side part
226B Radially outer side part
226C Radially outermost portion
226D Radially innermost portion
228 Projection portion
230 Pillar portion
231 Claw portion
231A Tip end portion
231B First peripheral surface
231C Second peripheral surface
231D Outer peripheral surface
231E Inner peripheral surface
231F Most tip end portion
233 Connection portion
240 Pocket
241 Pocket opening portion
241A Pocket opening diameter
241B Radially outermost portion
241C Radially innermost portion
250 Plate-shaped member
310 Crown type cage for ball bearing
311 Inner diameter surface
312 Outer diameter surface
320 Main portion
322 Bottom surface
322a Thinned part
324 Projection (protruding portion)
325 Inclined surface
327 Top portion (protruding portion)
329 Bottom portion
330 Pillar portion
331 Claw portion
333 Connection portion
340 Pocket
341 Inlet
350 Jig
370 Facing member

The invention claimed is:

1. A crown type cage for a ball bearing, which is made of resin, comprising:
   an annular main portion;
   a plurality of pillar portions protruding in an axial direction from the main portion at predetermined intervals in a peripheral direction; and
   a spherical pocket formed between the adjacent pillar portions and capable of holding a ball, wherein
   each pillar portion has a pair of claw portions of which tip end portions are spaced apart from each other and a connection portion that connects the pair of claw portions, and
   a first surface of the main portion is provided with a first projection portion protruding in the axial direction, wherein
   an inlet having a width shorter than a diameter of the ball and for inserting the ball is provided between the tip end portions of the two adjacent claw portions forming the pocket,
   a radius of curvature of a spherical recessed surface of at least one pocket is greater than a radius of curvature of a rolling surface of the ball,
   an outer diameter of at least one claw portion is smaller than an outer diameter of the main portion,
   a radial width of at least one claw portion is ½ or less of a radial width of the main portion, and
   an axial width from a first surface of the connection portion of at least one pillar portion to the first surface of the main portion is ½ or less of an axial width of the crown type cage for the ball bearing.

2. The crown type cage for a ball bearing according to claim 1, wherein
   the first projection portion protruding in the axial direction is provided on a radially outer side portion of the first surface of the main portion, and
   at least a part of the first projection portion overlaps the pocket in the peripheral direction and radial direction.

3. The crown type cage for a ball bearing according to claim 2, wherein the first projection portion is provided along an entire periphery on the radially outer side portion of the first surface of the main portion.

4. The crown type cage for a ball bearing according to claim 2, wherein
the first surface of the main portion is provided with a second projection portion protruding in the axial direction,
at least a part of the second projection portion overlaps the pocket in the peripheral direction and the radial direction, and
the first projection portion further protrudes from the second projection portion in the axial direction.

5. The crown type cage for a ball bearing according to claim 4, wherein
a radial range and a peripheral range in which the second projection portion is provided are substantially the same as a radial range and a peripheral range in which a recessed surface of the main portion forming the pocket is provided.

6. The crown type cage for a ball bearing according to claim 1, wherein
the main portion is provided with an opening portion between the adjacent pockets.

7. The crown type cage for a ball bearing according to claim 1, wherein
an axial width from a first surface of the connection portion of at least one pillar portion to the first surface of the main portion is greater than an axial width of the main portion at a bottom portion of at least one pocket.

8. The crown type cage for a ball bearing according to claim 1, wherein
a radial width of each claw portion decreases from the main portion side toward the tip end portion side of the claw portion.

9. The crown type cage for a ball bearing according to claim 1, wherein
each claw portion has a first peripheral surface forming the pocket and a second peripheral surface opposite to the first peripheral surface, and
in the two adjacent claw portions that form the pocket, a peripheral distance between the two second peripheral surfaces decreases from the main portion side toward the tip end portion side of the claw portion.

10. The crown type cage for a ball bearing according to claim 1, wherein
a pocket opening portion having a pocket opening diameter shorter than a diameter of the ball and for inserting the ball toward a second axial side opposite to a first axial side is provided between the tip end portions of the two adjacent claw portions forming the pocket,
of the tip end portions of the claw portion, a part that forms the pocket opening portion and that first contacts when the ball is inserted toward the second axial side is defined as a most tip end portion, and
the most tip end portion is positioned on one of:
a radially inner side of a radially central portion of the pocket, wherein the first surface of the main portion protrudes to the second axial side at a radially outer side part of the radially central portion of the pocket compared to a radially inner side part of the radially central portion of the pocket, or
a radially outer side of the radially central portion of the pocket, wherein the first surface of the main portion protrudes to the second axial side at the radially inner side part of the radially central portion of the pocket compared to the radially outer side part of the radially central portion of the pocket.

11. The crown type cage for a ball bearing according to claim 10, wherein
the most tip end portion of the claw portion extends flat in the radial direction, and
an entirety of the most tip end portion of the claw portion is disposed on the radially inner side or the radially outer side of the radially central portion of the pocket.

12. The crown type cage for a ball bearing according to claim 11, wherein
the entirety of the most tip end portion of the claw portion is disposed on the radially inner side of the radially central portion of the pocket, and
an entirety of the first projection portion is disposed on the radially outer side of the radially central portion of the pocket.

13. The crown type cage for a ball bearing according to claim 12, wherein
at least a part of the first projection portion overlaps the pocket in the peripheral direction and the radial direction.

14. The crown type cage for a ball bearing according to claim 13, wherein
the first projection portion is provided along the entire periphery on the first surface of the main portion.

15. The crown type cage for a ball bearing according to claim 11, wherein
the entirety of the most tip end portion of the claw portion is disposed on the radially outer side of the radially central portion of the pocket, and
an entirety of the first projection portion is disposed on the radially inner side of the radially central portion of the pocket.

16. The crown type cage for a ball bearing according to claim 11, wherein
the entirety of the most tip end portion of the claw portion is disposed on the radially inner side of the radially central portion of the pocket,
the first surface of the main portion is an inclined surface that protrudes to the second axial side from the radially inner side to the radially outer side, and
a radially outermost portion of the inclined surface of the first surface of the main portion is disposed on the radially outer side of the radially central portion of the pocket.

17. The crown type cage for a ball bearing according to claim 11, wherein
the entirety of the most tip end portion of the claw portion is disposed on the radially outer side of the radially central portion of the pocket,
the first surface of the main portion is an inclined surface that protrudes to the second axial side from the radially outer side to the radially inner side, and
a radially innermost portion of the inclined surface of the first surface of the main portion is disposed on the radially inner side of the radially central portion of the pocket.

18. The crown type cage for a ball bearing according to claim 10, wherein
the most tip end portion is positioned at the radially outermost portion of the pocket opening portion such that the pocket opening portion protrudes to the first axial side from the radially inner side to the radially outer side, and
the most tip end portion is positioned on the radially outer side of the radially central portion of the pocket.

19. The crown type cage for a ball bearing according to claim 18, wherein
the first surface of the main portion is an inclined surface that protrudes to the second axial side from the radially outer side to the radially inner side, and
the radially innermost portion of the inclined surface of the first surface of the main portion is disposed on the radially inner side of the radially central portion of the pocket.

20. The crown type cage for a ball bearing according to claim 18, wherein
a projection portion that protrudes to the second axial side is provided on the first surface of the main portion, and
an entirety of the first projection portion is disposed on the radially inner side of the radially central portion of the pocket.

21. The crown type cage for a ball bearing according to claim 10, wherein
the most tip end portion is positioned at the radially outermost portion of the pocket opening portion such that the pocket opening portion protrudes to the first axial side from the radially outer side to the radially inner side, and
the most tip end portion is positioned on the radially inner side of the radially central portion of the pocket.

22. The crown type cage for a ball bearing according to claim 21, wherein
the first surface of the main portion is an inclined surface that protrudes to the second axial side from the radially inner side to the radially outer side, and
the radially outermost portion of the inclined surface of the first surface of the main portion is disposed on the radially outer side of the radially central portion of the pocket.

23. The crown type cage for a ball bearing according to claim 21, wherein
an entirety of the first projection portion is disposed on the radially outer side of the radially central portion of the pocket.

24. The crown type cage for a ball bearing according to claim 1, wherein
an inlet having a width shorter than a diameter of the ball and for inserting the ball is provided between the tip end portions of the two adjacent claw portions with the pocket interposed therebetween, and
the first protruding portion is formed to protrude in the axial direction from the bottom surface of the main portion at a position corresponding to the pocket in the peripheral direction.

25. The crown type cage for a ball bearing according to claim 24, wherein
the first protruding portion is formed at a position on a centerline of the pocket in the peripheral direction.

26. The crown type cage for a ball bearing according to claim 25, wherein
a plurality of the first protruding portions are formed symmetrically with respect to the centerline at positions off the position on the centerline of the pocket in the peripheral direction.

27. The crown type cage for a ball bearing according to claim 24, wherein
the first protruding portion is formed in a region of the width of the inlet in the peripheral direction.

28. The crown type cage for a ball bearing according to claim 1, which is made of resin, wherein
an inlet having a width shorter than a diameter of the ball and for inserting the ball is provided between the tip end portions of the two adjacent claw portions with the pocket interposed therebetween, and
the first protruding portion comprises at least two inclined surfaces inclined in the axial direction, and the at least two inclined surfaces intersect to form a top portion.

29. The crown type cage for a ball bearing according to claim 28, wherein
the top portion is formed at a position on a centerline of the pocket in the peripheral direction.

30. The crown type cage for a ball bearing according to claim 1, composed of thermoplastic resin.

31. The crown type cage for a ball bearing according to claim 1, composed of thermoplastic resin to which a fiber-reinforced material is added.

32. The crown type cage for a ball bearing according to claim 1, composed of a resin composition containing polyamide 9T and a fiber-reinforced material.

33. The crown type cage for a ball bearing according to claim 1, composed of a resin composition containing polyamide 10T and a fiber-reinforced material.

34. A ball bearing comprising:
an outer ring;
an inner ring;
a plurality of the balls arranged between the outer ring and the inner ring; and
the crown type cage for a ball bearing according to claim 1.

35. The ball bearing according to claim 34, further comprising
a facing member, wherein
the first surface of the main portion faces the facing member and a protrusion height of the first protruding portion in the axial direction is smaller than an axial distance from the first surface of the main portion to the facing member.

36. The ball bearing according to claim 35, wherein
the first protruding portion is formed at a position on a centerline of the pocket in the peripheral direction.

37. The ball bearing according to claim 36, wherein
two surface intermediate positions P2 of the first surface of the main portion positioned on an intermediate position between each of another two pockets that the pocket is adjacent in the peripheral direction, and a facing member center position P3 positioned on the centerline of the pocket in the peripheral direction of the facing member are defined, and
a tip end portion of the first protruding portion is positioned in a region defined by a first line segment between the two surface intermediate positions P2, a second line segment between a first of the two surface intermediate positions P2 and the facing member center position P3, and a third line segment between the facing member center position and a second of the two surface intermediate positions P2.

38. The ball bearing according to claim 36, wherein
the first protruding portion comprises at least two inclined surfaces inclined in the axial direction, and the at least two inclined surfaces intersect to form a top portion, the inclined surface being defined between the top portion and a bottom portion furthest from the top portion in the axial direction, and
an inclination height of the inclined surface in the axial direction is smaller than an axial distance from the bottom portion to the facing member.

* * * * *